US011080880B2

(12) United States Patent
Liu

(10) Patent No.: US 11,080,880 B2
(45) Date of Patent: Aug. 3, 2021

(54) MACHINE VISION SYSTEM AND METHOD FOR IDENTIFYING LOCATIONS OF TARGET ELEMENTS

(71) Applicant: Maker Trading Pte Ltd, Singapore (SG)

(72) Inventor: Chris Liu, Singapore (SG)

(73) Assignee: MAKER TRADING PTE LTD, Hillsboro, OR (US)

( * ) Notice: Subject to any disclaimer, the term of this patent is extended or adjusted under 35 U.S.C. 154(b) by 203 days.

(21) Appl. No.: 15/754,279

(22) PCT Filed: Nov. 17, 2017

(86) PCT No.: PCT/SG2017/050573
§ 371 (c)(1),
(2) Date: Dec. 13, 2018

(87) PCT Pub. No.: WO2019/039996
PCT Pub. Date: Feb. 28, 2019

(65) Prior Publication Data
US 2019/0096080 A1 Mar. 28, 2019

(30) Foreign Application Priority Data
Aug. 25, 2017 (SG) .............................. 10201706981P

(51) Int. Cl.
*G06T 7/70* (2017.01)
*G06T 7/55* (2017.01)
*G06T 7/73* (2017.01)
*B66F 9/24* (2006.01)
(Continued)

(52) U.S. Cl.
CPC .............. *G06T 7/70* (2017.01); *B66F 9/0755* (2013.01); *B66F 9/24* (2013.01); *G06T 7/55* (2017.01); *G06T 7/74* (2017.01); *G06T 7/66* (2017.01); *G06T 2207/10028* (2013.01); *G06T 2207/30204* (2013.01); *G06T 2207/30208* (2013.01)

(58) Field of Classification Search
CPC ..... G06T 7/70; G06T 7/55; G06T 7/74; B66F 9/0755; B66F 9/24
See application file for complete search history.

(56) References Cited

U.S. PATENT DOCUMENTS

| 6,757,445 B1 * | 6/2004 | Knopp .................. G01C 11/06 382/154 |
| 8,115,762 B1 | 2/2012 | Fan et al. |
| 9,256,220 B1 * | 2/2016 | Coffland .................. G01S 5/06 |

(Continued)

FOREIGN PATENT DOCUMENTS

| JP | H09-311013 | 12/1997 |
| JP | 2011179980 | 9/2011 |
| WO | WO2017/101150 | 6/2017 |

OTHER PUBLICATIONS

Google scholar search results.*
(Continued)

*Primary Examiner* — Qun Shen
(74) *Attorney, Agent, or Firm* — BakerHostetler

(57) ABSTRACT

This document describes machine vision systems and methods for determining locations of target elements. The described machine vision system captures and uses information gleaned from the captured target elements to determine the locations of these captured target elements.

44 Claims, 19 Drawing Sheets

(51) Int. Cl.
*B66F 9/075* (2006.01)
*G06T 7/66* (2017.01)

(56) References Cited

U.S. PATENT DOCUMENTS

| | | | |
|---|---|---|---|
| 9,804,577 B1* | 10/2017 | Troy | G01N 29/225 |
| 2003/0174880 A1* | 9/2003 | Sakamoto | H04N 13/254 |
| | | | 382/154 |
| 2007/0009149 A1* | 1/2007 | Wagner | G06T 7/73 |
| | | | 382/154 |
| 2011/0187828 A1 | 8/2011 | Kim et al. | |
| 2016/0093058 A1* | 3/2016 | Moteki | G06K 9/4604 |
| | | | 382/154 |
| 2017/0094255 A1 | 3/2017 | Zabatani et al. | |
| 2017/0213320 A1* | 7/2017 | Yucer | G06T 17/00 |
| 2017/0319143 A1* | 11/2017 | Yu | A61B 5/7485 |
| 2018/0140376 A1* | 5/2018 | Hokka | A61M 5/1723 |

OTHER PUBLICATIONS

International Preliminary Report on Patentability from Intellectual Property Office of Singapore dated Mar. 23, 2018 for relating International Application No. PCT/SG2017/050573.

International Search Report from Intellectual Property Office of Singapore dated Jan. 2, 2018 for relating International Application No. PCT/SG2017/050573.

Written Opinion from from Intellectual Property Office of Singapore dated Jan. 2, 2018 for relating International Application No. PCT/SG2017/050573.

* cited by examiner

Finding Angle of Engagement based on Image Slope

Super Vision System with Example

Right Vertical Monocular        UR+LR
Left Vertical Monocular         UL+LL
Lower Horizontal Monocular      LL+LR
Upper Horizontal Monocular      UL+UR
Known Height Horizontal Monocular UL+LR
Known Height Horizontal Monocular UR+LL

MACHINE VISION SYSTEM AND METHOD FOR IDENTIFYING LOCATIONS OF TARGET ELEMENTS

CROSS REFERENCED APPLICATIONS

The present application is a PCT national phase filing of PCT Application Number PCT/SG2017/050573 filed on Nov. 17, 2017, and claims priority to Singapore Patent Application No. 10201706981P filed on Aug. 25, 2017. The content of both of these applications is hereby incorporated by reference as if set forth in their entireties herewith.

FIELD OF INVENTION

The present invention relates to the field of machine vision systems and methods for determining locations of target elements. The machine vision system captures and uses information gleaned from the captured target elements to determine the locations of these captured target elements.

SUMMARY OF PRIOR ART

In the field of manufacturing and logistics, on the factory and warehouse floors, there is one common primitive action that is under pressure to improve; that is the "Engage and Handle" action. Engage and handle actions apply to machines or man-machine coordination. For example, a major issue afflicting the logistics industry relates to mistakes and inaccuracies in engaging and handling pallets and crates by forklift operators. Accurate operations of forklifts have been dependent on operators' sharp vision resolution, acute distance judgement, experienced parallax reasoning, fine manual maneuvering, correct logical thinking and lasting fatigue endurance. While some operators can do better than others, industry has to accommodate the lowest skilled operators. Crates commonly have footings with large pockets to allow quick insertion of forks. Cargo placing would allow gaps to ease handling and reduce impacts. As a result, space is sacrificed to accommodate forklift operators' errors and inaccuracies. Skillful manpower and the amount of time required for cargo handling are always cost tradeoffs against volume density.

Machines have been historically deployed to help humans handle cargo. When one walks into warehouses, one would see the same varieties of forklifts and operators, and they would have been doing the same thing for half a century. Given the associated inefficiencies described above, currently, well trained operators are still able to outperform computers in operating such machines because such operators have superior and smart vision compared with computers. Those skilled in the art have tried to address this problem by employing machine vision systems. However, such systems rely on complex image processing and expensive artificial intelligence systems to recreate the function performed by human eyes and brains to resolve statuses and positions of objects.

There are major issues on machine vision that have to be addressed before digital technologies may be employed across various fields with minimal errors, speedy handling, increased efficiencies and reduced costs.

Machine vision has been the research subject for those skilled in the art as they seek a practical solution in the field of artificial intelligence to imitate what humans can do on a daily basis. Current works on stereo vision positioning have made relative small progress. This includes some monocular applications which match a scene with pictures and relies on consecutive camera displacements to estimate the position of the camera, which is in principle an easier task than positioning a target. Binocular stereo vision is mostly for focusing at distance measurements for far away targets. Such an area also suffers from the fact that human eyes and brains far outperform machine vision so the solutions are for places that bar human access. Hence current operations on engaging and handling on the industrial floors have changed little over the past decades, as they are dominated by human operators.

The barriers on existing solutions in general are actually more fundamental. Computational complexity controls the feasibility of any methods. There is a limit on how we can model and compute based on traditional camera intrinsic analysis. After extensive computations, any remaining 0.01 percent nonlinearity will create error well beyond the tolerances of resolution requirements. Another reason would be numerical error accumulation when major parameters are the angles of a light ray. A difference of 0.01 degree angle would hit the tolerance limit few steps after calculations have started. When it comes to finding target positions, traditional binocular camera visions run into more inaccuracies. A 0.01 degree angle mechanical mounting deviation will derail the resolution and calibration on the fly is needed. Correspondence findings on separate images from cameras that each have different intrinsic parameters also create accumulated errors beyond tolerance.

SUMMARY OF INVENTION

The above and other problems are solved and an advance in the art is made by systems and method provided by various embodiments in accordance with the invention.

A first advantage of some embodiments of systems and methods in accordance with the invention is its capabilities of response time and positioning accuracy on engaging and handling the objects at close distance A second advantage of embodiments of systems and method in accordance with the invention is its employment of advanced electronics along with mature and simple components.

A third advantage of embodiments of systems and method in accordance with the invention is its degenerated set ups for different applications, including a monocular optical device that positions itself as well as movable objects in one snapshot.

According to a first aspect of the invention, a system for determining, in an optical device's three dimensional coordinate system, locations of target elements within the optical device's field of view is disclosed, the system comprising: the optical device being configured to: capture images of a first target element and a second target element, and obtain a set of constraining rules from the captured images; generate an output $(s, t)$ whereby $(s, t)$ defines a two-dimensional location of the captured image of the first target element on the optical device's sensors; generate an output $(u, v)$ whereby $(u, v)$ defines a two-dimensional location of the captured image of the second target element on the optical device's sensors; a computing device communicatively coupled to the optical device, the computing device being configured to translate the output $(s, t)$ and the output $(u, v)$ into positions in the optical device's three dimensional coordinate system by applying a predetermined traversing scheme together with the captured outputs $(s, t)$, $(u, v)$ and the set of constraining rules to a calibration table, wherein the calibration table was pre-generated by, positioning the optical device at a plurality of calibration positions from a target screen comprising a plurality of target centres, whereby at each calibration position, for each of the target centres on the target screen, the optical device: captures an image of the target centre and associates, in the calibration table, a two-dimensional location of the captured image of the target centre on the optical device's sensor with a position of the target centre relative to the optical device, the position being defined as a location in the optical device's three dimensional coordinate system, whereby the optical device's location is defined as the optical device's three dimensional coordinate system's point of origin.

According to an embodiment of the first aspect of the disclosure, each target element comprises a marker pattern and a signage pattern whereby, the marker pattern further comprises a symmetrical geometrical feature whereby the feature's centre of symmetry defines a centre of the target element, and the signage pattern further comprises a series of indicia whereby a first shape denotes a first state and a second shape denotes a second state, the first and second states being used to represent binary characters.

According to some embodiments of the first aspect of the disclosure, the first state is defined by an indicium having an upper block that is larger than a lower block the second state is define by an indicium having a lower block that is larger than an upper block denotes a second state.

According to many embodiments of the first aspect of the disclosure, the computing device is further configured to obtain the set of constraining rules from the signage patterns associated with the captured images of the target elements.

According to a number of embodiments of the first aspect of the disclosure, the set of constraining rules comprises: a displacement D between the first and second target elements; and a difference in displacement $\Delta d$ between a normal displacement of the first target element from a reference plane and a normal displacement of the second target element from a reference plane, the reference plane being provided a predetermined distance away from the first or second target element.

According to some embodiments of the first aspect of the disclosure, each target element's marker pattern comprises at least a first color and the optical device is provided with a first color sampling filter for detecting the first color.

According to many embodiments of the first aspect of the disclosure, the computing device is being configured to apply the predetermined traversing scheme together with the captured outputs (s, t), (u, v) and the set of constraining rules to the calibration table comprises the computing device being configured to: recursively traverse the calibration table to identify a first point in the optical device's three dimensional coordinate system that is associated with the output (s, t), and traverse the calibration table to identify a second point in the optical device's three dimensional coordinate system that is associated with the output (u, v), such that a distance $D_{12}$ between the first point and the second point is equal to the displacement D between the first and second target elements, such that a difference in displacement $\Delta d_{12}$ between normal displacements of the first point and the second point from the reference plane is equal to the difference in displacement $\Delta d$, and set the first point as a location of the output (s, t) and the second point as a location of the output (u, v) in the optical device's three dimensional coordinate system.

According to a number of embodiments of the first aspect of the disclosure, the computing device is being configured to traverse the calibration table to identify the first point in the optical device's three dimensional coordinate system that is associated with the output (s, t), and traversing the calibration table to identify the second point in the optical device's three dimensional coordinate system that is associated with the output (u, v) comprises the computing device being configured to: generate an arbitrary plane parallel to the reference plane from the calibration table and generate another plane that is provided a distance $\Delta d$ away from the arbitrary plane; identify a point in the arbitrary plane that is associated with the output (s, t) and identify another point in the another plane that is associated with the output (u, v), and set the identified point in the arbitrary plane as the first point and the another identified point in the other plane as the second point.

According to some embodiments of the first aspect of the disclosure, the computing device is being configured to traverse the calibration table to identify the first point in the optical device's three dimensional coordinate system that is associated with the output (s, t), and traverse the calibration table to identify the second point in the optical device's three dimensional coordinate system that is associated with the output (u, v) comprises the computing device being configured to: generate an arbitrary plane parallel to the reference plane from the calibration table and generate another plane parallel to the reference plane that is provided a distance $\Delta d$ away from the arbitrary plane; identify a point in the arbitrary plane that is associated with the output (s, t) and plot a sphere centred on the identified point, the sphere having a radius D; identify another point in the another plane that intersects with the sphere and determine if the another point is associated with the output (u, v), and if it is determined that the another point is associated with the output (u, v), set the identified point in the arbitrary plane as the first point and the another identified point in the another plane as the second point.

According to many embodiments of the first aspect of the disclosure, the computing device is being configured to identify the point in the arbitrary plane parallel to the reference plane that is associated with the output (s, t) comprises the computing device being configured to: perform linear interpolation on each side of the arbitrary plane to identify points that are associated with the s value in the output (s, t) whereby points on separate sides are connected to form a line segment $L_S$; and identify from the line segment $L_S$, a region containing the point associated with the output (s, t).

According to a number of embodiments of the first aspect of the disclosure, the computing device is being configured to identify the another point in the another plane that is associated with the output (u, v) comprises the computing device being configured to: perform linear interpolation on each side of the another plane to identify points that are associated with the u value in the output (u, v) whereby points on separate sides are connected to form a line segment $L_U$; and identify from the line segment $L_U$, a region containing the point associated with the output (u, v).

According to some embodiments of the first aspect of the disclosure, the computing device is being configured to identify the point in the arbitrary plane that is associated with the output (s, t) comprises the computing device being configured to: perform a local gradient search from an arbitrary point on the arbitrary plane to identify a gradient vector that results in a minimum value; recursively perform the local gradient search from the gradient vector across relevant points on the arbitrary plane until a point having a minimum value is identified, the point being identified as the point in the arbitrary plane that is associated with the output (s, t) whereby, the local gradient search is performed using the two-dimensional locations on the optical device's sensor that are associated with each point in the calibration table.

According to many embodiments of the first aspect of the disclosure, the computing device is being configured to identify the another point in the another plane that is associated with the output (u, v) comprises the computing device being configured to: recursively perform a local gradient search from an arbitrary point on the another plane to identify a gradient vector on the another plane that results in a minimum value, recursively perform the local gradient search from the gradient vector across relevant points on the another plane until a point having a minimum value is identified, the point being identified as the point in the another plane that is associated with the output (u, v) whereby, the local gradient search is performed using the two-dimensional locations on the optical device's sensor that are associated with each point in the calibration table.

According to a number of embodiments of the first aspect of the disclosure, the system further comprises the computing device being configured to: apply spatial interpretation to points in the region bounding the point associated with the output (s, t) to define the point in decimal places if the points in the region only comprises integers; and apply spatial interpretation to points in the region bounding the point associated with the output (u, v) to define the point in decimal places if the points in the region only comprises integers.

According to some embodiments of the first aspect of the disclosure, a first set of data in the calibration table was pre-generated at an ambient temperature, and at least one additional set of data in the calibration table was pre-generated at another temperature, whereby the computing device being configured to translate the output (s, t) and the output (u, v) into positions in the optical device's three dimensional coordinate system by applying a predetermined traversing scheme together with the captured outputs (s, t), (u, v) and the set of constraining rules to the calibration table further comprises the computing device being configured to: compute gradients of thermal expansion based on the first and the another set of data in the calibration table; obtain an ambient temperature of the optical device; normalize the positions in the optical device's three dimensional coordinate system associated with the output (s, t) and the output (u, v) using the ambient temperature and the computed gradients of thermal expansion.

According to many embodiments of the first aspect of the disclosure, the optical device is being configured to generate the two-dimensional location of the captured image of the target element on the optical device's sensors comprises the optical device being configured to: identify a shape representing a center of the target element; determine the geometric center of the identified shape; assign x-axis and y-axis vector values to edges of the identified shape; and determine accumulated deviations along the x-axis and y-axis using the x-axis and y-axis vector values assigned to the edges of the identified shape.

According to a second aspect of the invention, a system for determining, in a first optical device's three dimensional coordinate system, locations of target elements within the first optical device's field of view is disclosed, the system comprising: the first optical device being configured to: capture an image of a first target element; generate an output (s, t) whereby (s, t) defines a two-dimensional location of the captured image of the first target element on the first optical device's sensors; a second optical device provided at a fixed location away from the first optical device, the second optical device being configured to: capture an image of the first target element; generate an output (u, v) whereby (u, v) defines a two-dimensional location of the captured image of the first target element on the second optical device's sensors; a computing device communicatively coupled to the first and second optical devices, the computing device being configured to translate the output (s, t) and the output (u, v) into positions in the first optical device's three dimensional coordinate system by applying a predetermined traversing scheme together with the captured output (s, t) to a first calibration table and by applying the predetermined traversing scheme together with the captured output (u, v) to a second calibration table, wherein each of the calibration tables was pre-generated by, positioning an optical device associated with the calibration table at a plurality of calibration positions from a target screen comprising a plurality of target centres, whereby at each calibration position, for each of the target centres on the target screen, the associated optical device captures an image of the target centre and associates, in the calibration table, a two-dimensional location of the captured image of the target centre on the associated optical device's sensor with a position of the target centre relative to the associated optical device, the position being defined as a location in the associated optical device's three dimensional coordinate system, whereby the associated optical device's location is defined as the associated optical device's three dimensional coordinate system's point of origin.

According to some embodiments of the second aspect of the disclosure, the applying the predetermined traversing scheme together with the captured output (s, t) to the first calibration table and the applying the predetermined traversing scheme together with the captured output (u, v) to the second calibration table comprises the computing device being configured to: a) traverse the first calibration table to identify a first point in the first optical device's three dimensional coordinate system that is associated with the output (s, t) and traverse the second calibration table to identify a second point in the second optical device's three dimensional coordinate system that is associated with the output (u, v); b) normalize the identified second point with respect to the location of the second optical device relative to the first optical device; and c) repeat steps (a) to (b) if the location of the normalized identified second point is not equal to the first point, whereby the first point is set as the location of the output (s, t) if the normalized identified second point is equal to the first point.

According to a third aspect of the invention, a system for determining, in a first optical device's three dimensional coordinate system, locations of target elements within the first optical device's field of view, the system comprising: the first optical device being configured to: capture an image of a first target element; generate an output (s, t) whereby (s, t) defines a two-dimensional location of the captured image of the first target element on the first optical device's sensors; a second optical device provided at a fixed location with reference to the first optical device, the second optical device being configured to: capture an image of a second target element, the second target element being provided at a location $D_{T2}$ away from the first target element; generate an output (u, v) whereby (u, v) defines a two-dimensional location of the captured image of the second target element on the second optical device's sensors; a computing device communicatively coupled to the first and second optical devices, the computing device being configured to obtain a set of constraining rules from the captured images translate the output (s, t) and the output (u, v) into positions in the first optical device's three dimensional coordinate system by applying a predetermined traversing scheme together with the captured output (s, t) and the set of constraining rules to a first calibration table and by applying the predetermined traversing scheme together with the captured output (u, v) to a second calibration table, wherein each of the calibration tables was pre-generated by, positioning an optical device associated with the calibration table at a plurality of calibration positions from a target screen comprising a plurality of target centres, whereby at each calibration position, for each of the target centres on the target screen, the associated optical device captures an image of the target centre and associates, in the calibration table, a two-dimensional location of the captured image of the target centre on the associated optical device's sensor with a position of the target centre relative to the associated optical device, the position being defined as a location in the associated optical device's three dimensional coordinate system, whereby the associated optical device's location is defined as the associated optical device's three dimensional coordinate system's point of origin.

According to some embodiments of the third aspect of the invention, the set of constraining rules comprises: a displacement D between the first and second target elements, where D comprises a value greater than 0 or equal to 0; and if the value of D is greater than 0, the set of constraining rules further comprises a difference in displacement $\Delta d$ between a normal displacement of the first target element from a reference plane and a normal displacement of the second target element from a reference plane, the reference plane being provided a predetermined distance away from the first or second target element.

According to many embodiments of the third aspect of the invention, the applying the predetermined traversing scheme together with the captured output (s, t) and the set of constraining rules to the first calibration table and the applying the predetermined traversing scheme together with the captured output (u, v) to the second calibration table comprises the computing device being configured to: a) traverse the first calibration table to identify a first point in the first optical device's three dimensional coordinate system that is associated with the output (s, t) and traverse the second calibration table to identify a second point in the second optical device's three dimensional coordinate system that is associated with the output (u, v); b) normalize the identified second point relative to the first optical device by using the fixed location of the second optical device; and c) repeat steps (a) to (b) if a displacement $D_{12}$ between the first point in the first optical device's three dimensional coordinate system and the normalized identified second point is not equal to the displacement D between the first and second target elements, and if a difference in a displacement $\Delta d_{12}$ between normal displacements of the first point and the normalized second point from the reference plane is not equal to the difference in displacement $\Delta d$, whereby the first point is set as the location of the output (s, t) and the normalized second point is set as the location of the output (u, v) in the first optical device's three dimensional coordinate system if the conditions in step (c) are met.

According to various embodiments of the first, second or third aspects of the invention, the computing device is further configured to employ location information relative to a global coordinate system in the constraining rules to extract positioning information about the optical device relative to a global system.

BRIEF DESCRIPTION OF THE DRAWINGS

The above and other problems are solved by features and advantages of a system and method in accordance with various embodiments of the present invention described in the detailed description and shown in the following drawings.

DETAILED DESCRIPTION

Figure 1:
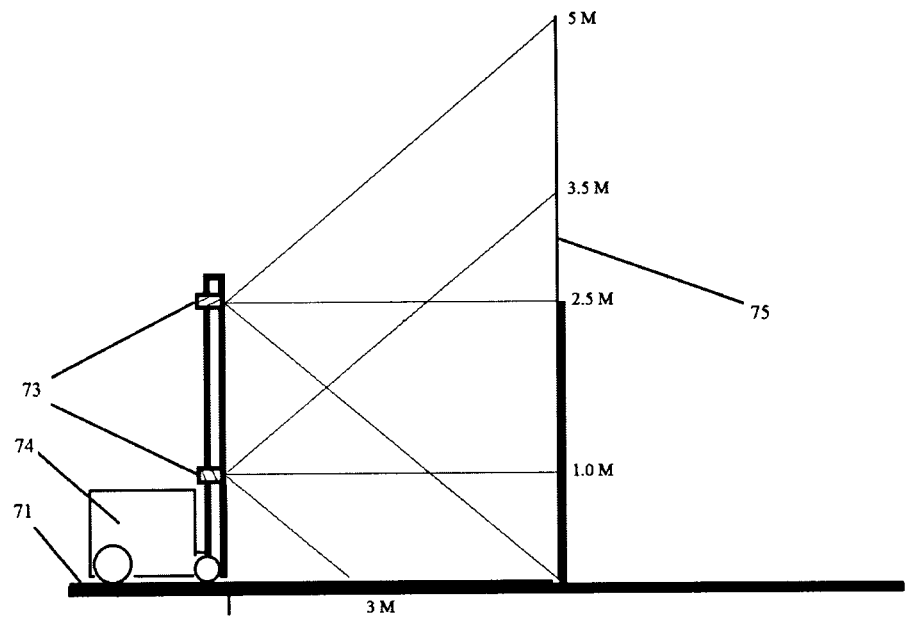
FIG. 1 illustrating a setup for the calibration of an optical device in accordance with some embodiments of the invention.

This disclosure relates to a machine vision system that may be used for example in, but not limited to, manufacturing or logistic operations in an environment where labelling and signage can be provided whereby the system is used to assist the approaching, docking, picking, piling processes that take place in such operations. Its implementation employs imaging sensors, fast computation and random access memory. In summary, the environment in which the machine vision system is used should have:

1) Proper lighting and limited moving objects;
2) Confined facility of limited 3 dimensional space;
3) Occupied space such that markers and signs may be strategically placed for machine vision purposes;
4) Space with expected scene and knowledge guidance;
5) Mid to low speed object actuations;

There are two types of information that may be extracted from the machine vision system and this information relate to positioning and coding. With regard to the positioning, the machine vision system only expects to process a limited range of expected scenes that are quasi-stationary. The machine is given an expected close range three-dimensional scene, together with expected target elements affixed in advance. The main task for the machine vision system is to then identify the target elements and to obtain the positions of the identified target elements. Sub-unit-length pixelated interpretation and spatial interpretation may be employed to increase the positioning accuracy. Smart methods are employed to obtain positioning information of all target elements within the field of view and this is accomplished at frame rate.

With regard to the coding, signage comprising machine Braille code is described in detail in the following sections, and these signage provide essential information to the machine vision system. In fact, each target element can be considered to comprise of two parts, a first part having a marker pattern that includes a target centre position and a signage pattern that includes machine Braille code. The code in the signage pattern not only includes position related information, but also acts as authentication means to verify the authenticity of a target element. Typically, one or more target elements will be affixed onto an object. This is done to ensure that information about the orientation of the object may be obtained upon positioning of more than one target point and to ensure that the functioning of the machine vision system is not compromised when certain target elements become missing or are obstructed. For example such a situation will more frequently occur when target elements are provided at ground level.

Specifically, various embodiments of the present invention involves the relative positioning of the target elements on cargos, containers, pallets, actuated machines, conveyors, bins, ground, pillars and walls. The machine vision system then continuously monitors the relative positions of a pair or set of target elements so as to have optimal actuation results. The relative positioning based on labelled target elements on movable objects is innovative and effective as the target based machine vision recognizes and detects multiple targets and their 3-dimensional positions using a set of processing techniques.

In a preferred embodiment, the range of the machine vision is within several meters from the optical detectors, and a resolution of about 1 cm is achievable within this range. The image resolution may be 4k to 8k and locations of target elements may be derived in frame rates of either 30 frames per second or 60 frames per second.

It should be appreciated that the described machine vision solutions can be applied toward other object handling processes beyond logistics and manufacturing including, but not limited to, any traditional tasks that may be carried out using computer vision.

Optical Device Calibration

Individual optical devices, such as, but not limited to, cameras having conventional image sensors (charge coupled device image sensors, complementary metal-oxide semiconductor sensors, etc.) each refract light rays in their own unique intrinsic manner.

In accordance with some embodiments of the invention, the machine vision method is initiated by calibrating an optical device as follows. Target points are first provided in front of the optical device in a 3-dimensional range of interest. The s-th and t-th pixel of the sensor array that best corresponds to the center of a target point is then recorded and this is repeated for all the target points until s and t values have been assigned to all the target points. Such s and t values may be recorded as a fraction of an integer and this shows that the subsequent identification method results in much finer readings when interpolation is carried out to obtain the precise locations of target points.

An embodiment of the calibration of an optical device for providing the positioning information of target points is shown in FIG. 1. This Figure illustrates an optical device that is to be calibrated being mounted on a vehicle 74 (that is preferably riding on a precision rail 71). A calibration screen 73 having target centres or target elements that comprise a plurality of target points 79 surrounding a centre of screen pattern 77 is then presented to the optical device that is to be calibrated (see FIG. 2). It should be noted that the optical device may be attached at more than one height location 73 if more than one height range is to be calibrated.

In some embodiments of the invention, the calibration screen 75 utilizes a screen of 5 m wide and 5 m tall. One skilled in the art will recognize that the size of the screen may be increased or decreased as required and does not limit the invention in any way.

Typically, an image captured by a wide angle camera is not linear, and the positioning conversions are also complicated. As such, the multiple dimensional computation issue is resolved with use of the calibration table. The use of such a table negates the need for conventional non-linear and complicated calculations for each individual optical device.

Figure 2:
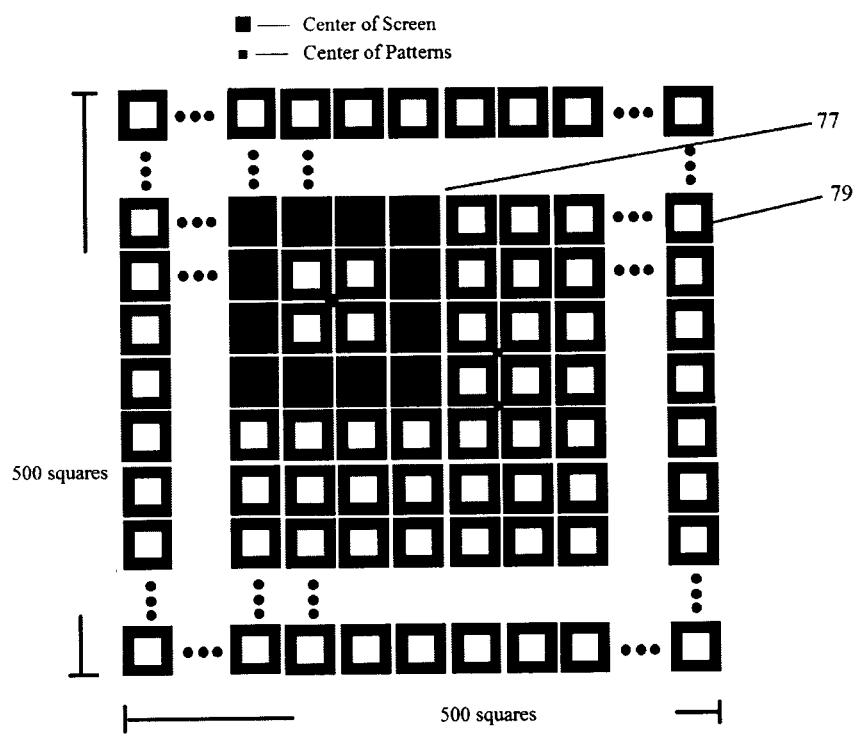
FIG. 2 illustrating a calibration screen used in the calibration setup shown in FIG. 1 in accordance with some embodiments of the invention.

The patterns on the target screen in accordance with some embodiments are illustrated in FIG. 2 with the center of screen pattern 77 being represented by a small rectangle surrounded by white squares which are in turn surrounded by black squares. This center of screen 77 is then surrounded by target points represented by squares 79. One skilled in the art will recognize that the centre of screen pattern 77 and the target points' squares 79 may be replaced by other geometrical shapes without departing from this invention. Further, one skilled in the art will recognize that although FIG. 2 only illustrates about a hundred target points as represented by the squares, multiple centres of screens and much more target points may be provided on the target screen without departing from the invention. In various embodiments of the invention, there should be upwards of 250,000 target points provided on the target screen.

While it seems hard to display the 2 dimensional location information on the calibration screen, such information is obtained by a counting step. As stated above, a single unique centre of screen pattern may be placed in the centre of the target screen so that locations all the 250,000 target points can be identified by counting in horizontal and vertical directions away from this of screen pattern. The processing of the images in the calibration process can be carried in-situ or can be uploaded to a central computer for calculation and then downloaded as processed tables in a shorter time.

In the calibration step, the optical device will capture an image of a target point on the target screen. The image of the captured target point will be clustered as a particular group of pixels on the image sensor of the optical device. A computing device will then record the coordinates and light intensities of the pixels as captured by the image sensor of the optical device. Knowledge guided and pixelated interpretation methods are then employed to represent the target points by the row and column numbers of the geometric centre of the shape augmented with fractions based on the intensity and contribution in the 2 dimensions. In embodiments of the invention, such coordinate plus fractional adjustments are identified as the (s, t) reading of a target point, which may comprise a decimal number ranging between negative 5000.00 and 5000.00.

A database device then enters the recorded (s, t) readings into a look-up table stored within the database device. As these (s, t) readings are entered into the look-up table, addresses of such readings in the memory device are associated with their respective (x, y, z) integer coordinates. The target screen's has three axes, whereby each axis has their origin at the location of the camera, with the x-axis being perpendicular to both the camera's shooting direction and the vertical direction, the y-axis being the camera's shooting direction, and the z-axis being in the vertical direction. In embodiments of the invention, these coordinates may be in increments of 1 centimeter. While these are integer numbers, it shall be elaborated in later section as to how the locations will be spatially interpreted into decimal numbers, ranging between −5000.00 and 5000.00 in embodiments of the invention. Note that the calibration table entries are in integers.

The steps above are then repeated for all the target points provided on the screen. Once all the target points have had their respective (s, t) coordinates associated with the screen's three-dimensional coordinates (x, y, z) and added to the look-up table in the database device, the optical device is then moved to another calibration position which is slightly closer to the screen. In embodiments of the invention, the optical device is moved closer to the target screen by 1 centimetre. By the end of this calibration step, the look-up table in the database device would have been populated with the various (s, t) readings along with their associated (x, y, z) coordinates.

In some embodiments of the invention, during machine vision applications, the optical device may be actuated to a different height to avoid its line of sight from being blocked, horizon crowding (elaborated in the Target Element based Stereo Machine Vision section) or to obtain better vision. As a trade-off between computer memory and physical measurement difference, one may either create two calibration tables for the two optical device heights or use one table whereby the z-axis in the (x, y, z) coordinates are adjusted accordingly. For example, if measurements are to be obtained using an optical device at a height of 20 centimeters, a calibration table that were previously obtained using an optical device at a height of 250 centimeters may be utilized and this is done by retrieving the (s, t) values associated with location (x, y, z) at (x, y, z-230) in the calibration table.

An important factor is that these readings are reproducible. This means when we put a target point at a location with coordinates of (x, y, z) relative to the optical device coordinate (0, 0, 0) at another time, the optical device readings will always be the same pair of numbers as those stored in the calibration table. To support such factor, we shall from time to time adjust the calibration or proceed with overall recalibration. While certain factors may be done by recalibration, we shall detail "calibration on the fly" in a later paragraph.

Conversely, if a target point is placed at a location where the optical device reads (s, t), the calibration table can then be traversed to find a set of neighbouring locations in the calibration table such that the readings are near to (s, t) readings. Spatial interpretation may then be used to find the location having coordinates (x, y, z), now in decimal numbers, that closely matches the (s, t) readings. The obtained (x, y, z) coordinates then show the actual x, y, z coordinate values of a physical point from the origin of the optical device.

Onsite Calibration and On-the-Fly Calibration

As one might note, the precision of the machine vision system depends on the repeatability of physical readings (the sub-pixel locations) obtained from the optical device. To maintain such repeatability, in addition to a manufacturer's calibrations that may be performed in the factory, onsite calibration is needed. There are 2 major factors affecting repeatability:
   a) Displacement. The angle and position of the sensor relative to ground or vehicle may be displaced due to external forces.
   b) Environmental Parameters. Temperature and humidity are the main factors.

In some embodiments of the invention, periodic on site calibration may be performed. This would involve a single target element being placed in front (e.g. 1.5 meter) of the optical device. The calibration is performed by normalization using software. There are also adjustments on the fly, done automatically based on factory calibrated parameters. Examples are environmental parameters, for example, temperature and humidity which would cause normalizations on the fly. In the case that inclinometers and gyros are affixed to the vehicle that the optical device fixture is mounted, these inclination readings will be used to normalize the vertical angle on the fly. Another adjustment on the fly was described earlier, that is focus ratio normalization, whenever focusing is performed There is another method for actuation machines when machine parts (arm) are stretched to approach an object to insert or pickup. When the relative positions between the targeted object and the arm are to be obtained, factors affecting repeatability are cancelled out. That means a target element is affixed at the front of the arm, in the line of sight of the optical device.

It should be noted that the thermal expansion coefficient factor causes dimension variations between 60 and 300 micron per meter depending on the type of material that is used. For sensors that have a width of 30 mm, thermal expansion causes an expansion between 2 and 10 microns. This means that for a device implemented with 6k sensors, this shift accounts for up to 2 pixels over said temperature range. As optical devices in this disclosure employs subpixel resolution, with each optical device's readings of (s, t) being in decimal numbers, temperature calibration on the fly is necessary.

Various studies all point to the fact that roughly 0.01% change exists on optical parameters (except focal length, which is 10 times worse) between 0 degree C. and 30 degree C. The experimental data on image shifting over temperature range of 30 degrees C. support the fact that several factors of the same magnitudes, for example, expansion coefficient of other parts of the device and the scene within range come in. Ideally, if objects, camera structures and silicon substrates all have same expansion coefficient, then adjustments are not required. In practical implementations, changes in calibration values under various temperature conditions have to be obtained. Ideally, each pixel may represent 1 mm variation on x position, depth perception, similar to focal length, or worsens by an order of magnitude. Horizon crowding as described in another section also causes resolution worsening by an order of magnitude.

The implementation of such on the fly calibration is practically doable, again based on the table lookup methods, with the following approaches:
a) Full scale gradient. The optical device is initially calibrated using the same process, and this calibration is repeated at 10 degrees C., 25 degrees C. and 40 degrees C., respectively. The calibration tables are then interpolated or extrapolated in between the 3 ranges in the calibration table for each (x, y, z) entry using the gradients of thermal expansion as computed below.
  For example, a calibration reading for CT(x, y, z) is first obtained, which is (s1, t1) at 25° C., (s2, t2) at 40° C., (s3, t3) at 10° C.
  For temperature T between 5° C. and 25° C., the CT (x, y, z) at temperature T should be s=s2−(25−T)/15*(s2−s1) t=t2−(25−T)/15*(t2−t1)
  For temperature T between 25° C. and 45° C., the CT (x, y, z) at temperature T should be s=s2+(T−25)/15*(s3−s2) t=t2+(25−T)/15*(t3−t2).
  The above steps may be applied to all the points in the calibration table (CT) to carry out on the fly calibration of the calibration table for a temperature T.
b) Sampled gradient. Calibrate with full table at 25 degree, C then perform sampling calibration every 3 cm in the x, y and z axes at 10 degree C. and 40 degree C., respectively. The gradients toward lower or higher temperatures respectively are obtained at each centre of the 27 cubic centimetre based on the readings at 10 degree C., 25 degree C. and 40 Degree C. The use of calibration table is based on the complete table for 25 degree C. adjusted with the associated gradient. Such sampled gradient table is only 8% the size of the complete table at 25 degree C.

Machine Braille

Figure 3:
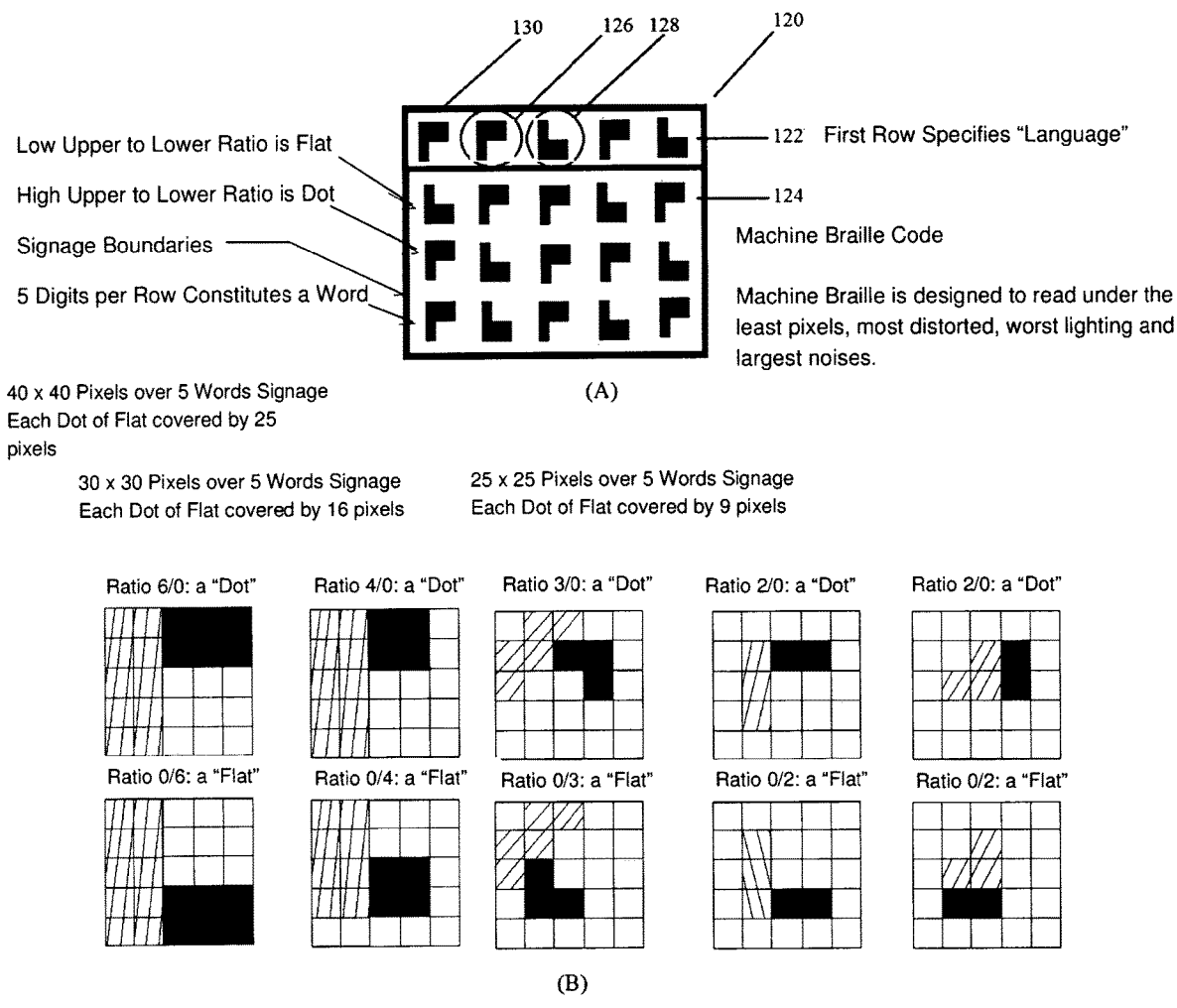
FIG. 3 illustrating a format of a machine Braille code in accordance with some embodiments of the invention.

Braille code has the fundamental nature that flat and dot_information is presented in a 2 dimensional plane. A machine Braille code format is proposed as shown in FIG. 3(A). This format was proposed based on the criteria of maximum signal to noise ratio under unpredictable distortion, reduced pixel resolution and varying lightings. The proposed machine Braille code format employs binary coding and two-dimensional relative positioning. Machine signage 120 comprises a header 122 followed by information 124. Each machine Braille "dot" 126 is represented by a mirrored '7' symbol which can be described as an indicia with an upper block and each "flat" 128 is represented by an 'L' symbol which can be described as an indicia with a lower block. Indicia with the upper block are used to define a first state while indicia with the lower block are used to define a second state. Codes extend vertically within a square signage boundary 130. For different environments, there may be a need for a different set of "language" for machine Braille code. The header 122 specifies the language of a signage. When an indicium is read clockwise and is determined to be from thin to thick, this indicium is defined as a "dot" and when an indicium is read counter clockwise and is determined to be from thin to thick, this indicium us defined as a "flat". This property assists in the interpretation of the indicia from any direction.

This code enjoys the best signal to noise ratio under uncertainty of shape distortion, lighting condition, sensor resolution and approaching angle. In short, the proposed machine Braille format is able to achieve high resolution under various conditions.

FIG. 3(B) shows readings obtained at different angles and under variable light conditions based on a 1 or 0 reading at each pixel. The machine Braille is designed with "1" and "0" at a flip or flop status. Bit information is then extracted from relative readings of the flip-flop.

Figure 4:
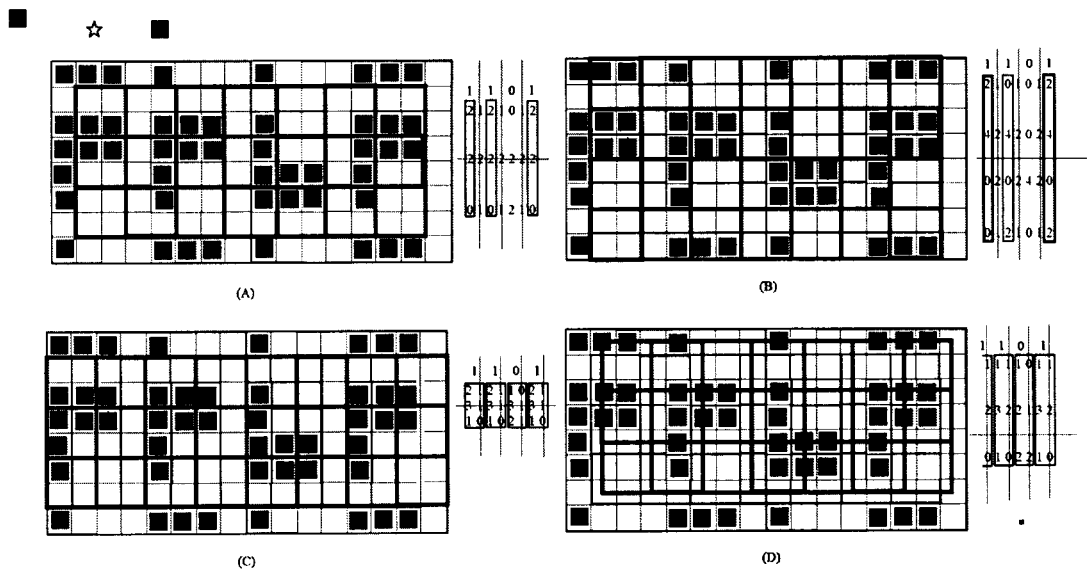
FIG. 4 illustrating an interpretation of the machine Braille code shown in FIG. 3 in accordance with some embodiments of the invention.

The feature of clockwise thin to thick representing one state and counter clockwise thin to thick representing the other state make it direction resisting. In applications where signage is placed up side up, the machine Braille code bits can be closely positioned. FIG. 4 shows the tightest "page" where the bits are tightly positioned, while there is a gap at the left and the bottom with the same width as that for the bar mentioned above. Here, 4 reading levels are analysed at each pixel. Assuming the camera resolution is 6K, the camera angle of view is 120 degrees and the distance is 9 meters. In such a situation, the pixel resolution is 0.5 cm and taking into account the effect of non-linearity, this reduces the resolution by 150%. Hence, such machine Braille markers may be safely read at 6 meters away. The bit information is 2 pixels in width and 2.5 pixels in height. That is it is 1 cm wide and 1.25 cm tall, inclusive of a 0.25 cm gap on the left side and a bottom side gap. The bit density would be 0.8 per square cm hence 80 bits of information may be read on a signage of 10 cm square.

The grids superimposed on each of the squares in FIG. 4 represent the pixels. The underlining pixel positions shows how shifted sensor position in all cases still allows rows and bit sequencing to be recognized and for the 1's and 0's to be decoded. Note that each 1 or 0 state is not represented by being dark or white, but by flip-flop's so as to counter lighting variations and other noises. In FIG. 4(B) the pixels shift up one half pixel distance. In FIG. 4(C) the pixels shift left half pixel distance. In FIG. 4(D) pixels shift up a quarter pixel distance and shift right a quarter distance. These shifts represent the worst case shifting. Pixel responses are recorded for all 4 levels, with the obtained patterns shown in a table adjacent each of the figures. It can be noted that the reading method works under any shifting between the image and the sensors in all 4 directions.

Upon taking a snap shot of a signage, as long as the machine Braille code (plus gap) size is equal or larger than twice of the pixel distance, the pattern of horizontal lines representing the separations of code rows and patterns of vertical lines representing the sequencing of the code bits may be identified. In between the row line and bit sequencer, the flip flop may be identified and its state of flip or flop may be read. The left hand side bar gives boundary information as well as defines weightage areas.

It should be noted that the machine vision system is employed not only for analysing the environment, but also to read coded instructions and information, including the physical area or location of the machine vision device itself. In addition to being provided on walls, pillars, bins, cargos, vehicles, human, the signage can also be provided on the floor or at the ground level.

Target Element

Figure 5:
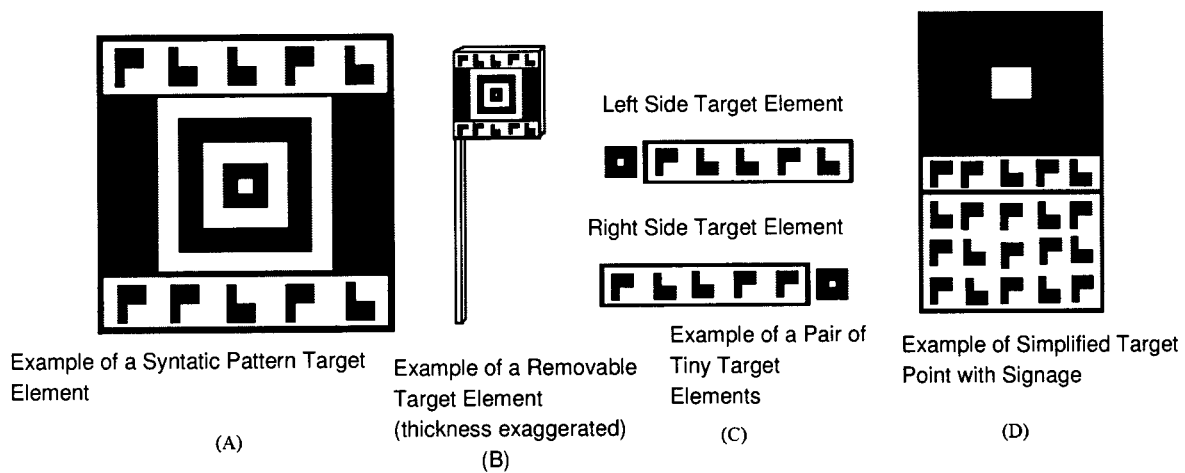
FIG. 5 illustrating target elements in accordance with some embodiments of the invention.

A target element is designed with a marker pattern having symmetric geometrical features and a unique color and a signage pattern having codes contained therein as shown in FIG. 5. The symmetric geometrical feature in the marker pattern defines the center of the target point. Unique colors and patterns are employed so that the marker pattern can be easily filtered during the detection step. The signage pattern in each target element contains codes that may be read by machine vision systems. In short, the target elements may be regarded as a unique sign comprising machine codes with pertinent target information and a marker pattern of_symmetric geometric figure having a target center. The machine codes in the signage pattern also provide a means to verify the authenticity of the captured image as a target point, as opposed to noise or unrelated patterns.

The first task for the target element based machine vision is element detection. First, knowledge guidance is employed. The machine vision system is applied at an expected scene and hence, location/sizes of the target elements are known as windows of interest.

Figure 6:
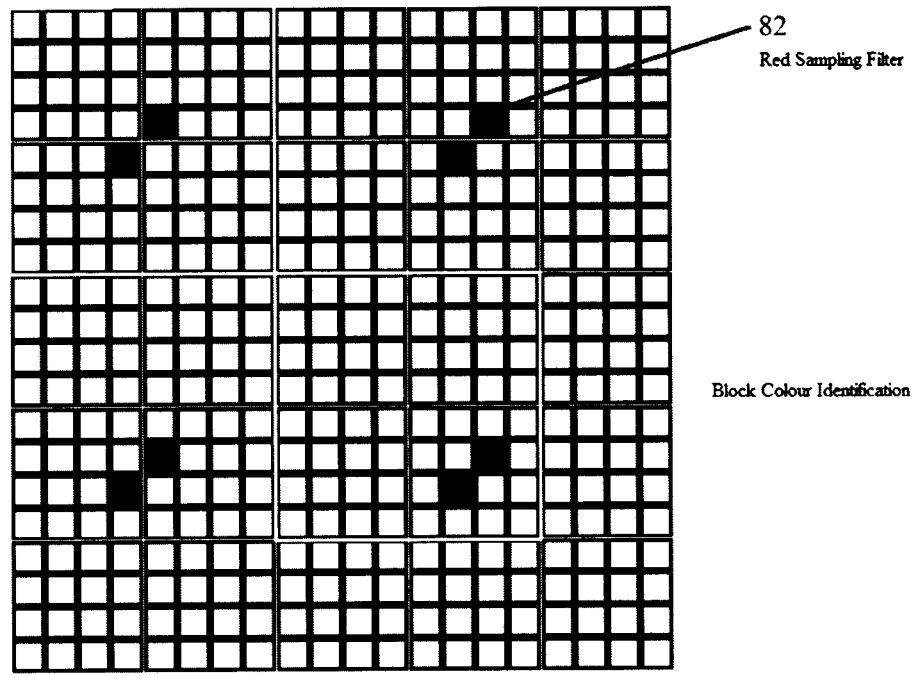
FIG. 6 illustrating a mono-color sampling filter in accordance with some embodiments of the invention.

A mono-color sampling filter is utilized in some embodiments of the invention and such a filter is illustrated in FIG. 6. This filter is employed to detect patterns having certain colors and does so by filtering out windows having a specific unique color or pattern. In FIG. 6, it is assumed that the filter is designed to filter out the color red, i.e. only allows red colored images to pass through to the sensors in the optical device. In operation, one or a set of single color filters 82 are repeated at desired sampling locations on top of the image sensor. For a captured image having the selected color, the sampling filter will not affect image's resolution. For a captured image having other colors, the sampling filter will block the other colors. Hence, the filter does not sacrifice any resolution on the pattern in the representing color.

For example, a single color such as red may be used in the target element. However, one skilled in the art will recognize that other colors may be used without departing from this invention provided that a corresponding color filter is utilized. A pair of red filters is then applied to every 10×10 sponsored block. The use of the pair of red filters increases the signal noise ratio, and also in the situation where one of the filtered sensors is not working properly, the other filter sensor will still detect the required color thereby representing both filter sensors. Such a sampling setup reduces the scanning time of a 20 mega pixel sensor to less than 0.2_milliseconds.

Figure 7:
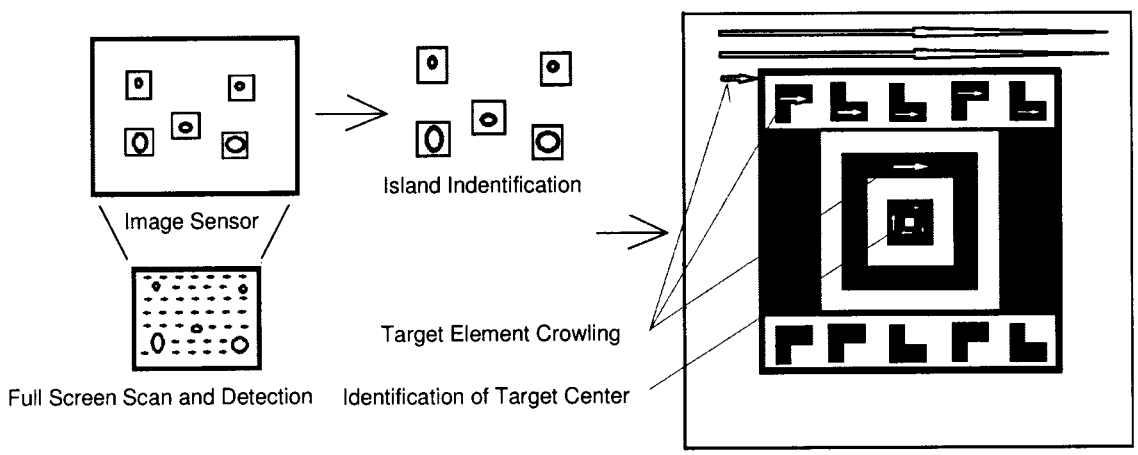
FIG. 7 illustrating knowledge guided recognition of target elements in accordance with some embodiments of the invention.

Areas on the target element then need to be verified using the machine Braille code. Further information in machine Braille code may be set out at the bottom of the target element to provide additional information. A tracing algorithm can be employed to verify and read the machine Braille code efficiently via combined detections of syntax and geometry Each target pattern may also comprise a combination of geometric and syntactic patterns, whereby knowledge guided recognition may be applied to detect and verify the existence and a centre of the target element. This is shown in FIG. 7. Using typical recognition algorithms, a crawler configured for both crawling distance and topological relations is employed. Upon identifying the target element, the crawler performs random access based on distance and knowledge guidance. The time taken for identification of the target element centre is greatly reduced due to the knowledge guidance. Due to the possibility of having varying imaging sizes, there are 2 modes of patterns in the target element—a first mode comprising a large outer pattern for a small image and a second mode comprising small inner patterns for a larger image. Maximum 60,000 arithmetic operations are estimated to be required to complete the tasks of locating all the target element centres. Hence, a 3 GHz processor can be configured to complete the computations of the algorithm in about 1 millisecond depending on the computer language employed. All remaining algorithms can be carried out in another 1 millisecond.

Figure 8:
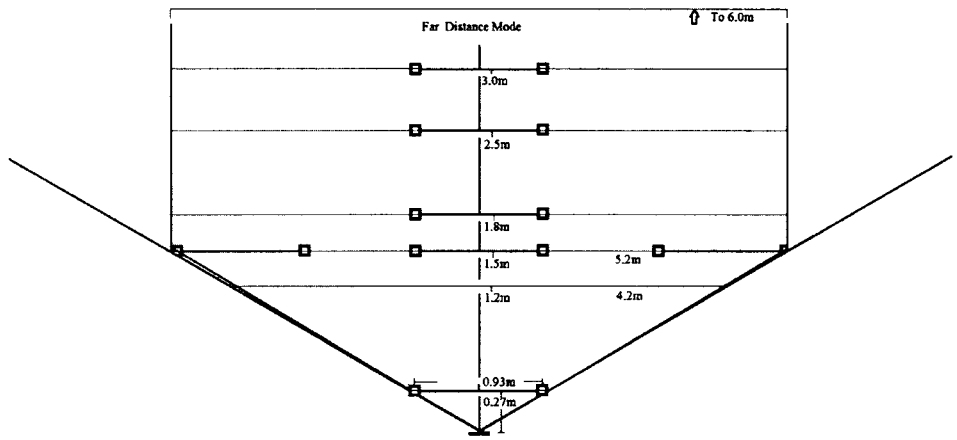
FIG. 8 illustrating an angle of view of an optical device in accordance with some embodiments of the invention.

The above section described the main function of the machine vision, which is to locate the positions of target element within 1 cm of accuracy and within a distance of between 0.3 m and 3 m away from the cameras. The second function of the machine vision is to locate the positions of target elements a remote/long distance away from the optical device (3 to 12 m from cameras). At remote distances, the calibration look up table is set up at 5 cm apart, with positioning accuracy relaxed to 5 cm. Due to the smaller images of target elements when these elements are at long distances away from the optical device, the angle of view starts to converge as shown in the field of view plot of our optical device in FIG. 8. In this remote vision mode, response time is lengthened to provide the system with the time needed for focusing which is needed with the distance.

The target elements described earlier were shown as examples in FIG. 5. The 2-dimensional target element can be, for example, a 10 cm square as shown in FIGS. 5(A) and (B). A tinier format of the target element that is suitable for flat spaces is shown in FIG. 5(C). Each target element contains a unique header (signage pattern) and a marker pattern for identification and vector information leading to the centre of the target elements (centre of the marker pattern). The pattern on the target element and its centre shape may comprise a geometrically symmetric pattern whereby the centre of symmetry of the pattern is easily identified to be the geometric centre of the marker pattern. As mentioned above, the contents on each target element can be a special type of signage coded in machine Braille. When more information is incorporated in a target element, a menu in machine Braille in can be provided as shown in FIG. 5(D).

Optical Device Implementation

In some embodiments of the invention, the cameras used may have 20 million sensors, a mature camera technology. Camera manufacturers nowadays produce cameras having sensors of around 50 to 120 million pixels. Lenses with 120 degrees angle of view are also easily available. Due to the effects of distance and the intrinsic nature of wide angle lenses in general, in a theoretical worst case scenario, we assume images distort 150% at the periphery of the viewing area. When the distance of a target element is 1.5 m away from the optical device, a 10 cm by 10 cm target element covers 14,400 pixels. At a distance of 3 m and due to the effects of non-linearity, 10 cm target elements, at worst, are represented by about 1600 pixels. This is acceptable as a centre of the target element can be precisely calculated to sub-mm distances based on the centre block of the target element. Machine Braille of up to 5 words are also easily read from 40×40 pixels. In fact, it has been determined that 2 cm wide machine Braille code can be read 6 metres away under 150% distortion factor.

In relation to processing speed, one of the limitations relates to frame readout speed, or frame rate. The industry accepted speed is 30 milliseconds per frame. For a camera sensor comprising 20 million pixels, at the current technology, downloading an image taken by such a camera may require 15 milliseconds with multiple readout channels. Vision computations only require relatively localised data, as such image processing of the received image may begin within a few milliseconds after the readout has started, when a group of rows has been fully cropped. The positioning computation requires only several milliseconds and hence the total delay may be confined to 20 milliseconds. With a linear speed limit being 200 cm/s, positioning difference due to sampling delay can be limited to within 4 cm.

Furthermore, in smartphone cameras, 20 million pixels are mapped onto random access circuits in 15 milliseconds. The only shortfall relates to the horizontal angle of view at 650 which can be addressed by developing 900 and 1200 angle of view cameras within the scope of smartphone technologies. It should be noted that there is no need for a linear image to be precise. However, higher pixel resolution is desired and less distorted image offers that higher resolution.

Focus Ratio Adjustment

While narrow aperture is used for short range vision, focusing may be needed when the vision system is used in long range mode, say beyond 6 meters. The (s, t) (u, v) readings then have to be adjusted with an appropriate focus ratio to normalize the scaling due to focusing.

Figure 9:
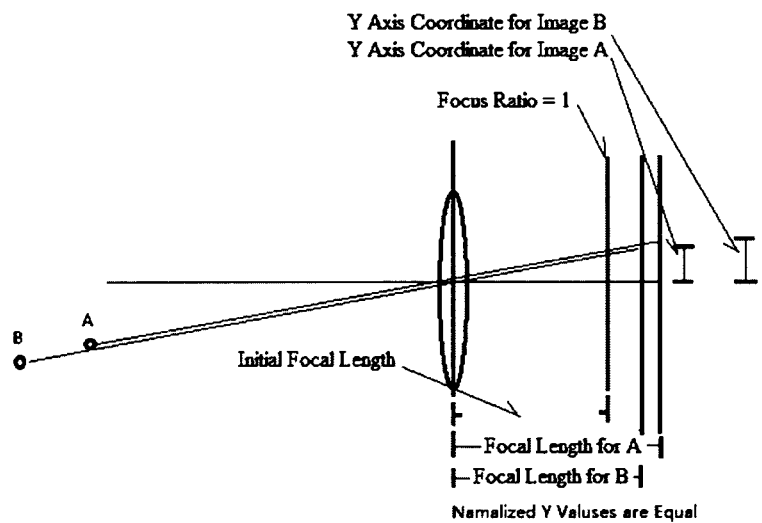
FIG. 9 illustrating an exemplary focus ratio of an optical device in accordance with some embodiments of the invention.

The x and y axis pixel location of a target element centre of the images needs to be first normalized by multiplying the focus ratio with the x and y axis pixel coordinates as shown in FIG. 9. This is true for both calibration images and position detection images. The focus ratio is defined as a focal length of the initial state focal length with zero adjustment divided by a focal length of the object image. The focus ratio equals to 1 at the initial state and becomes larger than 1 when the target element is farther. The focal ratio process is linear regardless of distortion of the lens. When in use at a close range and in real time (few milliseconds), focusing is not required. For target elements located beyond 3 m, focusing and focus ratio normalization are required.

Target Element Based Machine Vision

In summary, the machine vision system is able to satisfy both of the following properties
a) Repeatability: Integrated readings of the row and column pixel sensors, and interpreted fraction thereof, represented as (s, t), based on a point in the 3 dimensional space represented by (x, y, z) in front of the device within a range of interest is repeatable in that such values will remain the same.
b) Monotonicity: Said (s, t) readings shall be monotonically increasing, equal or decreasing in their values as long as the point moves to a new location (x', y' z') with x'>=x, y'>=y and z'>=z.

The target elements employed in the machine vision system each comprises a 2-dimensional shape such that the geometric centres of such shapes (target points) can be found. Each target element also contains codes pertaining to their purposes and location.

Constraining rules may be in various forms. Commonly used constraining rules comprise the relative height of the target elements from a reference plane coupled with the displacement between the two target elements. The reference plane corresponds to a physical platform on which an object (having the target elements affixed to) sits on. The displacement of the two target elements is a known constant because they are affixed to the object however; the object itself is movable. In order to comply with the constraining rules, the location searches are typically carried out at fixed heights (equal heights in many set ups) from the platform. In general, the optical device and the target elements reside on the same level platform such that the origin and the x, y z axes relative to the optical device are employed for locating the positions of the target points. As a result, the relative height difference from the z=0 value at the z-plane is usually used as a constraining rule.

Figure 25A:
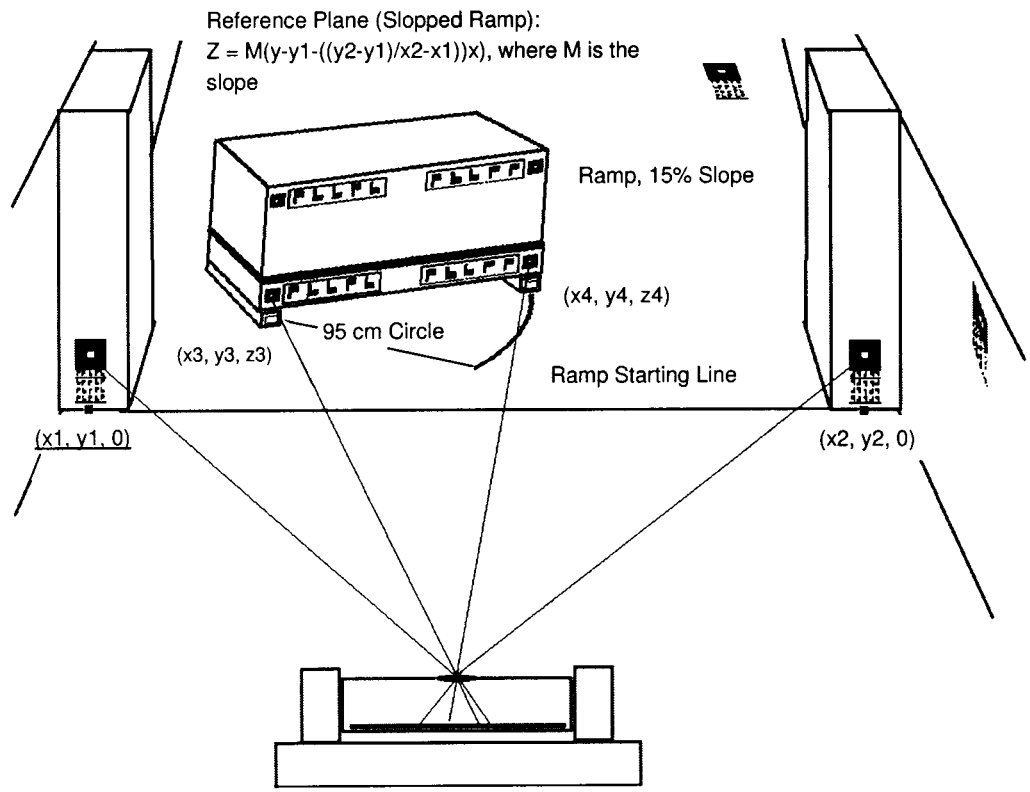
FIG. 25A illustrating an exemplary implementation based on FIG. 23, where all captured images are resolved in single shot, with the fixed markers depicting the start of a ramp and the constraints between markers on the cargo specified in reference to the ramp.
Figure 25B:
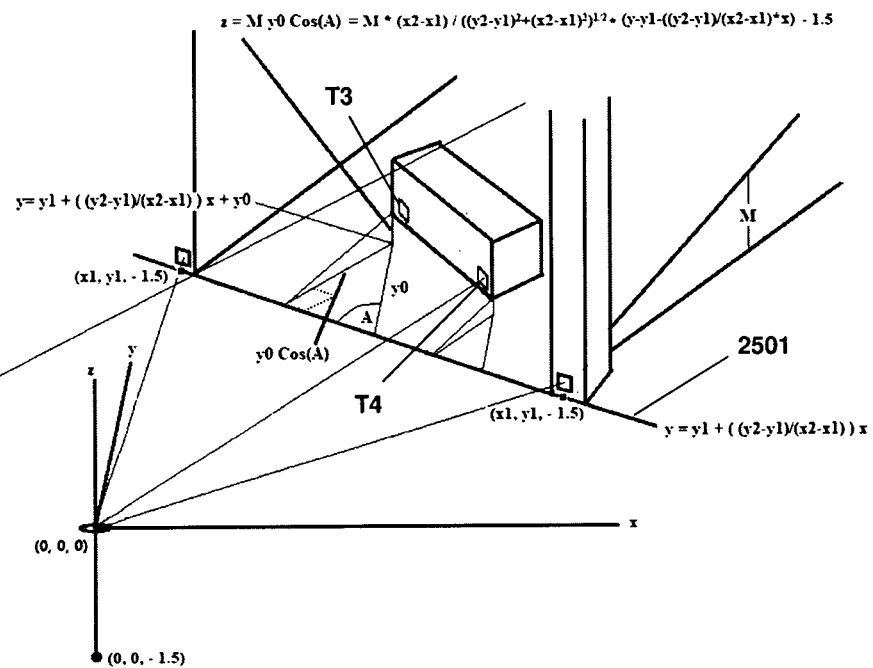
FIG. 25B illustrating an exemplary method for plotting a reference plane having a slope rating.

In addition to the above, in accordance with various embodiments of the invention, the system is also able to resolve general reference plane tasks whereby the target elements are referenced to a platform level that is at a different level from that of the optical device. Such an embodiment is illustrated in FIGS. 25A and 25B and will be elaborated in detail in the section titled "Exemplary Embodiment on Sloped Ramp—Utilization of Reference Plane".

In many embodiments of the invention, the (s, t) readings of an optical device are first calibrated as a function of all the 500 million locations of the range of interest of every cubic centimeter within a room. This is done as previously described. It is then shown that as long as proper relative constraints (e.g. a set of constraining rules) are placed on more than one target element, the positions of the set (minimum 2) of points are all resolved as long as the constraints are satisfied.

For example, if target element 1 and target element 2 are placed horizontally (same distance from the ground) and the relative distance between them are known, then there are only 2 points in the calibration table above in the range of interest that read (s, t) and (u, v), respectively, equalling the physical readings on the devices. In this example, the set of constraining rules comprises the z-axis values of target elements 1 and 2, and the relative distance between these two target elements. It can be seen that from the z-axis values, one will recognize that the two target elements are placed horizontally.

Under certain circumstances, there are singular conditions, when t=v=0. For such readings, multiple pairs of locations may exist. Such a situation is called horizon crowding when there is a single optical device and multiple target points with the constraining rules upon all target elements referenced to z axis and all target elements are near the z=0 plane (with optical devise also on the same plane by definition). Such horizon crowding may be avoided by augmenting the search with readings from another optical device or changing the target elements' constraining rules to spread possible target point positions beyond horizon.

The theory for this positioning is boiled down to uniqueness. That is, out of the about 50 million entries of the 3 dimensional locations in front of the optical device 1, only a single entry will have the readings (s, t) and (u, v), whereby each reading represents the results of the optical device readout for target point 1 and target point 2, respectively, with exception of horizon crowding. This can be derived from the fact that the camera intrinsic, while being nonlinear, is monotonic. Hence, as long as the calibration table is searched either by brute force or by insight, the exact location relative to optical device 1 may be obtained provided that (x, y, z) is found such that the (s, t) (u, v) readings from the calibration table are the same as that found from the optical device readings. In embodiments of this invention, monocular stereo machine vision may be implemented without relying on movements. One should recognize that monocular stereo vision does not necessarily require only one camera, but implies a set of optical devices that may work alone or/and jointly to perceive and position within their ranges of interests.

3 D Positioning by Matching

In many embodiments of the invention, the 3-dimensional position of target elements may be obtained by matching. Two target elements are first placed within the range of the above described calibrated optical device. The machine vision system's goal herein is to then locate the positions of the 2 target elements relative to the optical device, under the conditions that the relative height difference from a fixed plane between the two target elements are known and that the two target elements have a relative distance D apart, e.g. the set of constraining rules are known. Since said plane is at a fixed direction with the z axis, this may translate to two target elements have known relative displacement z0 along z axis. One skilled in the art will recognize that the target elements are not subjected to only such constraints and that this constraint is selected as it is a constraint that commonly occurs in the logistics industry. For example, a cargo with a pair target elements placed on both side walls would be placed at the same height, and the cargo's width would typically constrain the distance between the pair of target elements.

With positioning schemes, an inverse relation typically exists in that the single optical device's global location and orientation are known such that the positions of the target elements are referenced against this location or the global locations of the target elements are known such that the positions and orientations of the optical device are referenced against this location. We note, however, the methods and complexity of finding answers for the above 2 cases are not the same. When fixed global coordinates are known on all the target points, this is a lot more known information than the constraining rules between points.

There is a systematic way to search obtain (x1, y1, z1) values based on s, t readings. Theoretically, as such a point exists in the calibration table; a sweep may be done through the 3 dimensional spaces, plan by plan, one centimetre at a time. This is known as the brute force way. However, such a method is not that efficient and more efficient methods are described below. For these methods, there are at least two constraining parameters in that the relative height difference (z-axis difference) between the target elements has to be known or set to 0, and the relative distance between the target elements, D, has to be known.

The optical device gives the sensor readings of (s, t) and (u, v) corresponding to said target elements. The calibration table is then searched systematically to find the location (x, y, z) that reads (s, t) and another location (x', y', z+z0) that reads (u, v), where distance between said locations equals D.

In a number of embodiments of the invention, the search method involves the fixing of the z value and finding a (x, y, z) location on the z plane that reads (s, t) and the point (x', y', z+z0) on the (z+z0)-plane that reads (u, v) where z0 represents the difference in the z-axis values between the two target elements. For the avoidance of doubt, when reference is made to a z-plane in this description, the z-plane refers to a plane comprising of (x, y, z) values having a constant z-axis value. In embodiments of the embodiment, this plane may have opposing sides that are parallel to the x-axis and may have other opposing sides that are parallel to the y-axis. One skilled in the art will recognize that the z-plane may comprise of other shapes and sizes without departing from this invention. The distance between the two locations is then measured to determine if the distance matches D. If a match is not found, a new z value is projected based on the sign and magnitude of the difference on the distance between said locations and D, and the process is repeated until a match is found. When this occurs, this means that the target elements are at said locations relative to the optical device. The search method described in this embodiment is known as the generalized z-plane search.

Depth and Disparity

Figure 10:
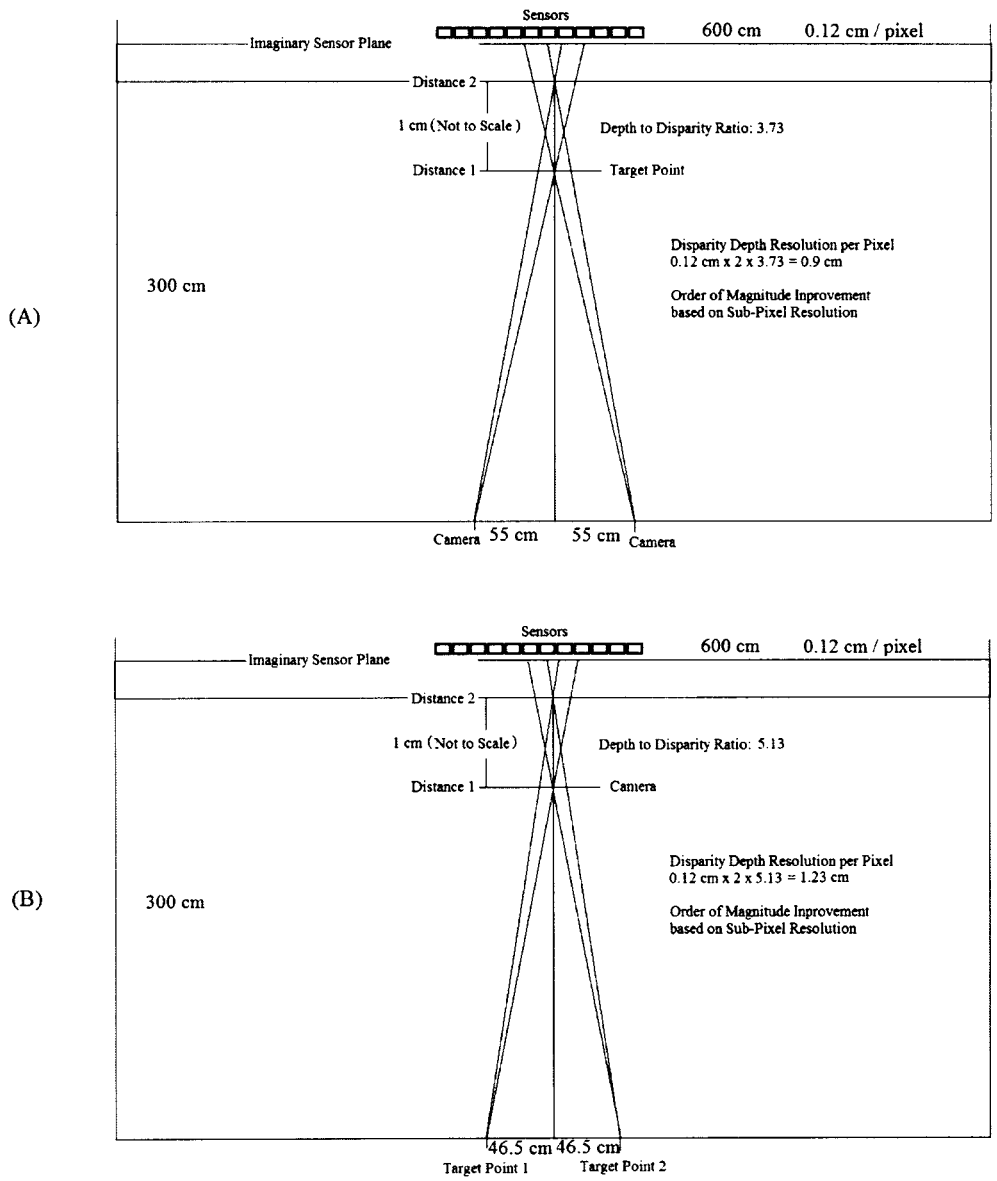
FIG. 10 illustrating an exemplary method of depth calculation based on the disparity of the distances in accordance with some embodiments of the invention.

FIG. 10 illustrates methods of depth calculation based on the disparity of the distances. In the example illustrated in FIG. 10(A), the dual cameras are separated by 110 cm. To resolve depth based on a disparity of 3 meters away, a depth to disparity ratio of 3.73 is observed. Pixel resolution at 3 meters is 600 cm/5000=0.12 cm. Dual camera's worst case is 0.24 cm. Hence, the depth resolution at 3 meters is 0.9 cm per pixel. For monocular dual target element system, since the capturing mechanisms, i.e. the target elements, are 93 cm apart, the same 0.9 cm depth resolution per pixel at 2.5 meters may be expected, as shown in FIG. 10(B). As described in greater detail in the following sections, target elements may accumulate accuracy via the edge of a shape composed of a group of pixels, which means that pixel location attributes can enhance depth calculation resolution to 0.1 cm.

Searching the Calibration Table

Understandably, the objective of any search is to traverse the calibration table to find a set (for the simplest case, a pair) of positions where their (s, t) readings match the physical readings, and that the positions satisfy relative positioning constraints. There are various ways to search the table due to the monotonicity property of the lens.

If one is not pressed to identify the positions at video frame rate, one can find precise locations of two vertically placed targets elements within seconds through the brute force search method described earlier.

Various calibration table searching methods are sorted and described as follows:

a) Degenerating to smaller dimensions. A commonly used vertical direction may be employed as the basis of the search and this is identified herein as the z-plane search. For example, it is assumed that two target elements with actual (s, t) and (u, v) readings respectively have a height difference of z0. For each value on the z-axis, the search may be degenerated into 2 dimensions, to find (x1, y1) and (x2, y2) such that CT(x1, y1, Z)=(s, t) and CT(x2, y2, Z+z0)=(u, v). The relative distance D is then used to determine the direction that the distance between the 2 points deviates from D. The deviation distance is then used to project a better Z' and the process is repeated.

One skilled in the art will recognize that although the reference plane in this section refers to a z-plane (i.e. a plane where z-values are constant), other planes such as a y-plane (i.e. a plane with constant y values), an x-plane (i.e. a plane with constant x values) or a slopped reference plane may be used in these search schemes without departing from the invention.

By the same token, this search may be degenerated to 1 dimension to solve 2 dimensional search problems.

b) Alternatively, in another embodiment of the invention for z-plane search, based on a first point processed in a first point search, the relative constraints between a second point and the first point may be employed to allocate possible second point(s). The allocated point is then verified by examining the calibration table reading. If a second point among the possible points is found to have a desired (u, v) reading in the table, the answer is found.

For example, the search may be carried out based on the distance D. Given that CT(x, y, z)=(s, t), a set of points on a circle with a radius $(x0^2+y0^2)^{1/2}$ where $(x0^2+y0^2+z0^2)^{1/2}$=D may be obtained whereby the circle has a centre at (x, y, z). If a point (x', y') on the circle at the z-plane (z+z0) is found to have CT(x', y', z+z0)=(u, v), the answer is obtained. If the nearest values to (u, v) are not acceptable, another z is projected and the process is repeated.

Figure 11:
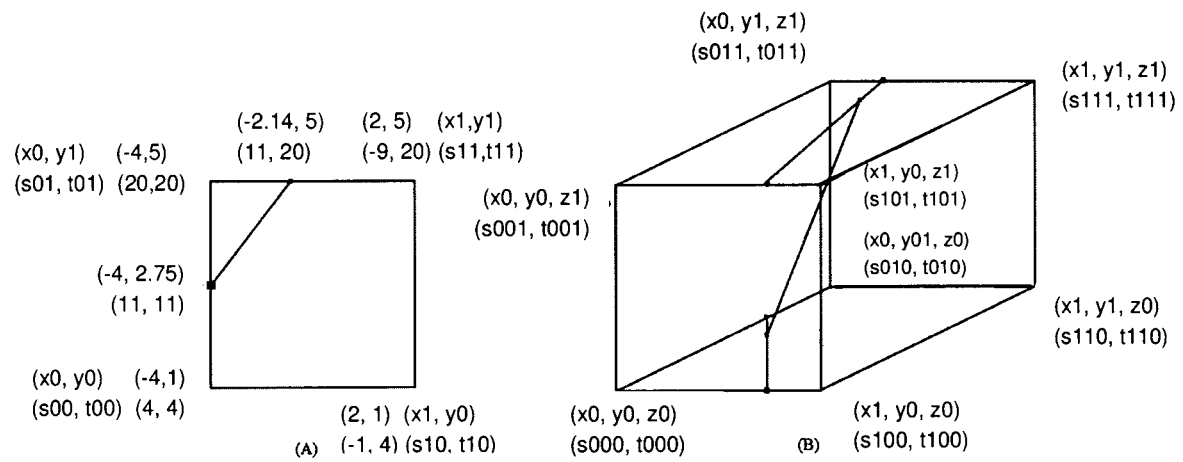
FIG. 11 illustrating a linear interpolation and extrapolation searching method in accordance with some embodiments of the invention.

To illustrate in simpler way, a degenerated example can be presented here as a precursor to a later section on degenerated constraining rules between the target points. In this example, it is assumed two target points are positioned in a vertical arrangement with a vertical separation of distance D between them. In such a case, x0=y0=0 and z0=D. Given that CT(x, y, z)=(s, t), there is only one point, which is (x, y, z+D) that will satisfy the relative constraint rule. Hence only CT(x, y, z+D)= (u, v) needs to be verified.

c) Linear interpolation/extrapolation (Global gradient). For a 2 dimensional search as illustrated in FIG. 11 (A), four values are obtained from the calibration table values such that each value represents a far corner of a square. The (s, t) reading is then interpolated to obtain a point. The (u, v) readings are similarly interpolated to obtain another point. The constraint relationships between the 2 points are then explored to project direction and magnitude of shifting to another plane.

The objective of the interpolation process is to interpolate on s in 2 sides of the square to obtain (x1, y1) (x2, y2) then to interpolate on t in the line segment (x1, y1)-(x2, y2). An example is illustrated in FIG. 11(A).

For a 3 dimensional search, a 2 dimensional search as described above is first carried out to obtain four values from the calibration table values such that each value represents a far corner of a square. The (s, t) reading is then interpolated to obtain a point. The steps above are repeated on the other 4 far corners of another square to obtain another interpolated point for (s, t). The connected line segment is the linear match on (s, t). Then, the steps are repeated on (u, v) to obtain another line segment. The answer is then found from the 2 lines based on the specified constraining rules for the 2 locations. This is illustrated in FIG. 11(B).

d) Local gradient stepping. The b) above can be referred to as global gradient. Local gradient works one step at a time, based on the gradient on S in the x, y, z, axes, follow by stepping based on the gradient on T in the x, y, z axes. There are 2 alternative stepping lengths, stepping one unit length each time, or stepping with projected length using the gradient value. The process is repeated alternatively on s and t until it converges on a point where the table readings are (s, t).

e) Sub-cuboid (for 3 D) and Sub-square (for 2 D) search. This is actually a more effective brute force search. Instead of employing brute force searching methods to search the entire calibration table, (comprising 500 million readings) one may, for example, perform sampling searching every 10 places for each direction, reducing the searches to 500,000 places. The sampling is done using the following formula |s−s'|+|t'−t| whereby the sampling moves in the direction that provides the minimum value of |s−s'|+|t'−t|. Local gradient stepping of c) is then used to converge the results.

f) Inverse Calibration Table. An inverse lookup table with entries s, t and one of the spatial dimensions may be built. Such an approach is not efficient as 6000×4000×500=12 billion cells are required to record the (x, y) value based on (s, t, z) entries. Current technology is unable to handle such table at reasonable cost. To address this issue, the inverse table is created as a summary table by using the integer portion of s/20, t/20 and z, with a table size of 30 million entries, which is 25% in size of that for the calibration table. With the inverse table, the locations are read based on the optical device readings.

For example, the location of target point 1 is read at a z value. The target point constraining rules are then applied. The location of target point 2 at z+z0 is read, then the relative distance is examined. These steps are repeated with a projected new z value. The steps are the same except that the locations are "read" instead of "searched. Crude locations are then obtained such that CTI(S, T, z1)=(x1, y1) and CTI(U, V, z1+z0)=(x2, y2) and distance between (x1, y1, z1) and (x2, y2, z1+z0) is closest to D, where S, T, U and V are the integer portions of u/20 and v/20, respectively. Starting from the crude locations, local gradient stepping as in c) is carried out to converge to 2 points such that CT(x1, y1, z1)=(s, t) and CT(x1, y1, z1+z0)=(u, v). Due to adjustments on (x1, y1) and (x2, y2), it is likely z1 needs to be finely adjusted so that the distance constraint is satisfied.

Having described the above 6 general approaches, one may elect to combine the above, at different levels of search and with various parameters, resulting in many other ways.

Combining Calibrated Cameras for Stereo Vision

Once the calibration processes above have been completed for 2 separate optical devices, they may be employed with the second optical device placed at relative distance (x0, y0, z0) away from the first optical device. As an example, if the second optical device is placed a distance Y to the right of the first optical device along the y-axis, then y-coordinates in the second camera's look up table shall be decreased by Y. This displacement normalization process is carried out to negate the displacement. In general when the second device is located (+x0, +y0, +z0) relative to the first, reading of the second calibration table shall be at (x−x0, y−y0, z−z0). The readings from the second device calibration table is hereinafter referred as (u, v) values.

The (s, t) readings from optical device 1 corresponding to a target element are then obtained and the (u, v) readings from optical device 2 corresponding to the same target element is then obtained. The second optical device is placed at (x0, y0, z0) and the first optical device's coordinate location is (0, 0, 0). The task is then to find the (x, y, z) such that optical device 1's calibration table reads (s, t) at entries (x, y, z) and the second optical device's calibration table reads (u, v) at entries (x−x0, y−y0, z−z0).

Fixed System Calibration and Application

A system calibration approach which is readily applied toward simple applications is described herein. Instead of mounting calibrated optical devices to setup a vision system, the devices are mounted before calibration, for example, 110 centimetres apart on a fixture. The fixture is then sent for calibration. The fixture is mounted on a railed carriage and steadily moved in between, for example, 30 centimetres and 300 centimetres apart from the calibration screen. At each 1 centimetre apart, each optical device will take separate screen shots and process to up to 250,000 target points with sub-pixel resolution. The computing device records both pairs of readings into one table, based on location entries relative to the main optical device. The secondary optical device location and its relative location to the target point are not recorded.

After the calibration process is completed, the fixture is then mounted to a fixed location relative to ground to detect positions of any target element relative to ground or mounted to a moving vehicle to detect positions of any target element relative to the vehicle.

The remaining task is to then identify and confirm target elements in the vicinity of the expected location and to locate the target point. The derived (s, t) values from the optical sensor of device 1 and (u, v) values from the optical sensor of device 2 are used as a pair to traverse the calibration table of the fixture. Since the 2 devices were "hard welded" and processed through the calibration steps as one fixture, the relative locations or even difference of pointing angle of the devices are not critical-anymore. The "signature" is recorded in the calibration table and the unique position of the target point shall be identified.

System with Degenerated Constraints

As described in the section above, many alternatives search methodologies may be employed to search through the calibration table. Several settings are set out such that the search computational complexity can be reduced by simplifying constraint rules on two points relating to the (s, t) and (u, v), respectively. We point out that the following cases have simpler constraint rules.

a) It is assumed that two target points are vertical with a separation of D. In such a case, x0=y0=0 and z0=D. Given that CT(x, y, z)=(s, t), there is only one point, which is (x, y, z+D) satisfying the relative constraint rule. Hence we only need to verify if CT(x, y, z+D)=(u, v).

b) It is assumed that two target points are horizontal and the optical device is shooting at an angle (the angle of engagement) perpendicular to the line connecting the target points. In such case, we may rotate the axes to align with the device such that z0=0, y0=0 and x0=D. Given that CT(x, y, z)=(s, t), there is also only one point, which is (x+D, y, z). Hence we also only need to verify if CT(x+D, y, z)=(u, v).

c) It is assumed that two optical devices are placed in vertical or horizontal arrangements, with relative distance of D, and a target element is within optical device ranges of interest. In the vertical case, the logics and formulae are as those in a). Given that CT1(x, y, z)=(s, t), we only need to verify if CT2(x, y, z+D)=(u, v). In the horizontal case, the formulae are as b). Given that CT1(x, y, z)=(s, t), we also only need to verify if CT2(x+D, y, z)=(u, v).

Figure 12:
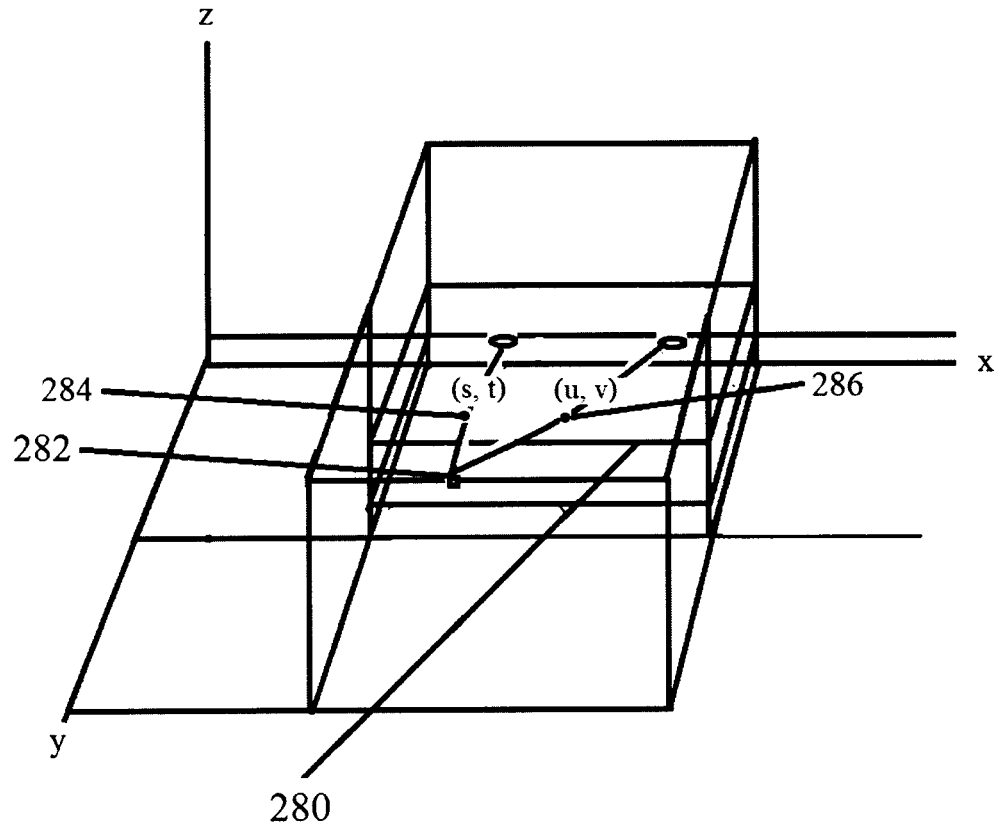
FIG. 12 illustrating simulated light rays between 2 lens and one target points or 2 target points and one lens, showing a degenerated z-plan search for degenerated cases in accordance with some embodiments of the invention.

Note that the horizontal case in c) is exactly the traditional dual camera set up for stereo vision purposes. It is interesting to observe that for the above case b), if the target points are imaged to be optical devices and the optical devices being target points and the light rays traverse reversely, it works like a traditional set up. This is where formulae on searching calibration tables are identical between dual camera-single target and dual target-single camera systems. For case c), the z-plane search method is degenerated to find z such that CT1(x, y, z)=(s, t) and CT2(x+D, y, z)=(u, v). This is shown in FIG. 12, where 2 points 284 286 on the z-plane 280 have readings (s, t) and (u, v), respectively, and (x, y z) is found when the points merge to one point 282. For cases a) and b), we only need to satisfy CT(x, y, z)=(s, t) and CT(x, y, z+D)=(u, v). FIG. 12 applies to case a) and b) with the roles of target points and lens reversed.

Figure 13:
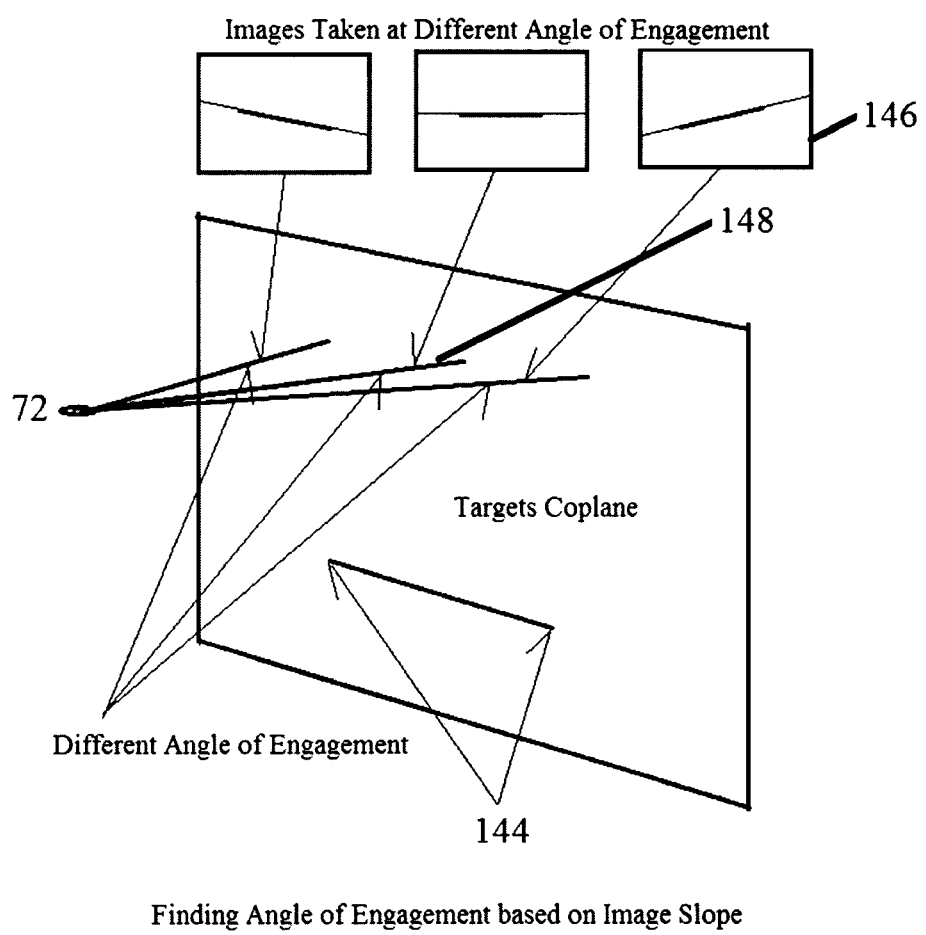
FIG. 13 illustrating an angle of engagement in relation to a co-plane of a target element in accordance with some embodiments of the invention.

For the case b), the line connecting the target elements 142 is parallel to the ground by definition. This is illustrated in FIG. 13. Hence, there only exists one degree of freedom, the angle of rotation relative to the ground. The perpendicular angle of engagement between the camera and the target elements can be obtained by rotating the camera till the image of the pair of target elements are horizontal to the camera's horizon. As illustrated in FIG. 13, the monocular camera 72 is on a rotation stage. Images 146 depict the slope of the target elements. The centre ray 148 depicts the situation whereby the angle of engagement of the centre axis of the optical device is perpendicular to the line connecting the target points. Given the superior data processing capabilities, the positioning of the dual target elements is obtainable in a fraction of a millisecond, much faster than physically rotating the device till perpendicular angle of engagement, which takes 100 milliseconds.

Multiple Optical Devices and Target Elements

Instead of employing a single optical device, several optical devices with fixed relative positions may be employed whereby each has its own calibration table. This is a more general set up from the traditional dual camera for stereo visions, which restrict the cameras to be in parallel with fixed front pointing direction. Habitually, horizontal dual cameras are employed for machine vision. There is actually no requirement for the cameras to be horizontal and the vision resolution is not affected. It may be convenient or an improvement for the optical devices to be installed vertically or at diagonal corners. A diagonal arrangement has the benefit of a 40% increase on separation distance so as to improve disparity angle for positioning. Vertical pairs may nicely fit places with spatial constraints. There is also no restriction on having more than 2 optical devices in a vision system.

Figure 15:
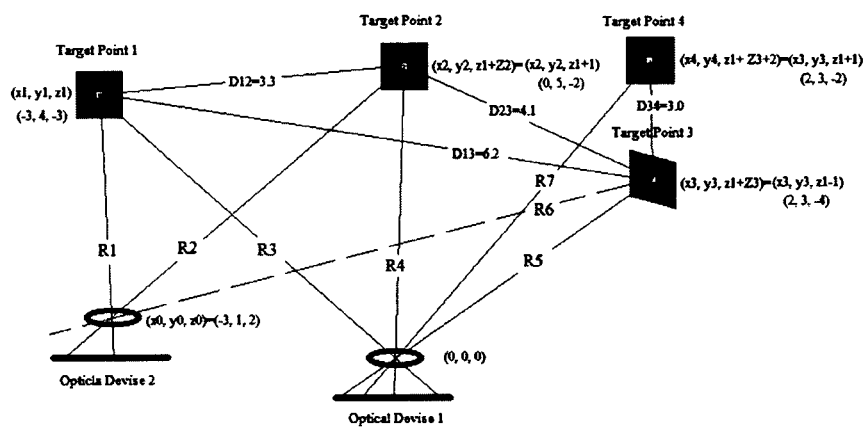
FIG. 15 illustrating the line of sight between multiple optical devices and multiple target elements in accordance with embodiments of the invention.

FIG. 15 illustrated an embodiment whereby two optical devices are facing the same direction. This example shows that the system works even if the angles of shooting vary, as long as the angles are known. This is because angular variations can always be normalized with a coordinate system rotation prior to giving out reading results. In this example, target point 4 is shown to be at an angle as compared to the other target points. The angle of target point 4 does not affect the final result since only target center position information is extracted from our image processing. The orientation of target elements are only for ease of installation or clearer viewing angles. Some of the possible combinations are analyzed here and/or simulated in the later examples. While the analysis tends to be greatly simplified by identifying pairs of light rays, collective calculations on all light rays will provide the best results.

Dual Camera Dual Target System

This section describes the embodiment whereby the monocular vison is used with a pair of target elements and a secondary optical device 2 on the side. The secondary optical device can be anywhere with coordinates (x1, y1, z1) relative to an axis centered on optical device 1 at (0, 0, 0). In this description, target point 1 is set to be at (x, y, z) and target point 2 is set to be at (x', y', z+z0) and that distance between the 2 target points is D.

Such a setup is equivalent to having 6 stereo systems. Performing z-plane search on the "cross eye" system, that is the left camera getting the right target element reading (s, t) and the right camera getting the left target element reading (u, v), is beneficial in that the disparity between the 2 images is about doubled and hence the resolution is doubled. Optical device 1's calibration table 1 reads (s, t) corresponding to target point 1, at (x, y, z), which is at the farther direction. Optical device 2's calibration table 2 reads (u, v) corresponding to target point 2 at (x', y' z+z0), which is at the further and opposite direction. We set a Z value and search for a point (x, y Z) where calibration table 1 reads (s, t) and search a point (x', y', Z+z0) such that (x'-x1, y'-y1, z+z0-z1) of the calibration table 2 reads (u, v). The method to search the 2 dimension is as stated in above. We obtain the distance between the above 2 points and compare with D, project a more accurate Z and repeat the process until the distance equals D. For such Z, the locations for the target points are found to be at (x, y, Z) and (x', y', Z+z0), respectively.

Figure 14:
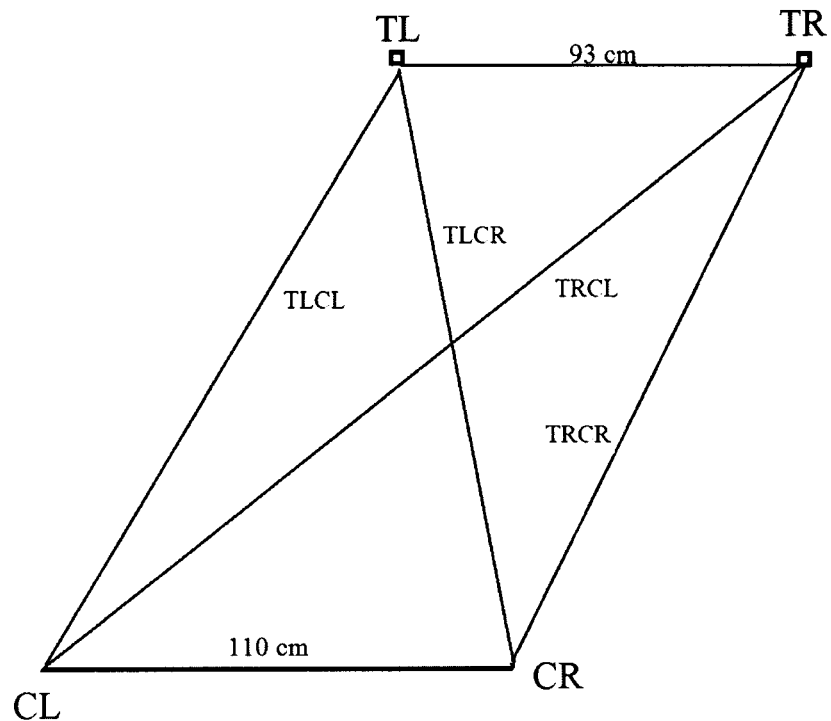
FIG. 14 illustrating multiple light rays from a simplified top view between the 2 target elements and the 2 optical devices in accordance with embodiments of the invention.

FIG. 14 illustrates the simplified top view between the 2 target elements and the 2 optical devices in accordance with embodiments of the invention. It can be observed that there are 4 rays between the 2 cameras and 2 target elements. The 4 rays are named TLCL, TLCR, TRCL, TRCR. There are 6 combinations for paring the 4 rays: TLCL+TRCR, TRCL+TRCR, TLCL+TRCL, TLCR+TRCR, TLCR+TRCL and TLCL+TRCR and these combinations are valid as long as the cameras and the targets are not on the same z-plane. For TLCL+TLCR TRCL+TRCR, positions of TL and TR are identified. For the remaining 4 combinations, both TL and TR are identified for each paring. Hence, 5 positioning data may be provided for each TL and TR via z-plane search method, hence achieving at better resolution by weighted averaging of the 5 pairs of results. The dual cameras dual target elements vision based on TLCR+TRCL about doubles resolution due to increase of disparity distance.

The Crossed Eyes Vision

Disparity is the fundamental factor for stereo vision as explained above. The symmetry of light rays between target points and optical devices provides the conclusion that a single optical device-dual target points system and dual optical device-single target system are able to provide the same distance resolution as long as the disparity is the same.

To find the 2 target positions, Use device 1 sensor to derive at (s, t) readings for Target 2 at far end and use device 2 sensor to derive at (u, v) for Target 1 at the other far end. Read the device 1 calibration table to identify (x1, y1, z) on a z-plane such that CT1(x1, y1, z)=(s, t). Read the device 2 calibration table to identify (x2, y2, z+z1) such that CT2 (x2-x0, y2-y0, z+z1-z0)=(u, v). As stated above, the distance between the identified points is calculated and compared to D to project a new z' and repeat the above to converge to D.

The Degenerated Crossed Eyes Vision

Figure 16:
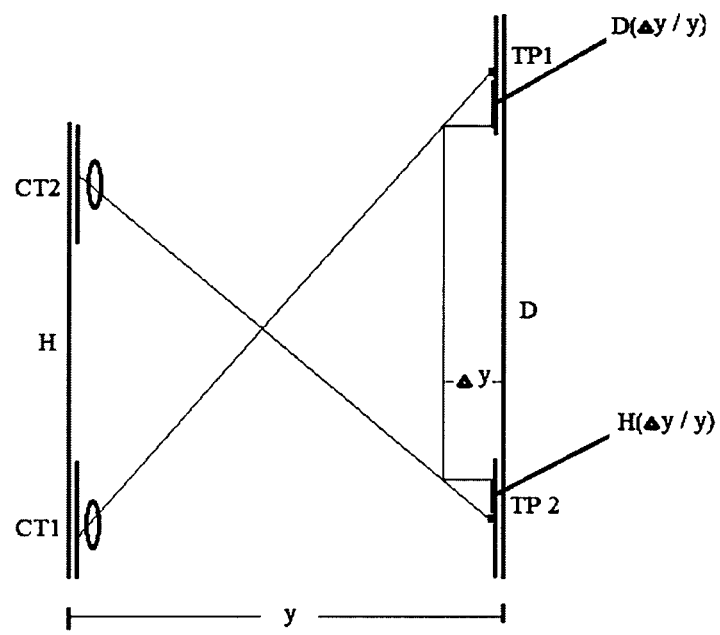
FIG. 16 illustrating a pair of target elements and a pair of optical devices placed vertically in accordance with embodiments of the invention.

As mentioned above, a degenerated set up helps simplify the calibration table search process. A degenerated crosseyes system is now described to demonstrate how vision depth resolution can be doubled for crossed eyes system. FIG. 16 shows a pair of target elements displayed vertically, with a distance D apart, and 2 optical devices installed vertically with a distance H apart. The above search is degenerated to find (0, y, z) on the z-plane such that CT1(0, y, z)=(s, t) and CT2(0, y, z−H−D)=(u, v). Then (0, y, z) and (0, y, z−D) are the locations for the target pair.

The "y" represents the distance between the target points and the optical devices. For a distance value y1 slightly deviated from y, we observe that with the same light rays of CT1(0, y1, z)=(s, t) and CT2(0, y1, z−H−D)=(u, v), target point 2 has to be shortened by (y−y1)/y*H and target point 1 has to be shortened by (y−y1)/y*D. Hence a deviation of y distance shall create a disparity ratio of (H+D)/H compared with employing both optical devices on one target point and shall create a disparity ratio of (H+D)/D compared with the situation whereby optical device 1 is employed on both target points.

Rotating Stage for Optical Devices

Figure 17A:
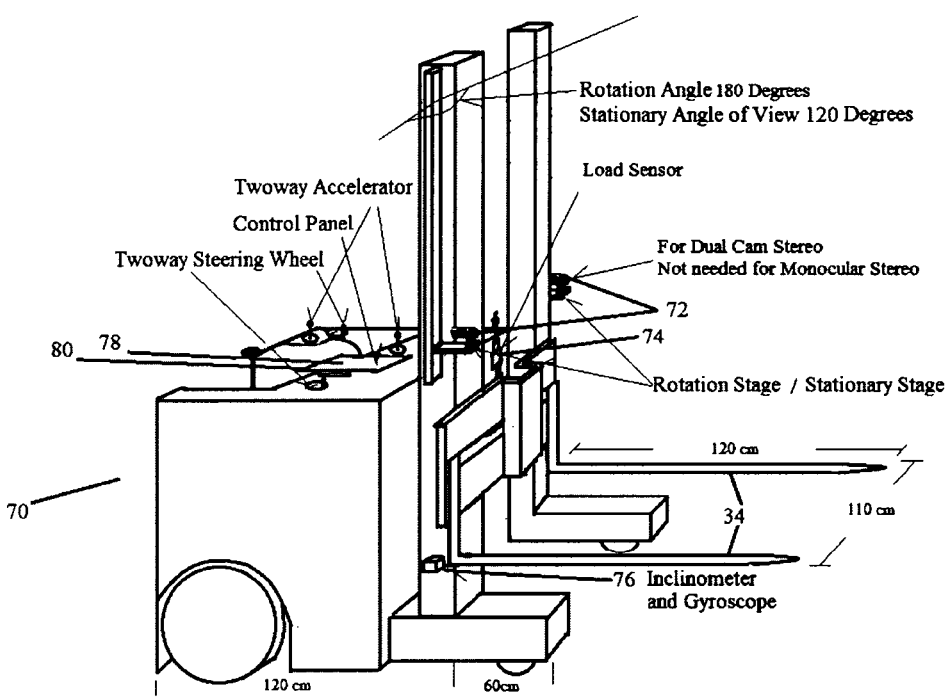
FIG. 17A illustrating an enhanced forklift having optical devices in accordance with embodiments of the invention.

A "neck" can be provided to optical devices to allow the optical devices to turn large angles at fractions of a second. Such optional rotational platforms can be provided. These platforms have the capability of 360 degrees of turning angle, as demonstrated in FIG. 17A on a forklift. Since the camera is mounted to the rotational platform, the vehicle can turn wide angles without missing the view of the target elements, greatly alleviating the restriction on vehicle manoeuvring. This is particularly useful when only one optical device is used with multiple target elements, assuming at least 2 targets elements are within field of view.

A dual camera setup may also be installed on dual rotation stages. Note that any 2 of the 4 rays between the two cameras and two target elements can contribute to 3-D positioning while the "cross vision", that is, left target to right camera paired with right target to left camera, doubles distance accuracy. The vision for a full set up of dual cameras on rotation stages and dual target elements is described herein. Rotational stages are employed to increase the view angles during manoeuvring.

As long as we always normalize the angle by reading the calibration table at reversely rotated coordinates, the vision system works the same.

For example, set the optical device's three dimensional coordinate system as the main reference, when we use the second calibration table to identify a second point in the second optical device's three dimensional coordinate system that is associated with the output (u, v), this point relative to the main reference shall be rotated back (normalized with) the same angle as that between the second optical device and the first optical device. Then the point needs to be shifted back (normalized with) the displacement between optical device 1 and optical device 2. Afterwards, every processing is performed in the main reference coordinate system.

The method is applicable for optical device 2 at any 3 dimensional angles and with any 3 dimensional displacement. There are not many complications because all 6 degrees of freedom are all given constants. Please note the difference between constraining rules for 2 optical devices from those for 2 target elements in the disclosed methods. The 3 dimensional degrees of freedom of a line of sight can be exactly obtained using the calibration table. Hence relative constraining information is plugged in to derive at answers in the computation. The 3 dimensional degrees of freedom between a line of sight has no correlation with the target element, hence the relative constraining information are used verification in the computation.

Figure 17:
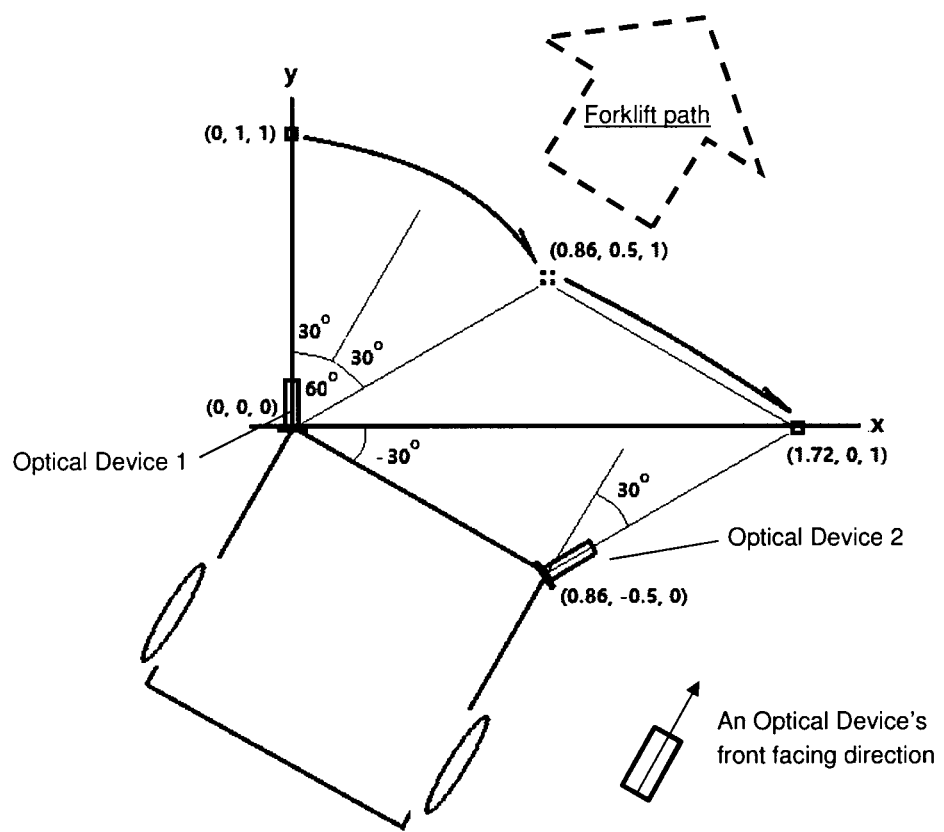
FIG. 17B illustrating a top view of the forklift in FIG. 17A in accordance with embodiments of the invention.

FIG. 17 (B) illustrates a top view of the forklift in FIG. 17 (A) hence the z axis is not shown. This is a simplified case with optical device 2 rotating along the z axis and displaced in the z-plane (the points at equal height). The computation can be further expanded to process 6 dimensions of freedom in 3D. For ease of reference, the target elements are still represented in 3 dimensions. In this illustration, optical device 1 is shown to have rotated 30° counter-clockwise from the path of the forklift and optical device 2 is shown to have rotated 30° clockwise from the path of the forklift. As a result, optical device 2 is shown to be at −30° from the forklift path. The two optical devices are set to be 1 meter apart. Hence, the fixed location of optical device 2 relative to optical device 1 is (0.86, −0.5, 1), and a 60° angular difference exists between the front facing of optical device 2 and the front facing of optical device 1.

When a point in the second optical device's three dimensional coordinate system associated with the output (u, v) is obtained, for example, to be (0, 1, 1), the position of said point will be normalized. This is done by rotating an angle equivalent to the angular difference between the front facings of the two optical devices, e.g. 60° clockwise to (0.86, 0.5, 1).

This is obtained by observing that rotating the point clockwise 60° is the same as rotating the axes counter-clockwise by 60°, and by applying the counter-clockwise rotation formula:

$$x'=(x+y\tan(A))\cos(A)=x\cos(A)+y\sin(A)=0+0.86=0.86$$

$$y'=(y-x\tan(A))\cos(A)=y\cos(A)-x\sin(A)=0.5-0=0.5$$

This point is then displaced by 0.86 and −0.5, on x axis and y axis respectively. This produces the point (1.72, 0, 1). Hence, the normalization step changes the position's representation from the second optical device's three dimensional coordinate system to the first optical device's three dimensional coordinate system.

Except for the extra normalization step, the steps for the 2 optical devices on rotating stage, 2 target element system are the same as that for the 1 optical device 2 target element system which are: identifying a first point in the first optical device's three dimensional coordinate system that is associated with the output (s, t) and identifying a second point in the second optical device's three dimensional coordinate system plus normalizing based on the relative angle and displacement between the 2 optical devices. If the constraining rules on height difference and distance between the 2 points are satisfied, the positions in the first optical device's 3 dimensional coordinate system are both found.

In the case of FIG. 17 (B), the heights are both 2 meters and the distance is 2, thereby satisfying the constraining rules.

Such normalization is also performed in other occasions, for example, in the field software calibration after external force distortion, or intentionally installed as monocular vison for wider angle coverage.

Warehouse Handling with Machine Vision

In a particular embodiment, the target element based stereo machine vision described above may be used to guide certain functions of the enhanced forklift 70 as shown in FIG. 17. For example, at least one wide angle high resolution camera 72 is employed.

During the operation of the enhanced forklift 70, target elements are used to enable positional measurements of the objects as well as the fork blades 34. In a preferred embodiment, the target elements are located on or close to desired positions on cargo or on the floor and walls.

Monocular Vision for Multiple Optical Devices

Figure 18:
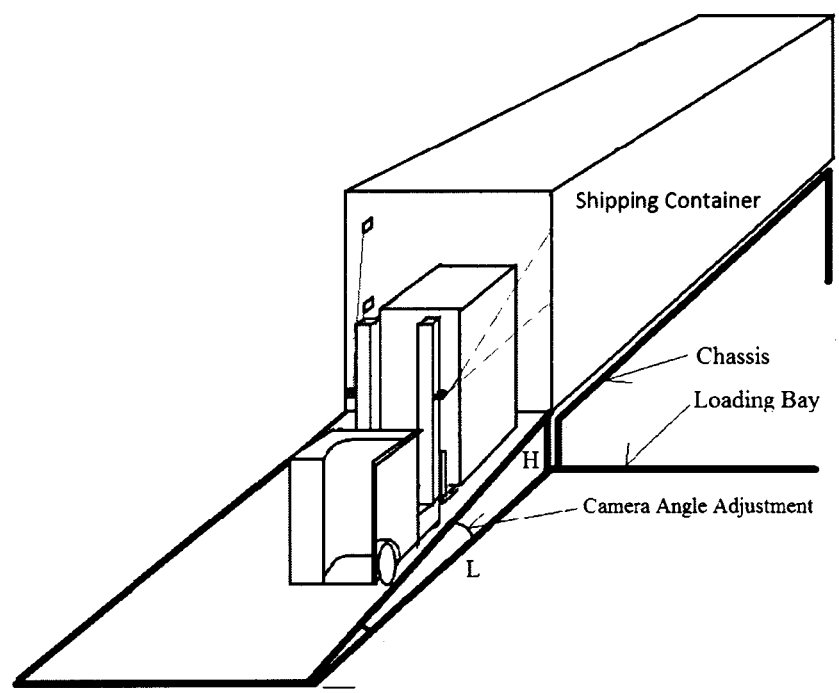
FIG. 18 illustrating an embodiment of the invention whereby vertical target elements are provided on inner walls of a container.

When inserting or unloading cargos into or out of a sea freight container, "blindfolding" occurs for regular machine vision or human vision due to severe obstructions. Such situations are resolved by pasting vertical target elements on the inner walls of the shipping container. Cameras on rotational stages of a loading machine shall each have monocular stereo vision as shown in FIG. 18 with smaller size cargo loading having longer travel distances for stereo vision.

We observe that at the beginning of the vertical monocular vision, there needs to be adjustments to the forklift's inclination. The inclination of the forklift can be either measured by an inclinometer and gyroscope or calculated from a leveller's parameters. During search of the calibration table, the angle needs to be adjusted with the inclination.

Multiple Target Elements

Figure 19:
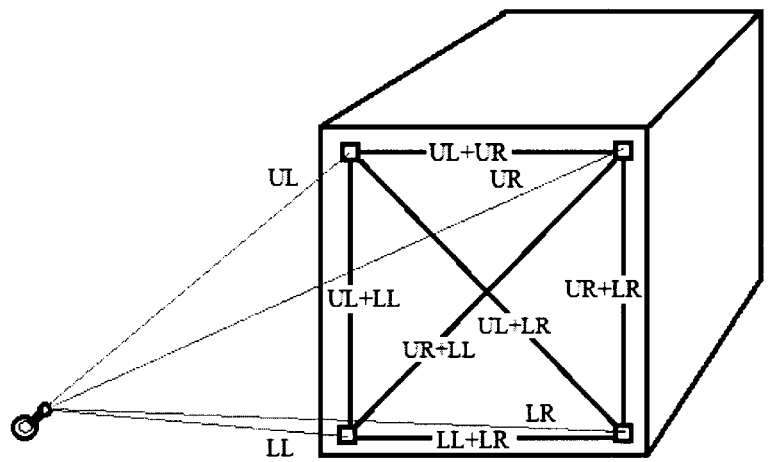
FIG. 19 illustrating an embodiment of the invention whereby multiple target elements are provided on a surface of a cargo.

The practical capability of 3-D positioning of the monocular stereo vision is herein demonstrated with an implementation of multiple target elements on cargos. This is illustrated in FIG. 19. Typically, a cargo, or particularly storage container 10, is in a cubical shape with a vertical and square front wall. This is ideal for putting 2 pairs of vertical target elements on the left and right sides. Since the 2 pairs are of the same height from the ground, this results in 2 horizontal pairs of target elements, too, e.g. the UL and UR pair and the LL and LR pair. By employing the reverse physics theory, this results in the creation of 4 pseudo cameras, with each pseudo camera being located at each of the 4 corners. Monocular stereo positioning can also be performed 6 times, i.e. 2 vertical pairs, 2 horizontal pairs and 2 cross pairs, each time identifying 2 target elements. The average of the triple findings of the 4 points may then be used to derive a more accurate position. It should be noted that if the cargo is bigger than 1 square metre (over 2 meter by 2 meter in the case of our double size storage container 10), the disparity angle is greatly improved from that for a single pair at shorter distance apart, resulting in much better positioning resolution. Also, it can be noted that cross pairs can be treated as a pair of target elements with known distance and known height difference. Monocular stereo positioning can be derived from such a cross pair, with better resolution being obtained with 40% larger disparity distance due to the longer diagonal distance.

While the methods described above appear to involve additional positioning steps, i.e. 6 rounds of positioning processing, these steps can be integrated into more manageable and efficient methods. The inverse lookup table traverse can be performed on UL+LL and UR+LR respectively to obtain the camera positions, which inversely specify the UL, LL, UR and LR positions. The z-plane search methodology may then be employed with a pair of z-planes with distance of UL+UR apart. There will be one z value such that the 4 points (2 on the upper z-plane and 2 on the lower z-plane) obtained from the reverse lookup table having relative distances nearest to the 6 distances between the pairs among UL, UR, LR and LL. While the UL+LL and UR+LR lookup table searches have less error because they do not involve inaccuracies on angles of engagement, the z-plane searches collectively verifies and averages 6 relative distances. One would reason that the results should be as trustable as those from the two reverse lookup table searches; hence a pair of answers is obtained for each of the 4 corners. The final answer is then obtained by fitting in 4 points which form a perfect rectangle with exact distances as that between the 4 target elements on the cargo, with smallest accumulative deviation from 4 pair of positions obtained from the search results.

Ultra-Broad Angle Machine Vision

Figure 20:
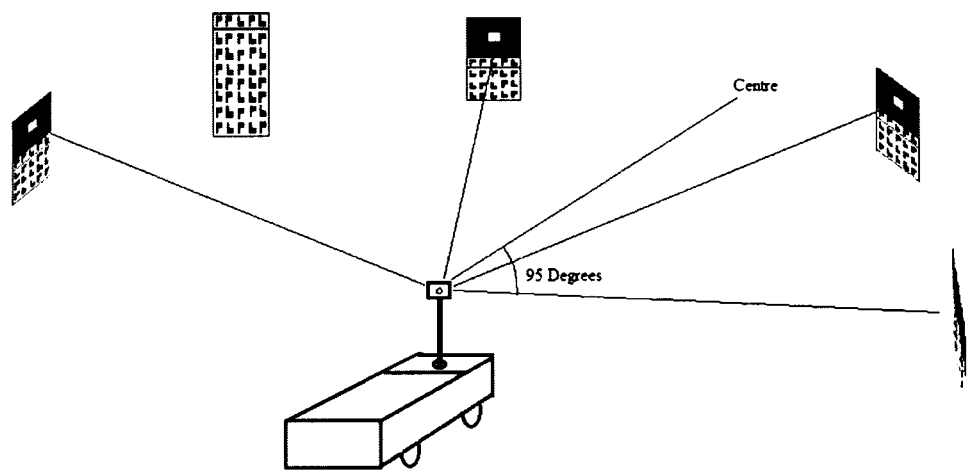
FIG. 20 illustrating a vehicle provided with an optical device having 360 degree viewing angle capabilities in accordance with some embodiments of the invention.

Linearity, or the intrinsic transformation for the purpose thereof, of an optical lens is the deciding factor in determining a machine vision system's positional accuracy for traditional vision positioning. Lens technologies are advancing at such a rapid rate such that 360 degree angle of view optical device are employed herein for certain applications. Such a lens is extremely nonlinear as it bends the light ray to squeeze the surrounding into a narrow display. A system employing the embodiments of this invention transforms the concern from nonlinearity toward searching of calibration table. The calibration table is done by the same calibration procedures as before, repeated 4 times where each time involves a turning of 90 degrees via a precision rotation stage. Each calibration table overlaps with the neighboring 90 degrees angle calibration table. Tailoring and stitching is done to combine the 4 tables into one with x and y axis covering both positive and negative ranges in all directions from the camera. As shown in FIG. 20, a vehicle may be installed with a 360 degree angle of view optical device that employs a machine vision system in accordance with embodiments of the invention. This vehicle is then able to position itself, detect positions of movable targets and read machine codes around it.

Spatial Interpretation

When specifying positions, the resolution attribute can be used to obtain linearly interpreted 0.063 cm resolution. This linear interpolation in between cells is named "spatial interpretation". There are many further calculations such that this fine attribute should not be disregarded at this point. Furthermore, disregarding sub-cm positional information creates artificial acceleration (and more errors) during moves generated by image position resolution, causing confusion and requiring moving average during motion trajectory detection.

2 Dimensional Linear Spatial Interpretations

The previously mentioned 2-dimensional spatial interpretations are described below:

Given that the (S, T) readings are read from the calibrated optical device and then calibration table is traversed to derive a (x, y) location such that the recorded (s, t) has the nearest values to (S, T), where x and y are integers. (That is |s−S|+|t−T| is minimum among neighboring locations in the table.) The task of the search is to then find the exact location (X, Y) such that the interpolated (s, t) value equals (S, T). There are 4 alternatives for selecting a square, depending whether x and y is increased or decreased by 1, respectively.

With reference to FIG. 21(A), given that 4 neighboring points form a square in a calibration table of an optical device with (s, t) readings on a fixed Z-plane, with one of the points having nearest values to (S, T), for example (x, y,), (x, y+1), (x+1, y+1) and (x+1, y) with the following property:
 a) Among the 4 sides, 2 sides have s value ranges covering S and such 2 points with (S, T1) and (S, T2) readings.
 b) The range of T1 T2 includes value T.

When one out of the 4 possibilities is chosen based on gradient direction, this would always give us the correct coordinate direction to satisfy a). There is the chance that T is outside of T1 or T2, in which case, simply step to neighboring square by extrapolation on T from the line segment of a).

The 2 points may be found along the 2 line segments such that the interpolated s equals S. This is an inverse of interpolation. The points corresponding to linear interpolated S are represented in FIG. 20(A) as an example. The point corresponding to linear interpolated T along this line segment is represented by the arrow. This is the answer for the spatial interpretation of (S, T) on a specified plane, based on the calibration table of optical device 1

3 Dimensional Spatial Interpretation

When a 2 or 3 dimensional space is represented by spatial parameters of unit length (or unit angular measurement, it is a discrete system in that only the status at the sequential points are measured and/or recorded with certain parameters. The obtained calibration table is one such example. Each unit length increment in the x, y, and z axes directions are given a set of records correlated to the x, y, and z axes values.

The x, y, z in our implementations are integer numbers while s and t are decimal numbers. Hence, it is easier to perceive and process the 3 dimensional spatial interpretations using the z-plane search approach.

Given a Z value in between z and z+1 where z is an integer, the Z-plane is created in the cuboid of (x, y, z) (x, y, z+1) (x, y+1, z+1) (x, y+1, z) (x+1, y, z) (x+1, y, z+1) (x+1, y+1, z+1) (x+1, y+1, z) with the (s, t) values corresponding to the calibration table of an optical device.

With reference to FIG. 21(B), it can be seen that the (s, t) values associated with (x, y, Z) (x, y+1, Z) (x+1, y+1, Z) (x+1, y, Z) are interpolated. To find (X, Y, Z) such that the optical device would read (S, T), the 2 dimensional spatial interpretation is performed to find X and Y such that the interpreted location of (S, T) is (X, Y). As Z value shifts, the X and Y values such that (X, Y, Z) reads (S, T) also shift. Note that a point is obtained in a 2 dimensional space as interpreted (S, T). A group of points are obtained on a line segment in a 3 dimensional space as interpreted (S, T). Another set of readings are employed, for example, based on a different target point. There should be only one point for (S, T) such that the values read for both target points satisfy.

Pixelated Interpretation

Figure 22:
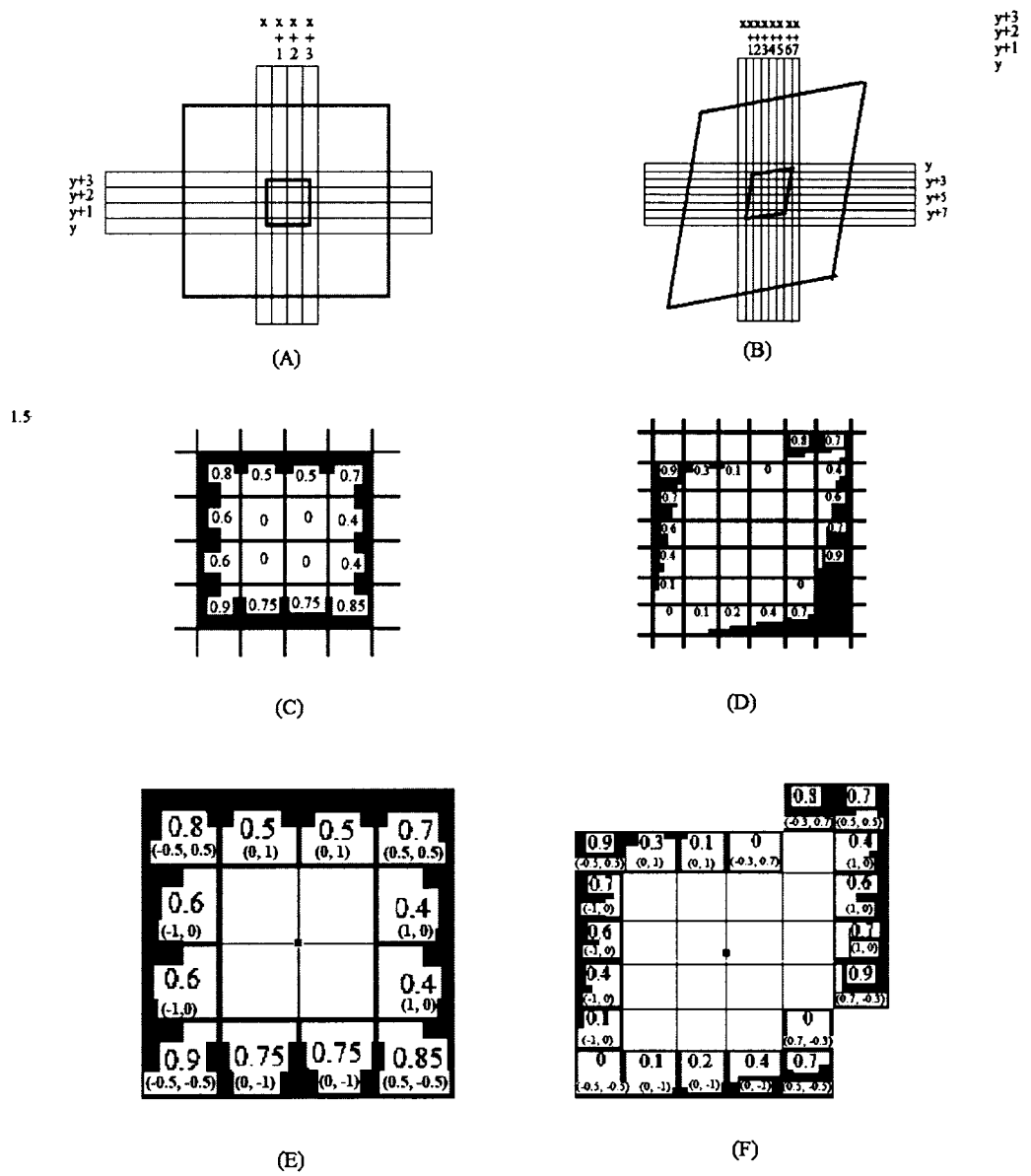
FIG. 22 illustrating pixel sensor readings and pixelated interpretations of the sensor readings in accordance with some embodiments of the invention.

A spatial interpretation which projects the fine locations, which are specified in resolution order of magnitude smaller than basic unit, within a 2 dimensional square or 3 dimensional cuboid based on interpolation on values associated with the locations is described herein. Here, the pixelated interpretation works reversely. The fine reading of pixel addresses are projected, which are an order of magnitude finer than pixel distance, based on accumulated information on a set of pixels representing a target point. This is illustrated in FIG. 22. The worst case on pixel resolution happens to be the best case for pixelated interpretation. With an implementation of 6 k resolution, 120 degree field of view and 3 meters away, the pixel resolution would be 6 per centimeter without accounting distortion. The physical target element is designed to be 0.5 cm in width and height.

This is done by identifying a shape comprising of a small cluster of image points so as to derive the center of the shape with a resolution order of magnitude finer than pixel resolution. Any enclosed 2 dimensional shape can be employed in principle. It should be noted that only the peripherals of the shape are sensitive to the sub-pixel positioning. By employing this image processing processes, a shape is derived having an edge composed of one layer of pixels with multiple readings levels between 1 and 0 and with pixel readings of opposite 0 or 1 extremes on the inside and outside of said shape. The geometric center of the shape is first obtained.

FIG. 22 shows a regular shape, a rectangle representing the center of the target point is read under a grid of optical sensors. FIG. 22(A) shows the center view and FIG. 22(B) shows the distorted broad angle view. We traverse the edge to obtain pixel readings P(x, y) and assign a percentage of weight attribute W in x axis, ranging between positive 1 and negative 1, based on the locations of the neighboring edge pixels and based on the direction of with or against the x axis. The weight on y axis is 1−|M|, also ranges between negative and positive 1, depending on directions of with or against the y axis. The pixelated interpretation of the target center (X, Y), is defined as adjustment in pixel unit distance from the geometric center of the shape. Shape analysis methodologies that are commonly used in image processing are employed to derive the images shown in FIGS. 22 (E) and (F). A simple x axis and y axis attribute assignment is performed to set a value of 100% to either axis on a straight line area (e.g. (1, 0) or (0, 1)), 50% 50% for middle of concave or convex area (e.g. (0.5, 0.5)), and 70% 30% for combine concave-convex area (e.g. (0.7, 0.3) or (0.3, 0.7)), depending on the axis to which the shape leans towards. The amount of grey level is then accumulated toward the x axis or y axis based on the percentage of attributes, respectively. Such an accumulation step performed over the full circle then divided by the span of width of the shape in the x and y axis (counting edge of the shape as half of a pixel distance), respectively. Pixelated interpretation is employed for shapes composed of say less than 256 pixels. When pixel resolution becomes order of magnitude finer, pixelated resolution is not needed. A detailed example of pixelated interpretation is described in greater detail in the later sections.

FIG. 22(C) and FIG. 22(D) show the pixel sensor readings and the pixelated interpretation of (A) and (B), respectively. The edge pixels for the square of FIG. 22(C) together with their weight attributes are shown in FIG. 22(E). The edge pixels for the square of FIG. 22(D) together with their weight attributes are shown in FIG. 22(F). Based on such methods, the optical device readings (s, t) no longer just reflect rows and columns of a sensor but are instead in decimal numbers.

There are major applications to this innovative pixelated interpretation, stated as follows:
1) Precise relative positioning for target element based vision
    Precision of relative positions and distance between 2 objects at sub-centimeter may come to be very important. When pixel resolution is at 0.5 to 1 centimeter, positioning the target point within a millimeter can be used, for example for the relative starting point of an object or machine code.
2) Precise depth perception
    FIG. 10 illustrates the direct correspondence between depth perception and sensor resolution. Traditional disparity generation depends on correspondence finding, which is also limited by pixel resolution. With the target point and pixelated interpretation, disparity displacement may be detect up to 10% of a pixel resolution, hence increase the depth perception by an order of magnitude.
3) Adjustment Against Horizontal/Vertical Line
    In whatever different setups, machine vision precision relies on precise knowledge or measurement of horizontal line. The relative displacement against z axis needs to be known for dual target point as well as dual cameras stereo vision, in most cases, just to ensure that the z axis displacement is 0. In the case of camera on rotation stage and dual targets, one of the proposed approaches is to rotate to where angle or engagement is 90 degrees. In such case, 10 times the pixel resolution is needed so as to adjust the camera angle to 0.1 degree accuracy.

Figure 23:
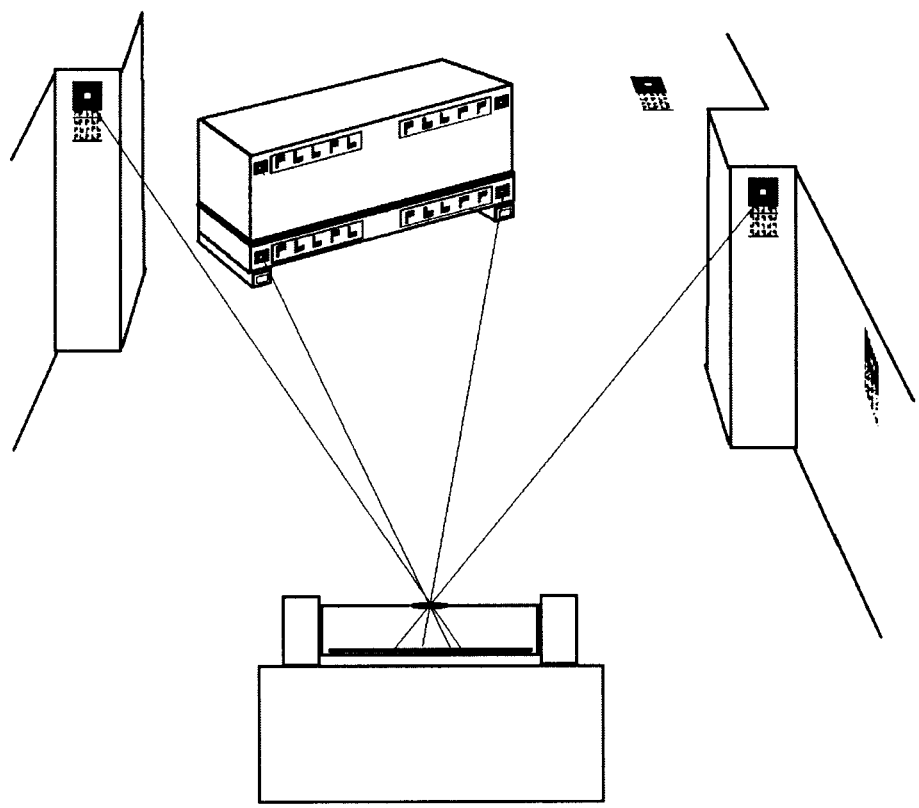
FIG. 23 illustrating an exemplary implementation of the single device monocular vision using fixed markers as well as movable objects whereby all captured images are resolved in a single snapshot in accordance with some embodiments of the invention.

Exemplary Embodiment—Own Position and Movable Object Positioning in One Snapshot FIG. 23 illustrates a handling machine provided with a monocular optical device at a height of 1.5 meters (not to scale). There are 2 types of markers at the scene, one with absolute coordinates relative to a global origin, the other without a known location, except information setting out its target type, which in effect is saying there is a coupling target at the other end of a cargo type. The machine vision first locates its own position and orientation by referring to the first target type. There is a marker on the wall which is at its edge of view and there is another marker on the ground which is small because it is far and tilted. There are two other markers on the pillars with good viewing angles at 3 meters height.

The global position and orientation of the optical device is first resolved based on information obtained from these markers. For example, the two markers are identified to be at (x1, y1, 1.5) and (x2, y2, 1.5) respectively relative to the optical device. The constraining rules state that their coordinate values relative to a warehouse wide global reference are (a1, b1, 3) and (a2, b2, 3) respectively, as the optical device is at 1.5 meters high. Since x1, y1, x2, y2, a1, a2, b1, b2 and the height of optical device are all known values, the only variables are the x and y axes values of the optical device relative to the global origin. After obtaining the location, the rotation angle of the optical device can be easily obtained.

Now, without having to consult with images from other devices, and without having to retake any further images, by utilizing the same snapshot, the optical device is able to accurately identify the global positioning and facing angle of the movable cargo in front. In this case, the pair of targets of the second type is provided in a horizontal arrangement whereby they are placed at a 15 cm height and 93 cm apart. With said cargo type, the pick-up pockets are right below the target centers. The method described above only requires a single snapshot to be taken. It not only records the snapshot status, but also eliminates error accumulation. By employing the method described above, the accurate location and orientation of the movable cargo is obtained for approaching and docking purposes.

Exemplary Embodiment—Z-plane Combining Constraining Rule Search Method

Figure 24:
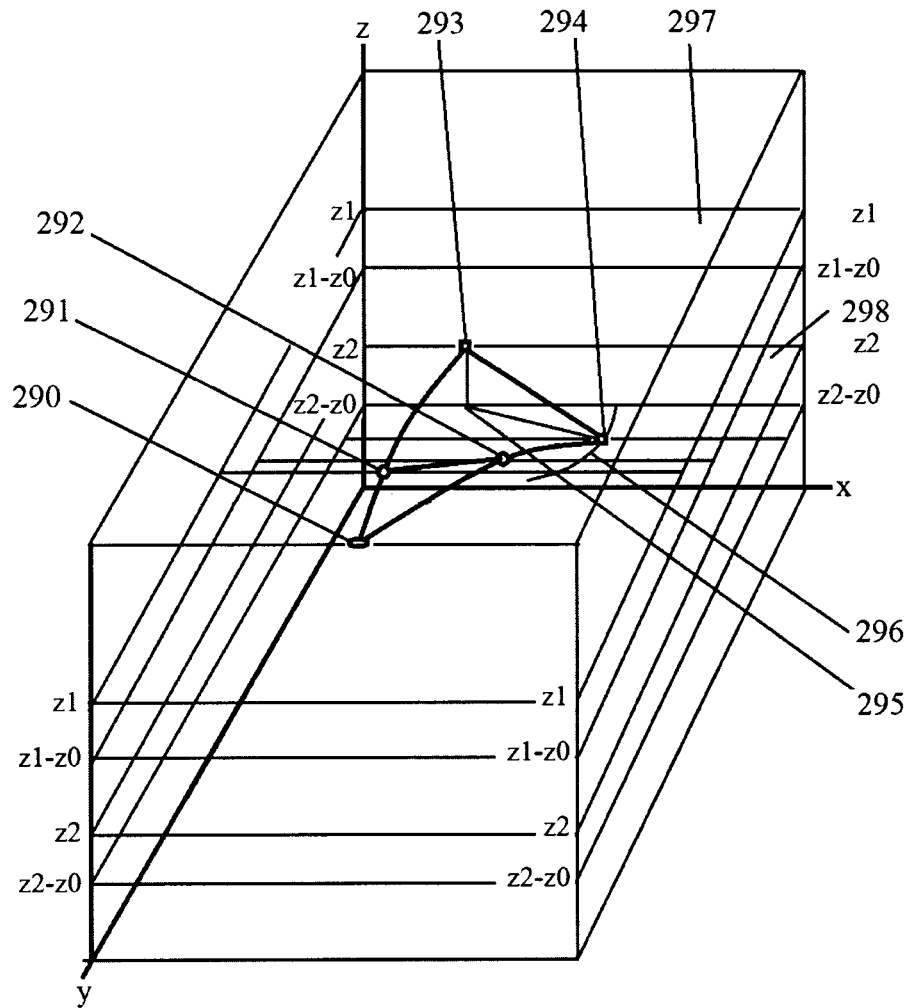
FIG. 24 illustrating a constraining rule search method for a monocular optical device in accordance with some embodiments of the invention.

FIG. 24 continues with the setup of FIG. 23 and illustrates in more detail an example of the monocular z-plane combining constraining rule search method for obtaining the positions of targets. For illustration purposes, diagonal target elements are used. It is assumed that the camera 290 is at a higher position than that of the left upper target element 293 and right lower target element 294. A z-plane 297 having a value of z1 is initially selected. According to the constraining rules, the lower target point is set as the (z1-z0)-plane and the target centers of targets 293 and 294 are D=110 cm apart. To recap, z0 is the vertical distance between the targets. A point 291 is found on the z1-plane to have the (s, t) readings and a point 292 is found on the (z1-z0)-plane to have the (u, v) readings. However, it is found that the distance between points 291 and 292 is shorter than the distance D, i.e. shorter than 110 cm.

Based on this result, it is estimated that the target element 293 may be on the z-plane 298 having the value of z2 instead. Based on this estimate, point 294 is then estimated to be on the (z2-z0)-plane. For illustration purposes, the constraining rules were elected to be used after target center 293 with the correct (s, t) readings were found. Dropping vertically down to point 295 on the (z2-z0)-plane, point 295 is then used as the center of a circle where every point is at a distance of D from the target center 293. In other words, a circle 296 is traced on this plane whereby every point on the circle has a distance D of 110 cm from point 293. If point 294 is identifying to be on the circle as having the required (u, v) reading, this means that the coordinates for both points 293 and 294 relative to the camera have been found.

Exemplary Embodiment on Sloped
Ramp—Utilization of Slopped Reference Plane

As illustrated in FIGS. 25A and 25B, the cargo is provided at a sloped ramp, evidently tilted. As can be seen from FIG. 25A, although the 2 target elements (at (x3, y3, z3) and (x4, y4, z4)) are provided at a height of 'z' cm above the ground of the slope, these target elements are no longer measured from the z=−1.5 level of the z-axis. Conversely, it should be noted that the optical device is actually provided at a plane that is parallel to a plane whereby z=0.

In this example, the constraining rules specify that both target elements (at T3 (x3, y3, z3) and T4 (x4, y4, z4)) are provided at $z_1$=10 cm above the reference plane (the ramp) and the points are D=95 cm apart. For the avoidance of confusion, the reference plane in this example comprises the slopped ramp itself.

As the reference plane is sloped, an equation is required to describe all the points contained within this reference plane. This may be done as follows: First, the target elements on the two sidewall pillars, which are (x1, y1, −1.5) and (x2, y2, −1.5), are identified. These two target elements contain information that specifies that the ramp starts slopping upwards from the edge of these pillars, with a slope of M (for example, 15% slope). The (x1, y1, −1.5) and (x2, y2, −1.5) coordinates of these two points may be obtained using the previously described calibration table matching methods. The next step is to then obtain the points on the reference plane.

A junction line 2501 between the sloping ramp and the z=−1.5 plane may be described as:

$$y=y1+[(y2-y1)/(x2-x1)]*x$$

An angle A along the junction line 2501 may be described as Cos $(A)=(x2-x1)/[(y2-y1)^2+(x2-x1)^2]^{1/2}$ while a line in parallel to the junction line 2501 along the z=−1.5 plane may be described as y=y1+(y2−y1)/(x2−x1)*x+y0, where y0 is the difference between they value of a point on z=−1.5 plane vertically under the target element T3 (or any point of interest, for example, target point T4) and the y value of a point on line 2501 with the same x.

Based on the equations above, the z value immediately below the target element T3 may be obtained as z=M*Cos (A)*y0−1.5, where M is the slope of the ramp, which in this example is set as 15%. When the equation for y0=z/[M*Cos (A)] is utilized, points on the reference plane may then be defined by the equation:

$$z=M*((x2-x1)/((y2-y1)^2+(x2-x1)^2)^{1/2})(y-y1-((y2-y1)/(x2-x1)*x)-1.5$$

Once the reference plane has been defined, all the previously described search methodologies may then be applied.

Examples of the Innovative Vision Systems

Reference is made to FIG. 15. The y axis represents depth and z axis represents vertical direction. Parameter values are plugged in for illustration purpose.

Calibration Tables

Optical Device 1 Calibration Table CT1(x, y, z)=(s, t) is recorded from the camera calibration process is as follows:

| y | x= | | −4 | −3 | −2 | −1 | 0 | 1 | 2 |
|---|---|---|---|---|---|---|---|---|---|
| y = 1 | z = | −2 | 4, 2 | 3, 2 | 2, 2 | 1, 2 | 0, 3 | −1, 3 | −2, 3 |
| | | −3 | 4, 3 | 3, 3 | 2, 3 | 1, 3 | 0, 4 | −1, 4 | −2, 4 |
| | | −4 | 4, 4 | 3, 4 | 2, 4 | 1, 4 | 0, 4 | −1, 4 | −1, 4 |
| | | −5 | 4, 5 | 3, 5 | 2, 5 | 1, 5 | 0, 5 | −1, 5 | −1, 5 |
| y = 2 | x = | | −4 | −3 | −2 | −1 | 0 | 1 | 2 |
| | z = | −2 | 8, 3 | 6, 3 | 4, 4 | 2, 4 | 0, 4 | −2, 4 | −4, 4 |
| | | −3 | 8, 6 | 6, 6 | 4, 6 | 2, 6 | 0, 6 | −2, 6 | −4, 6 |
| | | −4 | 8, 7 | 6, 7 | 4, 7 | 2, 8 | 0, 8 | −2, 8 | −4, 8 |
| | | −5 | 8, 10 | 6, 10 | 4, 10 | 2, 10 | 0, 10 | −2, 9 | −4, 9 |
| y = 3 | x = | | −4 | −3 | −2 | −1 | 0 | 1 | 2 |
| | z = | −2 | 12, 6 | 9, 6 | 6, 6 | 3, 6 | 0, 6 | −3, 6 | −5, 6 |
| | | −3 | 12, 9 | 9, 9 | 6, 9 | 3, 9 | 0, 9 | −3, 9 | −6, 10 |
| | | −4 | 12, 12 | 9, 12 | 6, 12 | 3, 12 | 0, 12 | −3, 11 | −6, 11 |
| | | −5 | 12, 14 | 9, 14 | 6, 14 | 3, 14 | 0, 14 | −3, 14 | −6, 14 |
| y = 4 | x = | | −4 | −3 | −2 | −1 | 0 | 1 | 2 |
| | z = | −2 | 16, 8 | 12, 8 | 8, 8 | 4, 8 | 0, 8 | −4, 8 | −7, 8 |
| | | −3 | 15, 11 | 11, 11 | 8, 11 | 4, 12 | 0, 12 | −4, 12 | −8, 12 |
| | | −4 | 15, 15 | 11, 15 | 8, 16 | 4, 16 | 0, 16 | −4, 16 | −8, 16 |
| | | −5 | 15, 19 | 11, 19 | 8, 19 | 4, 19 | 0, 19 | −4, 19 | −8, 19 |
| y = 5 | x = | | −4 | −3 | −2 | −1 | 0 | 1 | 2 |
| | z = | −2 | 20, 10 | 15, 10 | 10, 10 | 5, 10 | 0, 11 | −5, 11 | −9, 11 |
| | | −3 | 20, 15 | 15, 15 | 10, 15 | 5, 15 | 0, 15 | −5, 15 | −9, 15 |
| | | −4 | 20, 20 | 15, 20 | 10, 20 | 5, 20 | 0, 20 | −5, 20 | −9, 20 |
| | | −5 | 20, 24 | 15, 24 | 10, 24 | 5, 24 | 0, 24 | −5, 24 | −9, 24 |

Optical Device 2 Calibration Table CT2(x, y, z)=(u, v) is as follows:

| y | x= | | 0 | 1 | 2 | 3 | 4 | 5 |
|---|---|---|---|---|---|---|---|---|
| y = 1 | z = | −4 | 0, 4 | −1, 4 | −2, 4 | −3, 4 | −3, 4 | null |
| | | −5 | 0, 5 | −1, 5 | −2, 5 | −3, 5 | −3, 5 | null |
| | | −6 | 0, 6 | −1, 6 | −2, 6 | −3, 6 | −3, 6 | null |
| y = 2 | x = | | 0 | 1 | 2 | 3 | 4 | 5 |
| | z = | −4 | 0, 8 | −2, 8 | −4, 8 | −6, 8 | −7, 8 | null |
| | | −5 | 0, 10 | −2, 10 | −4, 10 | −6, 10 | −7, 10 | null |
| | | −6 | 0, 11 | −2, 11 | −4, 12 | −6, 12 | −7, 12 | null |
| y = 3 | x = | | 0 | 1 | 2 | 3 | 4 | 5 |
| | z = | −4 | 0, 12 | −3, 12 | −6, 12 | −9, 12 | −11, 12 | null |
| | | −5 | 0. 15 | −3, 15 | −6, 15 | −9, 15 | −11, 15 | null |
| | | −6 | 0, 17 | −3, 18 | −6, 18 | −9, 18 | −12, 18 | null |
| y = 4 | x = | | 0 | 1 | 2 | 3 | 4 | 5 |
| | z = | −4 | 0, 16 | −4, 16 | −8, 16 | −13, 15 | −15, 15 | null |
| | | −5 | 0, 19 | −4, 19 | −8, 19 | −13, 19 | −16, 19 | null |
| | | −6 | 0, 23 | −4, 23 | −8, 23 | −13, 23 | −16, 23 | null |

Both tables are assumed to be monotonic and reasonably non-linear.

Machine Vision Positioning Method

Reference is made to FIG. 15. The positioning starts with the optical devices in their known positions each capturing Target Points 1-4 and generating the (s, t) values associated with each target point. The line of sights between each target point and each optical device is represented by light of sights R1, R2 ... Ri. To recap, CT1 refers to optical device 1 and CT2 refers to optical device 2. The (x, y, z) values shown below are exemplary values associated with the generated (s, t) values as obtained from the previously generated calibration tables. In this example, it is assumed that target point 2 contains a marker that sets out its z-displacement from target point 1, i.e. z1+1.

R1: CT2(x1, y1, z1)=(0, 15)
R2: CT2(x2, y2, z1+1)=(-13, 15)
R3: CT1(x1, y1, z1)=(11, 11)
R4: CT1(x2, y2, z1+1)=(0, 11)
R5: CT1(x3, y3, z1-1)=(-6, 11)
R6: CT2(x3, y3, z1-1)=null
R7: CT1(x4, y4, z1+1)=(-5, 6)

Although the locations for the 3 target points are indicated in FIG. 15, these locations are not provided initially and are obtained by traversing the calibration tables.

Example on Machine Vision for One Camera and 2 Target Points

In this example, the monocular vision between optical device 1 and target points 1 and 2 are described. Optical Device 1 is used to obtain (s, t) readings for Target Point 1 and Target Point 2. The 2 rays representing this are:
R3: CT1 (x1, y1, z1)=(11, 11), R4: CT1 (x2, y2, z1+1)=(0, 11)
Target Point 1 (11,11)

In the real world, the calibration table would comprise 75 million entries hence, the (s, t) readings would not have been easy to obtain from this table using the brute force method. A z-plane search is therefor used to traverse the calibration table.

A z-plane search is then carried out as previously described, starting with the far side of the vision range of interest, with z1 set as "-4". A z-plane having this z-value is sectioned from the calibration table as follows:

| | | | z = -4 | | | | |
|---|---|---|---|---|---|---|---|
| x = | -4 | -3 | -2 | -1 | 0 | 1 | 2 |
| y = 1 | 4, 4 | 3, 4 | 2, 4 | 1, 4 | 0, 4 | -1, 4 | -1, 4 |
| y = 2 | 8, 7 | 6, 7 | 4, 7 | 2, 8 | 0, 8 | -2, 8 | -4, 8 |
| y = 3 | 12, 12 | 9, 12 | 6, 12 | 3, 12 | 0, 12 | -3, 11 | -6, 11 |
| y = 4 | 15, 15 | 11, 15 | 8, 16 | 4, 16 | 0, 16 | -4, 16 | -8, 16 |
| y = 5 | 20, 20 | 15, 20 | 10, 20 | 5, 20 | 0, 20 | -5, 20 | -9, 20 |

R3's (s, t) values are (11, 11) and this (s, t) value may not be found in the section shown above. Hence, there is the option of adopting the Linear Interpolation method as described below.

Linear Interpolation for Z-Plane Search

Reference is made to FIG. 11(A). Linear interpolation is first applied to the 4 corners of the table at z=-4 and their associated (s, t) values. As in the text descriptions, we use:
s=11→Find Y1 on the edge where x=-4:

$$Y1 = y0 + (\text{global length in } y) *$$
$$(\text{interpolated ratio of } s \text{ for } x = -4)$$
$$= y0 + (|y1 - y0|) * (|s - s00|)/(|s01 - s00|)$$
$$= 1 + 4 * (7/16) = 2.75$$

Find X2 on the edge where y=5:

$$X2 = x0 + (\text{global length in } x) *$$
$$(\text{interpolated ratio of } s \text{ for } y = 5)$$
$$= x0 + (|x1 - x0|) * (|s - s01|)/(|s11 - s01|)$$
$$= -4 + 6 * (9/29) = -2.14$$

Hence, any point on the connected line segment has s=11.

$$S \text{ Line is } y=Y1+(x-X1)*((Y2-Y1)/(X2-X1))$$

Interpolate on S where t=11→

At (-4, 2.75), $CT1(-4, 2.75)=(11,11)$

At (-2.14, 5), $CT1(-2.14, 5)=(11, 20)$ we identify (-4, 2.75) has interpolated value of (11,11) on the calibration table 1 at z=-4.

In practice, the z-plane table would comprise 500×500 entries so that the obtained linear interpolation result would be a few cells away from the actual answer. Local gradient stepping may then be employed to obtain a more accurate result.

Local Gradient Stepping

Local gradient stepping may be carried out by arbitrarily traversing from an edge in the z-plane. The methodology of local gradient stepping is set out as follows:

An arbitrary point is first selected from the z-plane having the value (z=-4). In this example, the arbitrary point is selected as CT1(-1, 1, -4)=(1, 4). Eight adjacent (s, t) values are then computed using the formula $|s-sCT1|+|t-tCT1|$ (e.g. (sCT1, tCT1) is (11, 11)) to determine an adjacent (s, t) value that provides the minimum value. In this example, it is determined that (-2, 2, -4)=(4, 7) provides the minimum value as set out below:
→CT1(-2, 2, -4)=(4, 7) has the minimum $|s-11|+|t-11|=11$.
The step above is then repeated to determine the adjacent (s, t) value to (4, 7) that provides the minimum value. This is obtained as:
→CT1(-3, 3, -4)=(9, 12) has the minimum $|s-11|+|t-11|=3$.

When the step above is repeated for the (s, t) value (9, 12) it is found that the adjacent (s, t) values produces values larger than 3 hence, the local gradient stepping methodology stops here.

It can be seen that when the result obtained from this method is compared with the result obtained from the linear interpolation method described in the previous section, the two results are almost similar, i.e. the (-3, 3, -4) point is already part of the neighboring cells to start performing spatial interpretation.

In another particular embodiment of this example, another arbitrary point in the z-plane is first selected and this point is selected as CT1(-1, 5, -4)=(5, 20). When the steps described above are repeated, it can be seen that the final result is the same, that (-3, 3, -4) with (s, t) value of (9, 12) generates the minimum value for the formula $|s-sCT1|+|t-tCT1|$ in this z-plane.
→CT1(-2, 4, -4)=(8, 16) has the minimum $|s-11|+|t-11|=8$.
→CT1(-3, 3, -4)=(9, 12) has the minimum $|s-11|+|t-11|=3$, which is the same destination as the earlier traversal.

2 Dimensional Spatial Interpretation

Based on the above alternatives of traversing the calibration table of optical device 1, a square of 4 neighboring entries are selected:

X=−4 -3
y=2 8, 7 6, 7
y=3 12, 12 9, 12
with ranges of s value for (−4, 2) (−4, 3) segment and (−3, 3) (−4, 3) segment covering s=11 and ranges for (−4, 2) (−4, 3) segment and (−3, 2) (−3, 3) segment covering t=11.

A 2 dimensional spatial interpretation as shown in FIG. 21(A) is utilized and as detailed later, the following is obtained: X=−3.93 y=2.8, for z=−4
Target Point 2 (0, 11)

The z-plane search on Target point 2 is at z=−3, as the location of target point 2 is specified to be 1 unit higher, at z1+1. This information may be conveyed to the camera using machine braille language that may be affixed to the target points or may be positioned adjacent the target points such that the camera is able to capture this information as the camera generates (s, t) values for the target points. The grid below shows an exemplary section of a calibration table for:

| | | | z = −3 | | | | |
|---|---|---|---|---|---|---|---|
| x = | −4 | −3 | −2 | −1 | 0 | 1 | 2 |
| y = 1 | 4, 3 | 3, 3 | 2, 3 | 1, 3 | 0, 4 | −1, 4 | −2, 4 |
| y = 2 | 8, 6 | 6, 6 | 4, 6 | 2, 6 | 0, 6 | −2, 6 | −4, 6 |
| y = 3 | 12, 9 | 9, 9 | 6, 9 | 3, 9 | 0, 9 | −3, 9 | −6, 10 |
| y = 4 | 15, 11 | 11, 11 | 8, 11 | 4, 12 | 0, 12 | −4, 12 | −8, 12 |
| y = 5 | 20, 15 | 15, 15 | 10, 15 | 5, 15 | 0, 15 | −5, 15 | −9, 15 |

To recap, R4's (u, v) readings are (0, 11), hence by scanning the table above for z=−3, the closest match is found to be about:
X=0
Y=3 0, 9
Y=4 0, 12

Using one dimensional spatial interpretation, which is just a scalar measurement, (spatial interpretation is the same as linear interpolation) the following values were obtained:
x=0, y=3.7 at z=−3

Similar linear interpretation and local gradient calculations may be carried out for (u, v) and the methodology are the same as that performed in the previous section for (s, t).

The (x, y, z) value for Target Point 2 and Target Point 1 are then verified by verifying the displacement between these two points. This displacement value may similarly be conveyed to optical device 1 using machine braille language that may be affixed to the target points or may be positioned adjacent the target points such that optical device 1 is able to capture this information as the (s, t) values for the target points are generated.

In the example above, Target Point s1 produced (−3.9, 2.8, −4) and Target Point 2 produced (0, 3.7, −3) and based on these values, the displacement between these two points were found to be 4.1. However, the actual displacement between these two target points are D12=3.3. Hence the search at z=−4 results in distance larger than D12, by a ratio of 24%.

As a result, the z value of the z-plane is varied and in this example, the z value in increased to z1=−3 and the processes above repeat until the displacement between Target Points 1 and 2's (x, y, z) are obtained as D12=3.3.

Local Gradient Stepping in Z Direction

Here, instead of repeating the process for a different z-axis value, e.g. z1=−4, the local gradient stepping method may be applied towards a neighboring z-plane. It is useful to point out here that the local gradient stepping method does not restrict stepping distance such that it can be handily used when z is changed by more than 1.

Since the repeated z-plane search provides a result that is close to the actual final value, a local gradient search based on the earlier finding with z1=−4 may then be carried out. From the previous section, for the (s, t) values, a coordinate of (−3.7, 2.8, −4) was obtained. Hence, the local gradient stepping may be started with (−4, 3, −3). The following was obtained:
CT1 (−3, 4, −3)=(11, 11) and
CT2 (0, 5, −2)=(0, 11).

Distance between these points is 3.3, equaling D12. Hence the answer has been obtained.

To recap,
1) Start with the optical device 1 and target point 1. From a further value of z1, on the z-plane an (x11, y11) cell with (s, t) near the (s, t)=(11, 11) reading is obtained using linear interpretation.
2) The number of entries in the example is small. Local gradient stepping is then demonstrated by stepping from a distance away.
3) 2 dimensional spatial interpretation is then applied to obtain a precise (x12, y12) such that (s, t)=(11, 11)
4) The steps above are repeated for target point 2 on a z-plane which is z0 apart from the above z value and (x22, y22) is obtained such that (u, v)=(0, 11)
5) The distance between (x12, y12) and (x22, y22) is 24% longer than D12, which gives a projected new z2 value for the new z-plane.
6) Local gradient stepping is applied from (x12, y12, z1) to obtain (x13, y13, z2). Local gradient stepping is applied from (x22, y22 z2+1) to obtain (x23, y23, z2+1). The distance between (x13, y13, z2) and (x23, y23, z2+1) is found to be equal to D12 hence, a match is obtained.

Example of the Vertical Pair of Target Points

The degenerated case between Optical Device 1 and Target Points 3 and 4 is described in this section. The corresponding light rays are:
R5: CT1 (x3, y3, z1−1)=(−6, 11)
R7: CT1 (x4, y4, z1+1)=(−5, 6)

In this section, it is assumed target points are in a vertical arrangement. For this arrangement, the line connecting the pair is in the direction of gravity or both have a common z axis as that of the camera. The task is to find (x, y, z) such that
CT1(x, y, z)=(−6, 11) and (CT1(x, y, z+2)=(−5, 6)

At the depth (y axis) equaling 3, the y-plane shows when x=2 and z=−4 or z=−2, a match will be found. This also means that target point 3 is at (2, 3, −4) and target point 4 is at (2, 3, −2). This demonstrates that one can trace up/down from one target point to the other regardless of the viewing direction from the optical device, then one may trace back to the optical device so that the one location (the optical device or the first target location, mutually reversible) matching the 2 readings is the answer.

| | | | | z = −2 | | | | |
|---|---|---|---|---|---|---|---|---|
| y = 3 | x = | −4 | −3 | −2 | −1 | 0 | 1 | 2 |
| | z = −2 | 12, 6 | 9, 6 | 6, 6 | 3, 6 | 0, 6 | −3, 6 | −5, 6 |
| | −3 | 12, 9 | 9, 9 | 6, 9 | 3, 9 | 0, 9 | −3, 9 | −6, 10 |
| | −4 | 12, 12 | 9, 12 | 6, 12 | 3, 12 | 0, 12 | −3, 11 | −6, 11 |
| | −5 | 12, 14 | 9, 14 | 6, 14 | 3, 14 | 0, 14 | −3, 14 | −6, 14 |

Example of the Crossed Eyes Vision

In such a setup, the locations transform from target point 1 to optical device 1 via R3, then to optical device 2 via known relative positions between the optical devices, then cross over to Target point 2. The disparity is doubled. The example is as follows.

R2: CT2(x2, y2, z1+1)=(−13, 15)
R3: CT1(x1, y1, z1)=(11, 11)

The task is to use z-plane search method and find (x, y, z) such that CT1(x, y, z)=(11, 11) and CT2(x2−x0, y2−y0, z+Z2−z0)=(−13,15). That is CT2(x2+3, y2−1, z−1)=(−13, 15) where D12=3.3 is satisfied or alternatively may be written as CT2(x2+3, y2−1, z2−2)=(−13,15).

Starting with z=−2, with calibration table 1 reassembled as:

| | | | z = −2 | | | |
|---|---|---|---|---|---|---|
| x = | −4 | −3 | −2 | −1 | 0 | 1 | 2 |
| y = 1 | 4, 2 | 3, 2 | 2, 2 | 1, 2 | 0, 3 | −1, 3 | −2, 3 |
| y = 2 | 8, 3 | 6, 3 | 4, 4 | 2, 4 | 0, 4 | −2, 4 | −4, 4 |
| y = 3 | 12, 6 | 9, 6 | 6, 6 | 3, 6 | 0, 6 | −3, 6 | −5, 6 |
| y = 4 | 16, 8 | 12, 8 | 8, 8 | 4, 8 | 0, 8 | −4, 8 | −7, 8 |
| y = 5 | 20, 10 | 15, 10 | 10, 10 | 5, 10 | 0, 11 | −5, 11 | −9, 11 |

It is found that R3 matches the s=11 value at about (−4, 3), (−3, 4) or (−2, 5). However, it can be seen that the t=11 match is off chart, at beyond (−2, 5). It can be concluded that the z=−2 value is too shallow so the guessed R3 goes out of the current vision range of interest. Hence, z is set as "−3".

The z-plane for Target point 1 at z-plane for z=−3 has a match for CT1(−3, 4, −3):

| | | | z = −3 | | | |
|---|---|---|---|---|---|---|
| x = | −4 | −3 | −2 | −1 | 0 | 1 | 2 |
| y = 1 | 4, 3 | 3, 3 | 2, 3 | 1, 3 | 0, 4 | −1, 4 | −2, 4 |
| y = 2 | 8, 6 | 6, 6 | 4, 6 | 2, 6 | 0, 6 | −2, 6 | −4, 6 |
| y = 3 | 12, 9 | 9, 9 | 6, 9 | 3, 9 | 0, 9 | −3, 9 | −6, 10 |
| y = 4 | 15, 11 | 11, 11 | 8, 11 | 4, 12 | 0, 12 | −4, 12 | −8, 12 |
| y = 5 | 20, 15 | 15, 15 | 10, 15 | 5, 15 | 0, 15 | −5, 15 | −9, 15 |

The z-plane for Target point 2 at z-plane for z=−2−2=−4 has a match for CT2(3, 4, −4):

| | | | z = −4 | | | |
|---|---|---|---|---|---|---|
| x = | 0 | 1 | 2 | 3 | 4 | 5 |
| y = 1 | 0, 4 | −1, 4 | −2, 4 | −3, 4 | −3, 4 | null |
| y = 2 | 0, 8 | −2, 8 | −4, 8 | −6, 8 | −7, 8 | null |
| y = 3 | 0, 12 | −3, 12 | −6, 12 | −9, 12 | −11, 12 | null |
| y = 4 | 0, 16 | −4, 16 | −8, 16 | −13, 15 | −15, 15 | null |

Compared with CT2(x2+3, y2−1, z2−2)=(−13,15), the following is obtained: x2=0, y2=5, z=−3 and z2=z+1=−2

Hence the match for target point 2 at location (0, 5, −2) relative to optical device 1 has been found.

Example for 3 Target Points Viewed by 1 Optical Device

The task is to use readings for target point 1, 2 and 3 by optical device 1 to obtain locations for said 3 target points. That is, find x1, y1, z1, x2, y2, x3, y3 such that CT1 (x1, y1, z1)=R3, CT1 (x2, y2, z1+Z2)=R4 and CT(x3, y3, z1+Z3)= R5, and D12, D23 and D13 are correct.

In this example,
R3: CT1(x1, y1, z1)=(11, 11)
R4: CT1 (x2, y2, z1+1)=(0, 11)
R5: CT1 (x3, y3, z1−1)=(−6, 11)

Values for R3+R4 have already been obtained. By the same token, R4+R5 and R3+R5 can be individually selected and solved separately. Multiple points can also be resolved in one round, with more robust calculations based on more sets of information, as follows:

When z-plane search was performed for z=−4 to search for target point 1, one could meanwhile try z=−5 for target point 3, since it is given that target point 3 is one level lower on the z axis.

| | | | z = −5 | | | |
|---|---|---|---|---|---|---|
| x = | −4 | −3 | −2 | −1 | 0 | 1 | 2 |
| y = 1 | 4, 5 | 3, 5 | 2, 5 | 1, 5 | 0, 5 | −1, 5 | −1, 5 |
| y = 2 | 8, 10 | 6, 10 | 4, 10 | 2, 10 | 0, 10 | −2, 9 | −4, 9 |
| y = 3 | 12, 14 | 9, 14 | 6, 14 | 3, 14 | 0, 14 | −3, 14 | −6, 14 |
| y = 4 | 15, 19 | 11, 19 | 8, 19 | 4, 19 | 0, 19 | −4, 19 | −8, 19 |
| y = 5 | 20, 24 | 15, 24 | 10, 24 | 5, 24 | 0, 24 | −5, 24 | −9, 24 |

Using linear interpolation/extrapolation, it is found that only where x=2 and y>2 have s values larger than 5, while the same entries have t greater than 13, hence the entry to match (−6, 11) is outside of the range of interest. Hence, one needs to go one level shallower,

| | | | z = −4 | | | |
|---|---|---|---|---|---|---|
| x = | −4 | −3 | −2 | −1 | 0 | 1 | 2 |
| y = 1 | 4, 4 | 3, 4 | 2, 4 | 1, 4 | 0, 4 | −1, 4 | −1, 4 |
| y = 2 | 8, 7 | 6, 7 | 4, 7 | 2, 8 | 0, 8 | −2, 8 | −4, 8 |
| y = 3 | 12, 12 | 9, 12 | 6, 12 | 3, 12 | 0, 12 | −3, 11 | −6, 11 |
| y = 4 | 15, 15 | 11, 15 | 8, 16 | 4, 16 | 0, 16 | −4, 16 | −8, 16 |
| y = 5 | 20, 20 | 15, 20 | 10, 20 | 5, 20 | 0, 20 | −5, 20 | −9, 20 | which means CT1 (2, 3, −4)=(−6, 11). The first 2 was already found in the 2 target points example. The distance between target point 1 and 3 was found to be 6.2 and distance between target point 2 and 4 to be 4.1. The distance conditions are satisfied. Hence we have found all 3 matches.

R3: CT1 (−3, 4, 3)=(11, 11)
R4: CT1 (0, 5, −2)=(0, 11)
R5: CT1 (2, 3, −4)=(−6, 11)

That is target point 1 is (−3, 4, 3), target point 2 is (0, 5, −2) and target point 3 is (2, 3, −4) relative to optical device 1.

Example for One Target Point, 2 Optical Device

This section describes the scenario where 2 cameras are facing a target point in the vision range. (This is one step more advanced than a traditional 2 camera stereo version where the system is degenerated into y0=0 and z0=0. The traditional stereo vision of finding "correspondence" is replaced in this set up by placing target element and identifying center of the target point.)

R4: CT2(x2, y2, z2)=(0, 11)
R2: CT2(x2−x0, y2−y0, z2−z0)=CT2(x2+3, y2−1, y2−2)= (−13, 15)

The z-plan for target point 1 at z=−2 has a match for CT1(0, 5, 2)=(0, 11):

| | | | z = −2 | | | |
|---|---|---|---|---|---|---|
| x = | −4 | −3 | −2 | −1 | 0 | 1 | 2 |
| y = 1 | 4, 2 | 3, 2 | 2, 2 | 1, 2 | 0, 3 | −1, 3 | −2, 3 |
| y = 2 | 8, 3 | 6, 3 | 4, 4 | 2, 4 | 0, 4 | −2, 4 | −4, 4 |
| y = 3 | 12, 6 | 9, 6 | 6, 6 | 3, 6 | 0, 6 | −3, 6 | −5, 6 |
| y = 4 | 16, 8 | 12, 8 | 8, 8 | 4, 8 | 0, 8 | −4, 8 | −7, 8 |
| y = 5 | 20, 10 | 15, 10 | 10, 10 | 5, 10 | 0, 11 | −5, 11 | −9, 11 |

The z-plane for target point 2 at z=−2−2=−4 has a match for CT2(3, 4, −4)=(−13, 15)

| z = −4 | | | | | | |
|---|---|---|---|---|---|---|
| x = | 0 | 1 | 2 | 3 | 4 | 5 |
| y = 1 | 0, 4 | −1, 4 | −2, 4 | −3, 4 | −3, 4 | null |
| y = 2 | 0, 8 | −2, 8 | −4, 8 | −6, 8 | −7, 8 | null |
| y = 3 | 0, 12 | −3, 12 | −6, 12 | −9, 12 | −11, 12 | null |
| y = 4 | 0, 16 | −4, 16 | −8, 16 | −13, 15 | −15, 15 | null |

Hence the answer is (0, 5, −2) relative to optical device 1, or (3, 4, −4) relative to optical device 2.

Example for Inverse Calibration Summarization Table Method (Applicable to all Calibration Table Searches)

Based on the Searching Calibration Table Section Method, the following reverse table may be obtained as follows. As it is a summary, s and t values are assumed to be grouped into groups whereby values between 0-4 are represented as 0, values between 5-9 are represented as 9, values between 10-14 are represented as 10, values between 15-19 are represented as 15 and values between 20-24 are represented as 20. The calibration table is first organized via z values, and then the inverse table for each z value is built such that the table's headers comprise the two-dimensional locations of captured images of the target centers on the optical device's sensor and such that the table's content comprises the associated positions of target centers relative to the optical device. In the examples below, the table's headers comprise the (s, t) values while the table's contents comprise the (x, y, z) readings. This may be shown as CTI(s,t,z)=(x,y).

| Z = −2 | | | | | | | |
|---|---|---|---|---|---|---|---|
| x = | −4 | −3 | −2 | −1 | 0 | 1 | 2 |
| y = 1 | 4, 2 | 3, 2 | 2, 2 | 1, 2 | 0, 3 | −1, 3 | −2, 3 |
| y = 2 | 8, 3 | 6, 3 | 4, 4 | 2, 4 | 0, 4 | −2, 4 | −4, 4 |
| y = 3 | 12, 6 | 9, 6 | 6, 6 | 3, 6 | 0, 6 | −3, 6 | −5, 6 |
| y = 4 | 16, 8 | 12, 8 | 8, 8 | 4, 8 | 0, 8 | −4, 8 | −7, 8 |
| y = 5 | 20, 10 | 15, 10 | 10, 10 | 5, 10 | 0, 11 | −5, 11 | −9, 11 |
| s = | −10 | −5 | 0 | 5 | 10 | 15 | 20 |
| t = 0 | | | −1, 1 | −3, 2 | | | |
| t = 5 | | 2, 3 | 0, 3 | −2, 3 | | | |
| t = 10 | | 1, 5 | 0, 5 | −1, 5 | −2, 5 | −3, 5 | −4, 5 |
| t = 15 | | | | | | | |
| t = 20 | | | | | | | |

| Z = −3 | | | | | | | |
|---|---|---|---|---|---|---|---|
| x = | −4 | −3 | −2 | −1 | 0 | 1 | 2 |
| y = 1 | 4, 3 | 3, 3 | 2, 3 | 1, 3 | 0, 4 | −1, 4 | −2, 4 |
| y = 2 | 8, 6 | 6, 6 | 4, 6 | 2, 6 | 0, 6 | −2, 6 | −4, 6 |
| y = 3 | 12, 9 | 9, 9 | 6, 9 | 3, 9 | 0, 9 | −3, 9 | −6, 10 |
| y = 4 | 15, 11 | 11, 11 | 8, 11 | 4, 12 | 0, 12 | −4, 12 | −8, 12 |
| y = 5 | 20, 15 | 15, 15 | 10, 15 | 5, 15 | 0, 15 | −5, 15 | −9, 15 |
| s = | −10 | −5 | 0 | 5 | 10 | 15 | 20 |
| t = 0 | | | −1, 1 | | | | |
| t = 5 | | | 0, 2 | −3, 2 | −4, 3 | | |
| t = 10 | | 2, 4 | 0, 4 | −2, 4 | −3, 4 | | |
| t = 15 | | 1, 5 | 0, 5 | −1, 5 | −2, 5 | −3, 5 | −4, 5 |
| t = 20 | | | | | | | |

| Z = −4 | | | | | | | |
|---|---|---|---|---|---|---|---|
| x = | −4 | −3 | −2 | −1 | 0 | 1 | 2 |
| y = 1 | 4, 4 | 3, 4 | 2, 4 | 1, 4 | 0, 4 | −1, 4 | −1, 4 |
| y = 2 | 8, 7 | 6, 7 | 4, 7 | 2, 8 | 0, 8 | −2, 8 | −4, 8 |
| y = 3 | 12, 12 | 9, 12 | 6, 12 | 3, 12 | 0, 12 | −3, 11 | −6, 11 |
| y = 4 | 15, 15 | 11, 15 | 8, 16 | 4, 16 | 0, 16 | −4, 16 | −8, 16 |
| y = 5 | 20, 20 | 15, 20 | 10, 20 | 5, 20 | 0, 20 | −5, 20 | −9, 20 |
| s = | −10 | −5 | 0 | 5 | 10 | 15 | 20 |
| t = 0 | | | −1, 1 | | | | |
| t = 5 | | | 0, 2 | −3, 2 | −2, 3 | | |
| t = 10 | | 2, 3 | 0, 3 | −2, 3 | −4, 3 | | |
| t = 15 | | 2, 4 | 0, 4 | −2, 4 | −3, 4 | −4, 4 | |
| t = 20 | | 1, 5 | 0, 5 | −1, 5 | −2, 5 | −3, 5 | −4, 5 |

| Z = −5 | | | | | | | |
|---|---|---|---|---|---|---|---|
| x = | −4 | −3 | −2 | −1 | 0 | 1 | 2 |
| y = 1 | 4, 5 | 3, 5 | 2, 5 | 1, 5 | 0, 5 | −1, 5 | −1, 5 |
| y = 2 | 8, 10 | 6, 10 | 4, 10 | 2, 10 | 0, 10 | −2, 9 | −4, 9 |
| y = 3 | 12, 14 | 9, 14 | 6, 14 | 3, 14 | 0, 14 | −3, 14 | −6, 14 |
| y = 4 | 15, 19 | 11, 19 | 8, 19 | 4, 19 | 0, 19 | −4, 19 | −8, 19 |
| y = 5 | 20, 24 | 15, 24 | 10, 24 | 5, 24 | 0, 24 | −5, 24 | −9, 24 |
| s = | −10 | −5 | 0 | 5 | 10 | 15 | 20 |
| t = 0 | | | | | | | |
| t = 5 | | | −1, 1 | | | | |
| t = 10 | | 2, 3 | −1, 2 | −3, 2 | −4, 3 | | |
| t = 15 | | 2, 4 | 0, 4 | −2, 4 | −3, 4 | −4, 4 | |
| t = 20 | | 1, 5 | 0, 5 | −1, 5 | −2, 5 | −3, 5 | −4, 5 |

Given that

R3: CT1(x1, y1, z1)=(11, 11)

R4: CT1(x2, y2, z1+1)=(0, 11)

The inverse tables may be employed and it is found that

| | |
|---|---|
| CTI1(11, 11, −2) = (−2, 5) | CTI0(0, 11, −2) = (0, 5) |
| CTI1(11, 11, −3) = (−3, 4) | CTI0(0, 11, −3) = (0, 4) |
| CTI1(11, 11, −4) = (−4, 3) | CTI0(0, 11, −4) = (0, 3) |
| CTI1(11, 11, −5) = (−4, 3) | CTI0(0, 11, −5) = (−1, 2) |

To satisfy z2=z1+1, (−3, 4) is paired with (0, 5), (−4, 3) with (−1, 4), (−4, 3) with (0, 3). Due to summarization of 0-4 as 0, 5-9 as 9, 10-14 as 10, 15-19 as 15 and 20-24 as 20, it is observed that these pairings are just suggestions to be verified. It is found that only (−3, 4) (0, 5) pairing matches well on the s and t reading: CT1(−3, 4, −3)=(11, 11) and CT1(0, 5, −02)=(0, 11).

The distance between the 2 points (−3, 4, −3) (0, 5, −2) is 3.3, which matches with D.

Again, due to limited resolution, the exact answer is found from the inverse calibration summarization table. In a real world situation where 75,000,000 (x, y, z) positions exist, we shall need to use local gradient stepping to derive the accurate answer.

Example, Linear Spatial Interpretation

2 Dimensional Interpretation

The 2 dimensional spatial interpretation is described in this section:

"R3's (s, t) values are (11, 11). Scanning the table, it is found that:

X=−4-3 y=2 8, 7 6, 7 y=3 12, 12 9, 12

Using the 2 dimensional spatial interpretation as shown in FIG. 21(A), it is fond that x=−3.93 y=2.8, for z=−4"

Referring to FIG. 21(A), it is found from the calibration table of device 1 at the z-plan of z=−4, that the group of 4 neighboring points (−4, 2), (−4, 3), (−3, 2) and (−3, 3) form a square with the following property:

a) Among the 4 sides, segments (−4, 3)-(−4, 2) and (−4, 3)-(−3, 3) have s values covering S=11.

b) Segments (−4, 3)-(−4, 2) and (−3, 3)-(−3, 2) have t values covering T=11.

The points corresponding to linear interpolated S=11 are (−4, 2.75) and (−3.66, 3), respectively. This is represented in FIG. 21(A) with the line connecting said 2 points. The t reading at said 2 points are 10.7 and 12, respectively by linear interpolation. Interpolate t on the line connecting said 2 points, we have $$(y-2.75)=(3-2.75)*(03/1.3)=0.05, \text{ hence the interpreted } y \text{ equals } 2.75+0.05=2.8.$$

$$(x-(-4))=(-3.66+4)*(0.3/1.3)=0.07, \text{ hence the interpolated } x \text{ value equals } -4+0.07=-3.93.$$

(−3.93, 2.8) is the answer for the point corresponding to spatial interpretation of (11, 11) on z=−4 z-plane, based on the calibration table of optical device 1.

3 Dimensional Interpretation

A 3 dimensional calibration table is traversed to match a value (S, T) obtained by processing a target point image captured from an optical device. Under the assumption that an (x, y, z) value is found such that (|s−S|+|t−T|) is minimum. This result is then to be interpreted into fractions of the axes unit length and (X, Y, Z) values are found such that the interpolated values based on s and t values associated with the neighboring points in the calibration table equal S and T respectively.

That is, a z value is specified and interpolated table values between (x, y, z) and (x, y, z+1) are found, where, z>Z>z+1. A 2 dimensional spatial interpretation is then performed on the square. The obtained (X, Y) is the answer.

Figure 21:
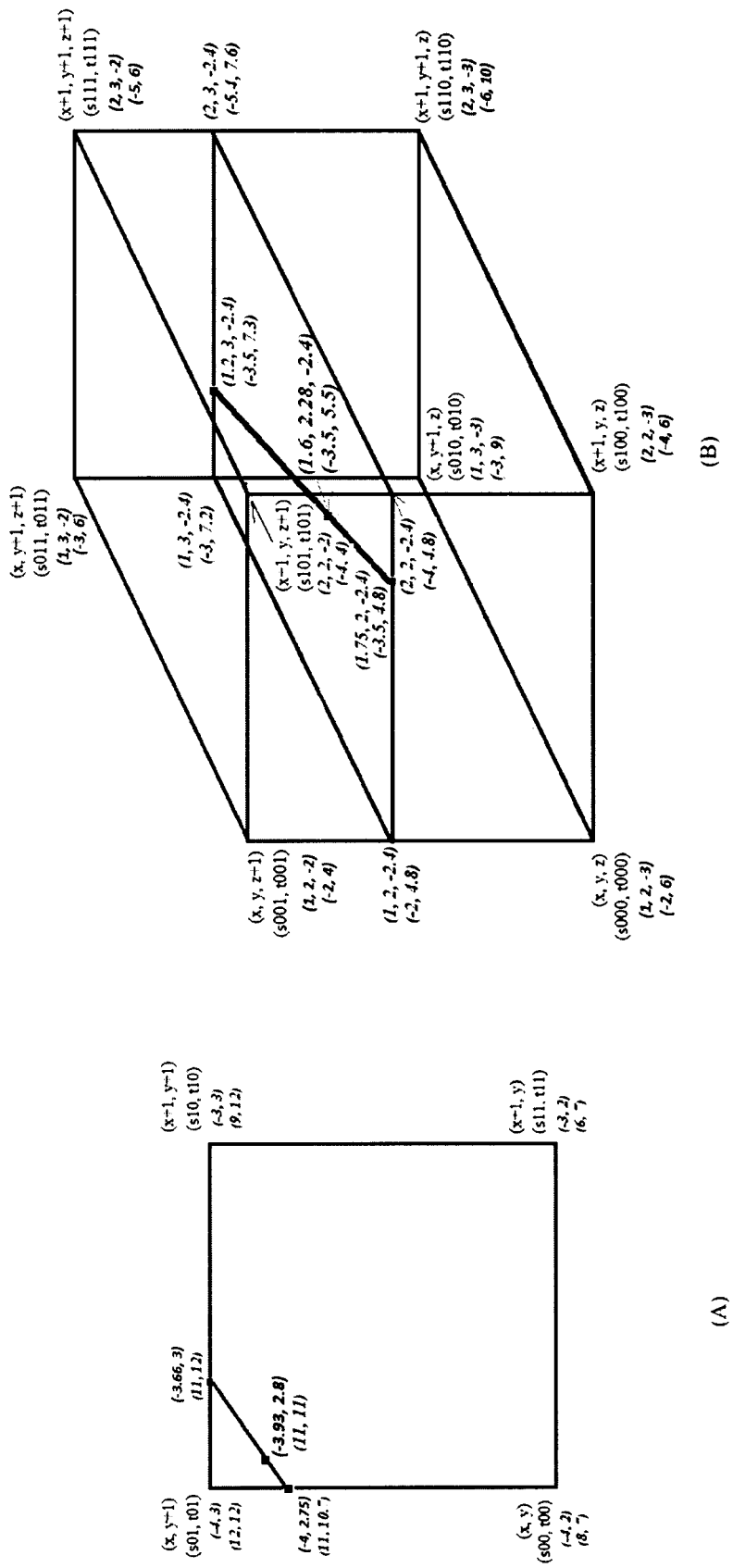
FIG. 21 illustrating a two-dimensional linear spatial interpretation searching method in accordance with some embodiments of the invention.

With reference to FIG. 21, in this example, when S=−3.5 T=5.5 is read from the optical device 1 and it is desired that linearly interpreted fine locations be obtained. By traversing CT1, (x, y, z)=(1, 2, −3) is found such that the group (1, 2, −3) (1, 2, −2) (1, 3, −2) (1, 3, −3) (2, 2, −3) (2, 2, −2) (2, 3, −2) (2, 3, −3) has ranges covering (−3.5, 5.5). The first assumption is to assume z=−2.4 and perform spatial interpretation on (1, 2, −2.4) (1, 3, −2.4) (2, 3, −2.4) (2, 2, −2.4).

The interpolated readings are (−2, 4.8), (−3, 7.2), (−5.4, 7.6) and (−4, 4.8), respectively. The (1.75, 2, −2.4) values are first found with interpolated readings of (−3.5, 4.8) in between line segment (1, 2, −2.4)-(2, 2, −2.4). The values (1.2, 3, −2.4) are then found with interpolated readings of (−3.5, 7.3) on the line segment (1, 3, −2.4)-(2, 3, −2.4). The T value of 5.5 is seen to be in between 4.8 and 7.3, hence we interpret to the point (1.6, 2.28, −2.4) with interpolated readings (−3.5, 5.5). Hence (1.6, 2.28, −2.4) is the answer.

Example, Pixelated Interpretation

FIG. 22 shows the P reading under a grid of optical sensors. The pixelated interpretation of the target at front center like Target point 2 of FIG. 15 and at wide angle like Target Point 3 of FIG. 15 are shown in FIGS. 22(A) and (B) respectively. FIG. 22(C) and FIG. 22(D) shows the pixel sensor readings and the pixelated interpretation of (A) and (B), respectively.

The edge pixels for the square of FIG. 22(C) together with their weight attributes are shown in FIG. 22(E). The accumulated deviations from the geometric center represented as square dot in the figure are:

$$X=-(0.8*-0.5+0+0.7*0.5-0.6+0.4-0.6+0.4+0.9*-0.5+0+0.85*0.5)/3=0.16$$

$$Y=-(0.8*0.5+0.5+0.5+0.7*0.5++0+0+0+0.9*-0.5-0.75-0.75+0.85*-0.5)/3=0.21$$

The edge pixels for the square of FIG. 22(D) together with their weight attributes are shown in FIG. 22(F). The accumulated deviations from the geometric center indicated as a square dot in the figure are:

$$X=-(0.7*0.5+0.4+0.6+0.7+0.9*0.7+0+0.7*0.5+0+0+0+0-0.1-0.4-0.6-0.7-0.9*0.5+0+0+0-0.8*0.3)/7=-0.08$$

$$Y=-(0.7*0.5+0+0+0-0.9*0.3+0-0.7*0.5-0.4-0.2-0.1+0+0+0+0+0.9*0.5+0.3+0.1+0+0.8*0.7)/7=-0.06$$

Based on such a method, the optical device readings (s, t) are obtained as decimal numbers and are no longer just reflected as rows and columns of a sensor.

Components of a Processing System

Figure 26:
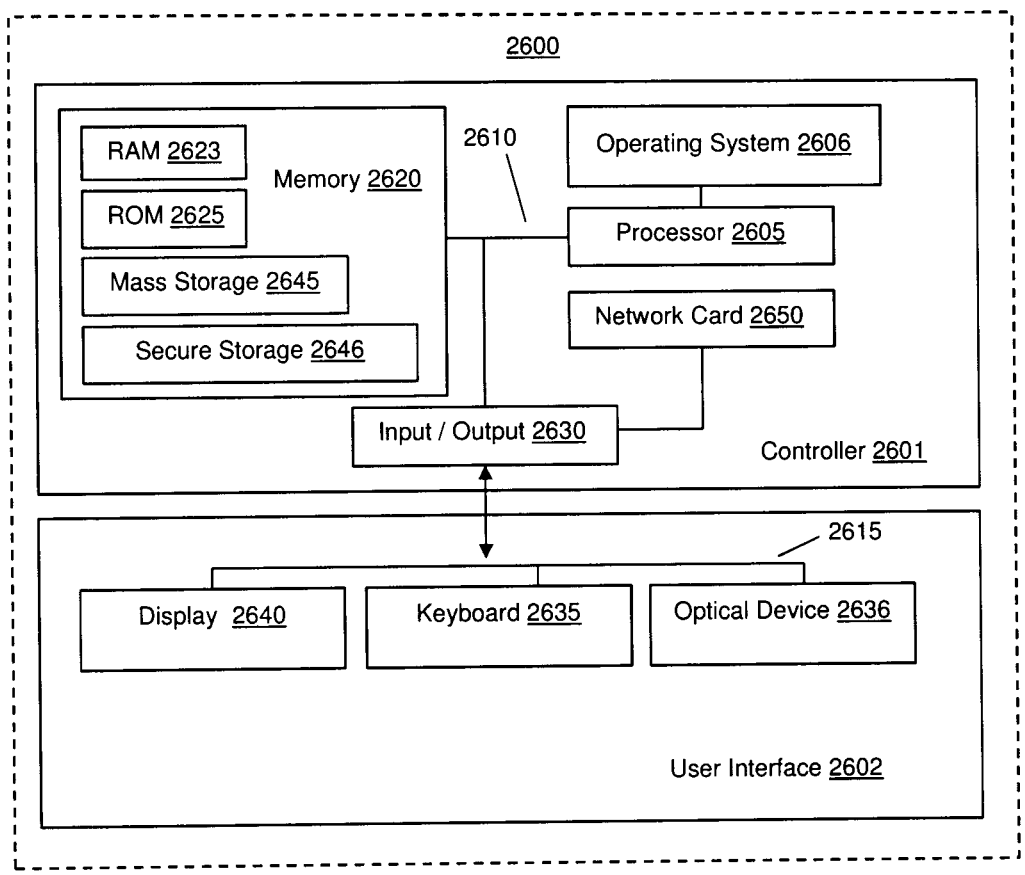
FIG. 26 illustrating a block diagram representative of processing systems providing various embodiments in accordance with some embodiments of the invention.

FIG. 26 illustrates a block diagram representative of components of processing system 2600 that may be provided within any computing devices for implementing various embodiments in accordance with embodiments of the invention. One skilled in the art will recognize that the exact configuration of each processing system provided within these modules and servers may be different and the exact configuration of processing system 2600 may vary and FIG. 26 is provided by way of example only.

In some embodiments of the invention, module 2600 comprises controller 2601 and user interface 2602. User interface 2602 is arranged to enable manual interactions between a user and module 2600 and for this purpose includes the input/output components required for the user to enter instructions to control module 2600. A person skilled in the art will recognize that components of user interface 2602 may vary from embodiment to embodiment but will typically include one or more of display 2640, keyboard 2635 and optical device 2636.

Controller 2601 is in data communication with user interface 2602 via bus group 2615 and includes memory 2620, processor 2605, hardware/firmware 2608 mounted on circuit boards that processes instructions and data for performing the method of this embodiment, an operating system 2606, driving software 2607, an input/output (I/O) interface 2630 for communicating with user interface 2602 and a communications interface, in this embodiment in the form of a network card 2650. Network card 2650 may, for example, be utilized to send data from electronic device 2600 via a wired or wireless network to other processing devices or to receive data via the wired or wireless network. Wireless networks that may be utilized by network card 2650 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 2620 and driving software 2607/operating system 2606 are in data communication with CPU 2605 via bus group 2610. In embodiments of the invention, optical device 2636 may be configured to be in direct communication with memory 2620 via bus group 2610. The memory components include both volatile and non-volatile memory and more than one of each type of memory, including Random Access Memory (RAM) 2620, Read Only Memory (ROM) 2625 and a mass storage device 2645, the last comprising one or more solid-state drives (SSDs). Memory 2620 also includes secure storage 2646 for securely storing secret keys, or private keys. It should be noted that the contents within secure storage 2646 are only accessible by a super-user or administrator of module 2600 and may not be accessed by any user of module 2600. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 2620 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 2605 may be provided by any suitable logic circuitry for receiving inputs, processing them in accordance with instructions stored in memory and generating outputs (for example to the memory components or on display 2640). In this embodiment, processor 2605 may be a single core or multi-core processor with memory addressable space. In one example, processor 2605 may be multi-core, comprising—for example—an 8 core CPU.

The above is a description of some embodiments of a system and process in accordance with the present invention as set forth in the following claims. It is envisioned that others may and will design alternatives that fall within the scope of the following claims.

The invention claimed is:

1. A system for determining, in a three dimensional coordinate system, locations of target elements within field of view of the optical device, the system comprising: the optical device being configured to: capture images of a first target element and a second target element, and obtain a set of constraining rules from the captured images; generate an output (s, t) whereby (s, t) defines a two-dimensional location of the captured image of the first target element on sensors of the optical device; generate an output (u, v) whereby (u, v) defines a two-dimensional location of the captured image of the second target element on the sensors of the optical device; a computing device communicatively coupled to the optical device, the computing device being configured to translate the output (s, t) and the output (u, v) into positions in a three dimensional coordinate system of the optical device by applying a predetermined traversing scheme together with the captured outputs (s, t), (u, v) and the set of constraining rules to a calibration table, wherein the calibration table was pre-generated by, positioning the optical device at a plurality of calibration positions from a target screen comprising a plurality of target centers, whereby at each calibration position, for each target center of the plurality of target centers on the target screen, the optical device: captures an image of the target center and associates, in the calibration table, a two-dimensional location of the captured image of the target center on the sensor of the optical device with a position of the target center relative to the optical device, the position being defined as a location in the three dimensional coordinate system of the optical device, whereby the location of the optical device is defined as a three dimensional coordinate point of origin of the optical device.

2. The system according to claim 1 wherein each target element comprises a marker pattern and a signage pattern whereby, the marker pattern further comprises a symmetrical geometrical feature whereby the center of symmetry of the feature defines a center of the target element, and the signage pattern further comprises a series of indicia whereby a first shape denotes a first state and a second shape denotes a second state, the first and second states being used to represent binary characters.

3. The system according to claim 2 wherein the first state is defined by an indicium having an upper block that is larger than a lower block the second state is define by an indicium having a lower block that is larger than an upper block denotes a second state.

4. The system according to claim 2 whereby the computing device is further configured to obtain the set of constraining rules from the signage patterns associated with the captured images of the target elements.

5. The system according to claim 1 wherein the set of constraining rules comprises: a displacement D between the first and second target elements; and a difference in displacement .DELTA.d between a normal displacement of the first target element from a reference plane and a normal displacement of the second target element from a reference plane, the reference plane being provided a predetermined distance away from the first or second target element.

6. The system according to claim 2 wherein marker pattern for each target element comprises at least a first color and the optical device is provided with a first color sampling filter for detecting the first color.

7. The system according to claim 5 wherein the computing device being configured to apply the predetermined traversing scheme together with the captured outputs (s, t), (u, v) and the set of constraining rules to the calibration table comprises the computing device being configured to: recursively traverse the calibration table to identify a first point in the three dimensional coordinate system of the optical device that is associated with the output (s, t), and traverse the calibration table to identify a second point in the three dimensional coordinate system of the optical device that is associated with the output (u, v), such that a distance D.sub.12 between the first point and the second point is equal to the displacement D between the first and second target elements, such that a difference in displacement .DELTA.d.sub.12 between normal displacements of the first point and the second point from the reference plane is equal to the difference in displacement .DELTA.d, and set the first point as a location of the output (s, t) and the second point as a location of the output (u, v) in the optical device's three dimensional coordinate system.

8. The system according to claim 7 wherein the computing device being configured to traverse the calibration table to identify the first point in the three dimensional coordinate system of the optical device that is associated with the output (s, t), and traversing the calibration table to identify the second point in the three dimensional coordinate system of the optical device that is associated with the output (u, v) comprises the computing device being configured to: generate an arbitrary plane parallel to the reference plane from the calibration table and generate another plane that is provided a distance .DELTA.d away from the arbitrary plane; identify a point in the arbitrary plane that is associated with the output (s, t) and identify another point in the another plane that is associated with the output (u, v), and set the identified point in the arbitrary plane as the first point and the another identified point in the other plane as the second point.

9. The system according to claim 7 wherein the computing device being configured to traverse the calibration table to identify the first point in the three dimensional coordinate system of the optical device that is associated with the output (s, t), and traverse the calibration table to identify the second point in the optical device's three dimensional coordinate system that is associated with the output (u, v) comprises the computing device being configured to: generate an arbitrary plane parallel to the reference plane from the calibration table and generate another plane parallel to the reference plane that is provided a distance .DELTA.d away from the arbitrary plane; identify a point in the arbitrary plane that is associated with the output (s, t) and plot a sphere centered on the identified point, the sphere having a radius D; identify another point in the another plane that intersects with the sphere and determine if the another point is associated with the output (u, v), and if it is determined that the another point is associated with the output (u, v), set the identified point in the arbitrary plane as the first point and the another identified point in the another plane as the second point.

10. The system according to claim 8 wherein the computing device being configured to identify the point in the arbitrary plane parallel to the reference plane that is associated with the output (s, t) comprises the computing device being configured to: perform linear interpolation on each side of the arbitrary plane to identify points that are associated with the s value in the output (s, t) whereby points on separate sides are connected to form a line segment L.sub.S; and identify from the line segment L.sub.S, a region containing the point associated with the output (s, t).

11. The system according to claim 8 wherein the computing device being configured to identify the another point in the another plane that is associated with the output (u, v) comprises the computing device being configured to: perform linear interpolation on each side of the another plane to identify points that are associated with the u value in the output (u, v) whereby points on separate sides are connected to form a line segment L.sub.U; and identify from the line segment L.sub.U, a region containing the point associated with the output (u, v).

12. The system according to claim 8 wherein the computing device being configured to identify the point in the arbitrary plane that is associated with the output (s, t) comprises the computing device being configured to: perform a local gradient search from an arbitrary point on the arbitrary plane to identify a gradient vector that results in a minimum value; recursively perform the local gradient search from the gradient vector across relevant points on the arbitrary plane until a point having a minimum value is identified, the point being identified as the point in the arbitrary plane that is associated with the output (s, t) whereby, the local gradient search is performed using the two-dimensional locations on the sensor of the optical device that are associated with each point in the calibration table.

13. The system according to claim 8 wherein the computing device being configured to identify the another point in the another plane that is associated with the output (u, v) comprises the computing device being configured to: recursively perform a local gradient search from an arbitrary point on the another plane to identify a gradient vector on the another plane that results in a minimum value, recursively perform the local gradient search from the gradient vector across relevant points on the another plane until a point having a minimum value is identified, the point being identified as the point in the another plane that is associated with the output (u, v) whereby, the local gradient search is performed using the two-dimensional locations on the sensor of the optical device that are associated with each point in the calibration table.

14. The system according to claim 10 further comprising the computing device being configured to: apply spatial interpretation to points in the region bounding the point associated with the output (s, t) to define the point in decimal places if the points in the region only comprises integers; and apply spatial interpretation to points in the region bounding the point associated with the output (u, v) to define the point in decimal places if the points in the region only comprises integers.

15. The system according to claim 1 wherein a first set of data in the calibration table was pre-generated at an ambient temperature, and at least one additional set of data in the calibration table was pre-generated at another temperature, whereby the computing device being configured to translate the output (s, t) and the output (u, v) into positions in a three dimensional coordinate system of the optical device by applying a predetermined traversing scheme together with the captured outputs (s, t), (u, v) and the set of constraining rules to the calibration table further comprises the computing device being configured to: compute gradients of thermal expansion based on the first and the another set of data in the calibration table; obtain an ambient temperature of the optical device; adjust the output (s, t) and the output (u, v) using the ambient temperature and the computed gradients of thermal expansion; translate the adjusted outputs into the positions in the three dimensional coordinate system of the optical device.

16. The system according to claim 1 wherein the optical device being configured to generate the two-dimensional location of the captured image of the target element on sensors on the optical device comprises the optical device being configured to: identify a shape representing a center of the target element; determine the geometric center of the identified shape; assign x-axis and y-axis vector values to edges of the identified shape; and determine accumulated deviations along the x-axis and y-axis using the x-axis and y-axis vector values assigned to the edges of the identified shape.

17. A system for determining, in a three dimensional coordinate system of a first optical device, locations of target elements within a field of view of the first optical device, the system comprising: the first optical device being configured to: capture an image of a first target element; generate an output (s, t) whereby (s, t) defines a two-dimensional location of the captured image of the first target element on sensors of the first optical device; a second optical device provided at a fixed location away from the first optical device, the second optical device being configured to: capture an image of the first target element; generate an output (u, v) whereby (u, v) defines a two-dimensional location of the captured image of the first target element on sensors of the second optical device; a computing device communicatively coupled to the first and second optical devices, the computing device being configured to translate the output (s, t) and the output (u, v) into positions in the three dimensional coordinate system of the first optical device by applying a predetermined traversing scheme together with the captured output (s, t) to a first calibration table and by applying the predetermined traversing scheme together with the captured output (u, v) to a second calibration table, wherein each of the calibration tables was pre-generated by, positioning an optical device associated with the calibration table at a plurality of calibration positions from a target screen comprising a plurality of target centers, whereby at each calibration position, for each target center of the plurality of target centers on the target screen, the associated optical device captures an image of the target centers and associates, in the calibration table, a two-dimensional location of the captured image of the target center on sensor of the optical device with a position of the target center relative to the optical device, the position being defined as a location in a three dimensional coordinate system of the optical device, whereby the location of the optical device is defined as a point of origin of a three dimensional coordinate system of the optical device.

18. The system according to claim 17 wherein the applying the predetermined traversing scheme together with the captured output (s, t) to the first calibration table and the applying the predetermined traversing scheme together with the captured output (u, v) to the second calibration table comprises the computing device being configured to: a) traverse the first calibration table to identify a first point in a three dimensional coordinate system of the first optical device that is associated with the output (s, t) and traverse the second calibration table to identify a second point in a three dimensional coordinate system of the first optical device that is associated with the output (u, v); b) obtain relative displacement and angular difference between the first and the second optical device based on the fixed location of the second optical device relative to the first optical device, and normalizing the identified second point using the obtained relative displacement and angular difference; and c) repeat steps (a) to (b) if the location of the normalized identified second point is not equal to the first point, whereby the first point is set as the location of the output (s, t) if the normalized identified second point is equal to the first point.

19. A system for determining, in a first optical device's three dimensional coordinate system, locations of target elements within a field of view of the first optical device, the system comprising: the first optical device being configured to: capture an image of a first target element; generate an output (s, t) whereby (s, t) defines a two-dimensional location of the captured image of the first target element on sensors of the first optical device; a second optical device provided at a fixed location with reference to the first optical device, the second optical device being configured to: capture an image of a second target element, the second target element being provided at a location $D_{T2}$ away from the first target element; generate an output (u, v) whereby (u, v) defines a two-dimensional location of the captured image of the second target element on sensors of the second optical device; a computing device communicatively coupled to the first and second optical devices, the computing device being configured to obtain a set of constraining rules from the captured images translate the output (s, t) and the output (u, v) into positions in the three dimensional coordinate system of the first optical device by applying a predetermined traversing scheme together with the captured output (s, t) and the set of constraining rules to a first calibration table and by applying the predetermined traversing scheme together with the captured output (u, v) to a second calibration table, wherein each of the calibration tables was pre-generated by, positioning an optical device associated with the calibration table at a plurality of calibration positions from a target screen comprising a plurality of target centers, whereby at each calibration position, for each target center of the plurality of target centers on the target screen, the associated optical device captures an image of the target center and associates, in the calibration table, a two-dimensional location of the captured image of the target center on a sensor of the optical device with a position of the target center relative to the associated optical device, the position being defined as a location in a three dimensional coordinate system of the optical device, whereby a location of the optical device is defined as a point of origin of the three dimensional coordinate system of the optical device.

20. The system according to claim 19 wherein the set of constraining rules comprises: a displacement D between the first and second target elements, where D comprises a value greater than 0 or equal to 0; and if the value of D is greater than 0, the set of constraining rules further comprises a difference in displacement $\Delta d$ between a normal displacement of the first target element from a reference plane and a normal displacement of the second target element from a reference plane, the reference plane being provided a predetermined distance away from the first or second target element.

21. The system according to claim 20 wherein the applying the predetermined traversing scheme together with the captured output (s, t) and the set of constraining rules to the first calibration table and the applying the predetermined traversing scheme together with the captured output (u, v) to the second calibration table comprises the computing device being configured to: a) traverse the first calibration table to identify a first point in a three dimensional coordinate system of the first optical device that is associated with the output (s, t) and traverse the second calibration table to identify a second point in the three dimensional coordinate system of the second optical device that is associated with the output (u, v); b) obtain relative displacement and angular difference between the first and the second optical device based on the fixed location of the second optical device relative to the first optical device, and normalizing the identified second point using the obtained relative displacement and angular difference; and c) repeat steps (a) to (b) if a displacement $D_{12}$ between the first point in the first optical device's three dimensional coordinate system and the normalized identified second point is not equal to the displacement D between the first and second target elements, and if a difference in a displacement $\Delta d_{12}$ between normal displacements of the first point and the normalized second point from the reference plane is not equal to the difference in displacement $\Delta d$, whereby the first point is set as the location of the output (s, t) and the normalized second point is set as the location of the output (u, v) in the three dimensional coordinate system of the first optical device if the conditions in step (c) are met.

22. The system according to claim 1 whereby the computing device is further configured to employ location information relative to a global coordinate system in the constraining rules to extract positioning information about the optical device relative to a global system.

23. A method for determining, in an optical device's three dimensional coordinate system, locations of target elements within the optical device's field of view, the optical device being communicatively coupled to a computing device, the method comprising: capturing, using the optical device, images of a first target element and a second target element, and obtain a set of constraining rules from the captured images; generating an output (s, t) whereby (s, t) defines a two-dimensional location of the captured image of the first target element on the optical device's sensors; generating an output (u, v) whereby (u, v) defines a two-dimensional location of the captured image of the second target element on the optical device's sensors; translating, using the computing device, the output (s, t) and the output (u, v) into positions in the optical device's three dimensional coordinate system by applying a predetermined traversing scheme together with the captured outputs (s, t), (u, v) and the set of constraining rules to a calibration table, wherein the calibration table was pre-generated by, positioning the optical device at a plurality of calibration positions from a target screen comprising a plurality of target centers, whereby at each calibration position, for each target center of the plurality of target centers on the target screen, the optical device: captures an image of the target center and associates, in the calibration table, a two-dimensional location of the captured image of the target center on the optical device's sensor with a position of the target center relative to the optical device, the position being defined as a location in the optical device's three dimensional coordinate system, whereby the optical device's location is defined as the optical device's three dimensional coordinate system's point of origin.

24. The method according to claim 23 wherein each target element comprises a marker pattern and a signage pattern whereby, the marker pattern further comprises a symmetrical geometrical feature whereby the feature's center of symmetry defines a center of the target element, and the signage pattern further comprises a series of indicia whereby a first shape denotes a first state and a second shape denotes a second state, the first and second states being used to represent binary characters.

25. The method according to claim 24 wherein the first state is defined by an indicium having an upper block that is larger than a lower block the second state is define by an indicium having a lower block that is larger than an upper block denotes a second state.

26. The method according to claim 24 further comprising the step of obtaining, using the computing device, the set of constraining rules from the signage patterns associated with the captured images of the target elements.

27. The method according to claim 23 wherein the set of constraining rules comprises: a displacement D between the first and second target elements; and a difference in displacement .DELTA.d between a normal displacement of the first target element from a reference plane and a normal displacement of the second target element from a reference plane, the reference plane being provided a predetermined distance away from the first or second target element.

28. The method according to claim 24 wherein each target element's marker pattern comprises at least a first color and the optical device is provided with a first color sampling filter for detecting the first color.

29. The method according to claim 27 wherein the applying the predetermined traversing scheme together with the captured outputs (s, t), (u, v) and the set of constraining rules to the calibration table comprises: recursively traversing, using the computing device, the calibration table to identify a first point in the optical device's three dimensional coordinate system that is associated with the output (s, t), and traversing the calibration table to identify a second point in the optical device's three dimensional coordinate system that is associated with the output (u, v), such that a distance D.sub.12 between the first point and the second point is equal to the displacement D between the first and second target elements, such that a difference in displacement .DELTA.d.sub.12 between normal displacements of the first point and the second point from the reference plane is equal to the difference in displacement .DELTA.d, and set the first point as a location of the output (s, t) and the second point as a location of the output (u, v) in the optical device's three dimensional coordinate system.

30. The method according to claim 29 wherein the traversing the calibration table to identify the first point in the optical device's three dimensional coordinate system that is associated with the output (s, t), and traversing the calibration table to identify the second point in the optical device's three dimensional coordinate system that is associated with the output (u, v) comprises: generating an arbitrary plane parallel to the reference plane from the calibration table and generating another plane that is provided a distance .DELTA.d away from the arbitrary plane; identifying a point in the arbitrary plane that is associated with the output (s, t) and identifying another point in the another plane that is associated with the output (u, v), and setting the identified point in the arbitrary plane as the first point and the another identified point in the other plane as the second point.

31. The method according to claim 29 wherein the traversing the calibration table to identify the first point in the optical device's three dimensional coordinate system that is associated with the output (s, t), and traversing the calibration table to identify the second point in the optical device's three dimensional coordinate system that is associated with the output (u, v) comprises: generating an arbitrary plane parallel to the reference plane from the calibration table and generating another plane parallel to the reference plane that is provided a distance .DELTA.d away from the arbitrary plane; identifying a point in the arbitrary plane that is associated with the output (s, t) and plotting a sphere centered on the identified point, the sphere having a radius D; identifying another point in the another plane that intersects with the sphere and determining if the another point is associated with the output (u, v), and if it is determined that the another point is associated with the output (u, v), setting the identified point in the arbitrary plane as the first point and the another identified point in the another plane as the second point.

32. The method according to claim 30 wherein the identifying the point in the arbitrary plane parallel to the reference plane that is associated with the output (s, t) comprises: performing linear interpolation on each side of the arbitrary plane to identify points that are associated with the s value in the output (s, t) whereby points on separate sides are connected to form a line segment L.sub.S; and identifying from the line segment L.sub.S, a region containing the point associated with the output (s, t).

33. The method according to claim 30 wherein the identifying the another point in the another plane that is associated with the output (u, v) comprises: performing linear interpolation on each side of the another plane to identify points that are associated with the u value in the output (u, v) whereby points on separate sides are connected to form a line segment L.sub.U; and identifying from the line segment L.sub.U, a region containing the point associated with the output (u, v).

34. The method according to claim 30 wherein the identifying the point in the arbitrary plane that is associated with the output (s, t) comprises: performing a local gradient search from an arbitrary point on the arbitrary plane to identify a gradient vector that results in a minimum value; recursively performing the local gradient search from the gradient vector across relevant points on the arbitrary plane until a point having a minimum value is identified, the point being identified as the point in the arbitrary plane that is associated with the output (s, t) whereby, the local gradient search is performed using the two-dimensional locations on the optical device's sensor that are associated with each point in the calibration table.

35. The method according to claim 30 wherein the identifying the another point in the another plane that is associated with the output (u, v) comprises: recursively performing a local gradient search from an arbitrary point on the another plane to identify a gradient vector on the another plane that results in a minimum value, recursively performing the local gradient search from the gradient vector across relevant points on the another plane until a point having a minimum value is identified, the point being identified as the point in the another plane that is associated with the output (u, v) whereby, the local gradient search is performed using the two-dimensional locations on the optical device's sensor that are associated with each point in the calibration table.

36. The method according to claim 32 further comprising: applying, using the computing device, spatial interpretation to points in the region bounding the point associated with the output (s, t) to define the point in decimal places if the points in the region only comprises integers; and applying spatial interpretation to points in the region bounding the point associated with the output (u, v) to define the point in decimal places if the points in the region only comprises integers.

37. The method according to claim 23 wherein a first set of data in the calibration table was pre-generated at an ambient temperature, and at least one additional set of data in the calibration table was pre-generated at another temperature, whereby the translating the output (s, t) and the output (u, v) into positions in the optical device's three dimensional coordinate system by applying a predetermined traversing scheme together with the captured outputs (s, t), (u, v) and the set of constraining rules to the calibration table further comprises: computing, using the computing device, gradients of thermal expansion based on the first and the another set of data in the calibration table; obtaining an ambient temperature of the optical device; adjusting the output (s, t) and the output (u, v) using the ambient temperature and the computed gradients of thermal expansion; translating the adjusted outputs into the positions in the optical device's three dimensional coordinate system.

38. The method according to claim 23 wherein the generating the two-dimensional location of the captured image of the target element on the optical device's sensors comprises: identifying, using the optical device, a shape representing a center of the target element; determining the geometric center of the identified shape; assigning x-axis and y-axis vector values to edges of the identified shape; and determining accumulated deviations along the x-axis and y-axis using the x-axis and y-axis vector values assigned to the edges of the identified shape.

39. A method for determining, in a three dimensional coordinate system of a first optical device, locations of target elements within a field of view of the first optical device, the first optical device and a second optical device being communicatively coupled to a computing device, the method comprising: capturing, using the first optical device, an image of a first target element; generating an output (s, t) whereby (s, t) defines a two-dimensional location of the captured image of the first target element on sensors of the first optical device; capturing, using a second optical device provided at a location away from the first optical device, an image of the first target element; generating an output (u, v) whereby (u, v) defines a two-dimensional location of the captured image of the first target element on sensors on the second optical device; translating, using the computing device, the output (s, t) and the output (u, v) into positions in the three dimensional coordinate system of the first optical device by applying a predetermined traversing scheme together with the captured output (s, t) to a first calibration table and by applying the predetermined traversing scheme together with the captured output (u, v) to a second calibration table, wherein each of the calibration tables was pre-generated by, positioning an optical device associated with the calibration table at a plurality of calibration positions from a target screen comprising a plurality of target centers, whereby at each calibration position, for each target center of the plurality of target centers on the target screen, the optical device captures an image of the target center and associates, in the calibration table, a two-dimensional location of the captured image of the target center on an associated sensor of the optical device with a position of the target center relative to the optical device, the position being defined as a location in the three dimensional coordinate system of the optical device, whereby the location of the optical device is defined as point of origin the three dimensional coordinate system of the optical device.

40. The method according to claim 39 wherein the applying the predetermined traversing scheme together with the captured output (s, t) to the first calibration table and the applying the predetermined traversing scheme together with the captured output (u, v) to the second calibration table comprises: a) traversing, using the computing device, the first calibration table to identify a first point in a three dimensional coordinate system that is associated with the output (s, t) and traversing the second calibration table to identify a second point in a three dimensional coordinate system that is associated with the output (u, v); b) obtaining relative displacement and angular difference between the first and the second optical device based on the fixed location of the second optical device relative to the first optical device, and normalizing the identified second point using the obtained relative displacement and angular difference; and c) repeating steps (a) to (b) if the normalized identified second point is not equal to the normalized location of the second optical device, d) whereby the first point is set as the location of the output (s, t) if the normalized identified second point is equal to the first point.

41. A method for determining, in a three dimensional coordinate system of a first optical device, locations of target elements within field of view of the first optical device, the first optical device and a second optical device being communicatively coupled to a computing device, the method comprising: capturing, using the first optical device, an image of a first target element; generating an output (s, t) whereby (s, t) defines a two-dimensional location of the captured image of the first target element on sensors on a first optical device; capturing, using a second optical device provided at a fixed location with reference to the first optical device, an image of a second target element, the second target element being provided at a location $D_{T2}$ away from the first target element; generating an output (u, v) whereby (u, v) defines a two-dimensional location of the captured image of the second target element on sensors of the second optical device; obtaining, using the computing device, a set of constraining rules from the captured images; and translating, using the computing device, the output (s, t) and the output (u, v) into positions in the three dimensional coordinate system of the first optical device by applying a predetermined traversing scheme together with the captured output (s, t) and the set of constraining rules to a first calibration table and by applying the predetermined traversing scheme together with the captured output (u, v) to a second calibration table, wherein each of the calibration tables was pre-generated by, positioning an optical device associated with the calibration table at a plurality of calibration positions from a target screen comprising a plurality of target centers, whereby at each calibration position, for each target center of the plurality of target centers on the target screen, the associated optical device captures an image of the target center and associates, in the calibration table, a two-dimensional location of the captured image of the target center on a sensor of the optical device with a position of the target center relative to the optical device, the position being defined as a location in the three dimensional coordinate system of the optical device, whereby the a location of the optical device is defined as a point of origin of a three dimensional coordinate system of the optical device.

42. The method according to claim 41 wherein the set of constraining rules comprises: a displacement D between the first and second target elements, where D comprises a value greater than 0 or equal to 0; and if the value of D is greater than 0, the set of constraining rules further comprises a difference in displacement .DELTA.d between a normal displacement of the first target element from a reference plane and a normal displacement of the second target element from a reference plane, the reference plane being provided a predetermined distance away from the first or second target element.

43. The method according to claim 42 wherein the applying the predetermined traversing scheme together with the captured output (s, t) and the set of constraining rules to the first calibration table and the applying the predetermined traversing scheme together with the captured output (u, v) to the second calibration table comprises: a) traversing, using the computing device, the first calibration table to identify a first point in the three dimensional coordinate system of the first optical device that is associated with the output (s, t) and traverse the second calibration table to identify a second point in the three dimensional coordinate system of the second device that is associated with the output (u, v); b) obtaining relative displacement and angular difference between the first and the second optical device based on the fixed location of the second optical device relative to the first optical device, and normalizing the identified second point using the obtained relative displacement and angular difference; and c) repeating steps (a) to (b) if a displacement D.sub.12 between the first point in the three dimensional coordinate system of the first optical device and the normalized identified second point is not equal to the displacement D between the first and second target elements, and if a difference in a displacement .DELTA.d.sub.12 between normal displacements of the first point and the normalized second point from the reference plane is not equal to the difference in displacement .DELTA.d, whereby the first point is set as the location of the output (s, t) and the normalized second point is set as the location of the output (u, v) in the first optical device's three dimensional coordinate system if the conditions in step (c) are met.

44. The method according to claim 23 whereby the method further comprises: employing, using the computing device, location information relative to a global coordinate system in the constraining rules to extract positioning information about the optical device relative to a global system.

* * * * *